United States Patent
Eidam et al.

(10) Patent No.: US 11,740,853 B1
(45) Date of Patent: Aug. 29, 2023

(54) SMART TABLE SYSTEM UTILIZING EXTENDED REALITY

(71) Applicant: Wells Fargo Bank, N.A., San Francisco, CA (US)

(72) Inventors: Kourtney Eidam, Marietta, GA (US); Darren Goetz, Salinas, CA (US); Dennis Montenegro, Concord, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 17/079,971

(22) Filed: Oct. 26, 2020

(51) Int. Cl.
| | | |
|---|---|---|
| *G06F 3/16* | (2006.01) | |
| *G06F 9/451* | (2018.01) | |
| *G06F 3/0484* | (2022.01) | |
| *H04L 9/40* | (2022.01) | |
| *G06Q 30/0601* | (2023.01) | |
| *G06Q 30/018* | (2023.01) | |

(52) U.S. Cl.
CPC .............. *G06F 3/16* (2013.01); *G06F 3/0484* (2013.01); *G06F 9/451* (2018.02); *G06Q 30/0185* (2013.01); *G06Q 30/0613* (2013.01); *H04L 63/0853* (2013.01)

(58) Field of Classification Search
CPC .......... G06F 3/16; G06F 3/0484; G06F 9/451; G06Q 30/0185; G06Q 30/0613; H04L 63/0853
USPC .................................................. 715/75, 750
See application file for complete search history.

(56) References Cited

U.S. PATENT DOCUMENTS

| | | |
|---|---|---|
| 6,430,542 B1 | 8/2002 | Moran |
| 6,493,469 B1 | 12/2002 | Taylor et al. |

(Continued)

FOREIGN PATENT DOCUMENTS

| | | |
|---|---|---|
| CN | 107977776 | 5/2018 |
| CN | 108198076 | 6/2018 |

(Continued)

OTHER PUBLICATIONS

Cho et al.; Interaction for Tabletop Computing Environment an Analysis and Implementation 8 Pages.

(Continued)

*Primary Examiner* — Reza Nabi
*Assistant Examiner* — Hwei-Min Lu
(74) *Attorney, Agent, or Firm* — Foley & Lardner LLP

(57) ABSTRACT

Systems, methods and computer-readable storage media including an interactive surface including a touchscreen and a plurality of interactive surface sensor devices, a plurality of smart headsets including a transparent display and a plurality of smart headset sensor devices, each of the smart headsets configured to be respectively worn by an individual, and a processing circuit configured to generate graphical user interfaces for each of the smart headsets. The processing circuit is further configured to provide the graphical user interfaces to each of the smart headsets. The processing circuit is further configured to receive sensor device data. The processing circuit is further configured to update, in response to receiving the sensor device data, a first graphical user interface for a first smart headset. The processing circuit is further configured to update a second graphical user interface for a second smart headset.

20 Claims, 28 Drawing Sheets

(56) References Cited

U.S. PATENT DOCUMENTS

| | | | |
|---|---|---|---|
| 6,667,738 B2 | 12/2003 | Murphy | |
| 6,866,388 B2 | 3/2005 | Yang | |
| 7,027,040 B2 | 4/2006 | Rekimoto et al. | |
| 7,403,191 B2 | 7/2008 | Sinclair | |
| 8,194,045 B1 | 6/2012 | Maloney et al. | |
| 8,195,576 B1 | 6/2012 | Grigg et al. | |
| 8,206,047 B1 | 6/2012 | Isaac et al. | |
| 8,207,872 B2 | 6/2012 | Huang et al. | |
| 8,346,672 B1 | 1/2013 | Weiner et al. | |
| 8,356,712 B2 | 1/2013 | Piazza, Jr. | |
| 8,438,110 B2 | 5/2013 | Calman et al. | |
| 8,451,248 B1 | 5/2013 | Kim | |
| 8,502,789 B2 | 8/2013 | Tse et al. | |
| 8,549,589 B2 | 10/2013 | Stollman | |
| 8,700,772 B2 | 4/2014 | Saint Clair | |
| 8,743,072 B2 | 6/2014 | Kim | |
| 8,854,330 B1 | 10/2014 | Maloney et al. | |
| 9,024,884 B2 | 5/2015 | Lengeling et al. | |
| 9,075,429 B1 | 7/2015 | Karakotsios | |
| 9,104,886 B1 | 8/2015 | Dolbakian et al. | |
| 9,141,280 B2 | 9/2015 | Van Eerd et al. | |
| 9,292,129 B2 | 3/2016 | Tsang et al. | |
| 9,411,467 B2 | 8/2016 | Argiro | |
| 9,430,140 B2 | 8/2016 | Reuschel et al. | |
| 9,529,514 B2 | 12/2016 | Saint Clair | |
| 9,560,076 B2 | 1/2017 | Schultz et al. | |
| 9,576,105 B2 | 2/2017 | Cho | |
| 9,588,680 B2 | 3/2017 | Van Eerd et al. | |
| 9,590,968 B2 | 3/2017 | Stollman | |
| 9,665,259 B2 | 5/2017 | Lee et al. | |
| 9,715,476 B2 | 7/2017 | Megiddo et al. | |
| 9,746,981 B2 | 8/2017 | Zachut et al. | |
| 9,747,499 B2 | 8/2017 | Kim et al. | |
| 9,749,395 B2 | 8/2017 | Dawson et al. | |
| 9,769,216 B2 | 9/2017 | Gaetano, Jr. | |
| 9,774,653 B2 | 9/2017 | Hinckley et al. | |
| 9,794,306 B2 | 10/2017 | Riecken et al. | |
| 9,883,138 B2 | 1/2018 | Chen et al. | |
| 9,898,663 B2 | 2/2018 | Wexler et al. | |
| 9,924,019 B2 | 3/2018 | Jeganathan et al. | |
| 9,953,479 B1 | 4/2018 | Sawant et al. | |
| 9,990,814 B1 | 6/2018 | Eidam et al. | |
| 10,055,046 B2 | 8/2018 | Lengeling et al. | |
| 10,096,011 B2 | 10/2018 | Camp | |
| 10,230,844 B1 | 3/2019 | Ellis et al. | |
| 10,262,509 B1 | 4/2019 | Kourtney et al. | |
| 10,332,200 B1* | 6/2019 | Fournier | G06Q 40/00 |
| 10,367,912 B2 | 7/2019 | Saint Clair | |
| 10,484,437 B2 | 11/2019 | Banyai et al. | |
| 10,485,341 B2 | 11/2019 | Dash et al. | |
| 10,540,014 B2 | 1/2020 | Gribetz et al. | |
| 10,565,643 B2 | 2/2020 | Rohn et al. | |
| 10,567,481 B2 | 2/2020 | Dawson et al. | |
| 10,579,228 B2 | 3/2020 | Vida et al. | |
| 10,614,219 B2 | 4/2020 | Knapp et al. | |
| 10,735,709 B2 | 8/2020 | Moss et al. | |
| 10,891,688 B1 | 1/2021 | Clausen et al. | |
| 10,970,549 B1 | 4/2021 | Krishnan et al. | |
| 11,195,355 B1 | 12/2021 | Goetz et al. | |
| 2001/0037287 A1 | 11/2001 | Broadbent et al. | |
| 2002/0070964 A1 | 6/2002 | Botz et al. | |
| 2003/0069828 A1 | 4/2003 | Blazey et al. | |
| 2003/0108241 A1 | 6/2003 | Colmenarez et al. | |
| 2004/0075642 A1 | 4/2004 | Kisliakov | |
| 2004/0233216 A1 | 11/2004 | Rekimoto et al. | |
| 2005/0178074 A1 | 8/2005 | Kerosetz | |
| 2005/0185825 A1 | 8/2005 | Hoshino et al. | |
| 2005/0269404 A1 | 12/2005 | Landwirth et al. | |
| 2005/0289045 A1 | 12/2005 | Lawson | |
| 2006/0101508 A1 | 5/2006 | Taylor | |
| 2007/0296545 A1 | 12/2007 | Clare | |
| 2007/0296579 A1 | 12/2007 | Mayer et al. | |
| 2007/0300307 A1 | 12/2007 | Duncan | |
| 2009/0056599 A1 | 3/2009 | Turner et al. | |
| 2009/0174673 A1 | 7/2009 | Ciesla | |
| 2009/0315830 A1 | 12/2009 | Westerman | |
| 2010/0062811 A1* | 3/2010 | Park | H04M 1/72472 455/566 |
| 2010/0066667 A1 | 3/2010 | MacDougall et al. | |
| 2010/0238119 A1 | 9/2010 | Dubrovsky et al. | |
| 2010/0302168 A1 | 12/2010 | Giancarlo et al. | |
| 2011/0035695 A1 | 2/2011 | Fawcett et al. | |
| 2011/0256019 A1 | 10/2011 | Gruen et al. | |
| 2011/0260976 A1 | 10/2011 | Larsen et al. | |
| 2012/0032783 A1 | 2/2012 | Ahn et al. | |
| 2012/0119999 A1 | 5/2012 | Harris | |
| 2012/0204116 A1 | 8/2012 | Patil et al. | |
| 2012/0204117 A1* | 8/2012 | Patil | G06F 9/451 715/753 |
| 2012/0323717 A1* | 12/2012 | Kirsch | G06Q 20/3829 705/26.1 |
| 2013/0249947 A1 | 9/2013 | Reitan | |
| 2014/0012754 A1 | 1/2014 | Hanson et al. | |
| 2014/0168107 A1 | 6/2014 | Kim | |
| 2015/0020191 A1 | 1/2015 | Vida et al. | |
| 2015/0059002 A1* | 2/2015 | Balram | G06F 3/011 726/28 |
| 2015/0109099 A1 | 4/2015 | Birkel et al. | |
| 2015/0135101 A1 | 5/2015 | Ellis et al. | |
| 2015/0221035 A1 | 8/2015 | Anderson et al. | |
| 2015/0278534 A1 | 10/2015 | Thiyagarajan et al. | |
| 2015/0279310 A1 | 10/2015 | Itakura et al. | |
| 2016/0034901 A1 | 2/2016 | Ferren | |
| 2016/0037346 A1* | 2/2016 | Boettcher | H04W 12/04 455/411 |
| 2016/0071224 A1 | 3/2016 | Huang | |
| 2016/0180614 A1 | 6/2016 | Micali et al. | |
| 2016/0191576 A1 | 6/2016 | Thompson et al. | |
| 2017/0099453 A1 | 4/2017 | Junuzovic et al. | |
| 2017/0103440 A1 | 4/2017 | Xing et al. | |
| 2017/0115742 A1 | 4/2017 | Xing et al. | |
| 2017/0118645 A1 | 4/2017 | Zarakas et al. | |
| 2017/0169506 A1 | 6/2017 | Wishne et al. | |
| 2017/0180336 A1 | 6/2017 | Josephson et al. | |
| 2017/0227938 A1 | 8/2017 | Wexler et al. | |
| 2017/0278358 A1 | 9/2017 | Ino et al. | |
| 2017/0356218 A1 | 12/2017 | Beasley et al. | |
| 2018/0041493 A1 | 2/2018 | Wilkinson et al. | |
| 2018/0060812 A1 | 3/2018 | Robinson et al. | |
| 2018/0089349 A1 | 3/2018 | Rezgui | |
| 2018/0096386 A1 | 4/2018 | Aggarwal et al. | |
| 2018/0101985 A1 | 4/2018 | Jones-McFadden et al. | |
| 2018/0108207 A1 | 4/2018 | Lyons et al. | |
| 2018/0122187 A1 | 5/2018 | Moore et al. | |
| 2018/0247134 A1 | 8/2018 | Bulzacki et al. | |
| 2018/0268747 A1 | 9/2018 | Braun | |
| 2018/0293087 A1 | 10/2018 | Lee et al. | |
| 2018/0301111 A1 | 10/2018 | Park et al. | |
| 2018/0328099 A1 | 11/2018 | Whitaker et al. | |
| 2018/0356885 A1 | 12/2018 | Ross et al. | |
| 2018/0357850 A1 | 12/2018 | Moore et al. | |
| 2019/0019011 A1 | 1/2019 | Ross et al. | |
| 2019/0034895 A1 | 1/2019 | Camp | |
| 2019/0108524 A1 | 4/2019 | Nicholson et al. | |
| 2019/0114585 A1 | 4/2019 | Fee et al. | |
| 2019/0121522 A1* | 4/2019 | Davis | G06V 40/28 |
| 2019/0228494 A1 | 7/2019 | Stasi et al. | |
| 2019/0228609 A1 | 7/2019 | Nguyen et al. | |
| 2019/0268321 A1 | 8/2019 | Kim et al. | |
| 2019/0306709 A1 | 10/2019 | Kim et al. | |
| 2019/0328339 A1* | 10/2019 | Gujral | A61B 5/742 |
| 2019/0360259 A1 | 11/2019 | Green et al. | |
| 2020/0034106 A1 | 1/2020 | Jain et al. | |
| 2020/0056418 A1 | 2/2020 | Dobbins et al. | |
| 2020/0064960 A1 | 2/2020 | Munemoto | |
| 2020/0066079 A1 | 2/2020 | Swaine et al. | |
| 2020/0187694 A1 | 6/2020 | Santangeli et al. | |
| 2020/0218493 A1 | 7/2020 | Sim et al. | |

(56) References Cited

U.S. PATENT DOCUMENTS

2020/0301720 A1    9/2020  Choi
2022/0255920 A1*   8/2022  Bester .................. H04L 9/0894

FOREIGN PATENT DOCUMENTS

| CN | 108255462      | 7/2018 |
| CN | 109471687      | 3/2019 |
| CN | 109983491      | 7/2019 |
| EP | 2 919 209      | 9/2015 |
| JP | 6555129        | 8/2019 |
| KR | 2019002815     | 1/2019 |
| WO | WO-2019/019743 | 1/2019 |
| WO | WO-2019/098992 | 5/2019 |

OTHER PUBLICATIONS

Dani Deahl, This All-In-One Smart Desk Has Three Screens and a Built-In Scanner; Jun. 25, 2018. 2 Pages.
Scott Cary; How Capital One Taught Amazon's Alexa Ai Assistant to Help You Manage Your Money. Nov. 30, 2016; 4 Pages.
K. M. Everitt, et al. "DocuDesk: An interactive surface for creating and rehydrating many-to-many linkages among paper and digital documents," IEEE 2008, pp. 25-28, doi: 10.1109/TABLETOP.2008.4660179. (Year: 2008).

* cited by examiner

SMART TABLE SYSTEM UTILIZING EXTENDED REALITY

TECHNICAL FIELD

This application relates generally to the use of a smart table to improve efficiency and ease of conducting transactions at a provider location associated with a provider. More specifically, this application relates to systems and methods for using smart display tables and smart glasses for content customization of shared multi-dimensional graphical user interfaces.

BACKGROUND

Customers of a provider are able to access a variety of services through software applications, such as mobile applications on user devices, to perform various tasks. For example, customers may use an internet-enabled application to conduct transactions, change settings, and carry out other actions related to a customer account or with respect to a product offered by the provider. However, certain transactions and tasks may require a customer to visit a provider location (e.g., due to security, needing to meet with a provider representative).

SUMMARY

Some embodiments relate to a smart table system. The smart table system can include an interactive surface that can include a touchscreen and a plurality of interactive surface sensor devices. Further, the smart table system can include plurality of smart headsets that can include a transparent display and a plurality of smart headset sensor devices, each of the smart headsets configured to be respectively worn by an individual. Further, the smart table system can include a processing circuit, the processing circuits configured to generate graphical user interfaces for each of the smart headsets. Further, the processing circuit can be configured to provide the graphical user interfaces to each of the smart headsets. Further, the processing circuit can be configured to receive sensor device data associated with at least one of biological data, behavioral data, or a user input from at least one of the plurality of interactive surface sensor devices or the plurality of smart headset sensor devices. Further, the processing circuit can be configured to update, in response to receiving the sensor device data, a first graphical user interface for a first smart headset of the smart headsets based on the sensor device data, wherein the first graphical user interface is unique to the first smart headset and is worn by a first individual and update, in response to receiving the sensor device data, a second graphical user interface for a second smart headset of the smart headsets based on the sensor device data, and wherein the second graphical user interface is unique to the second smart headset and is worn by a second individual different than the first individual.

In some embodiments, each of the graphical user interfaces is configured to display content that is unique to each of the smart headsets and is based on at least on one of a user preference or the sensor device data and the user preference can include size and color parameters of a user, and wherein the processing circuit is configured to adjust content displayed on each of the graphical user interfaces. In various embodiments, the processing circuit can be configured to continuously update each of the graphical user interfaces in real-time, the graphical user interfaces including a combination of a set of views including content based on the sensor device data, wherein each of the set of views can include a subset of views and the set of views can include a table view and a plurality of smart headset views, and the subset of views comprises a customer view, a provider view, and a manager view, and wherein each of the subset of views can include different content unique to the individual. In some embodiments, the processing circuit can be further configured to receive, from a microphone, sound input from a customer, wherein the customer is the first individual, update the first graphical user interface of the first smart headset of the smart headsets based on the sound input, wherein the update can include updating first content of the first graphical user interface, and update the second graphical user interface of the second smart headset of the smart headsets based on the sound input, wherein the update can include updating second content of the second graphical user interface different from the first content. In various embodiments, the smart table system can further include a mobile device associated with a customer, wherein the customer is the first individual, the mobile device can be configured to communicate over a network with a network circuit of the smart table system and to provide authentication information of the customer to the network circuit, wherein the authentication information is at least one of a customer password, biometric data, or geometric information. In some embodiments, the biological data, the behavioral data, or the user input is indicative of at least one of a user sentiment, a user emotion, a user attentiveness, a user gesture, or a user preference.

Another example embodiment relates to a smart table system. The smart table system can include a plurality of devices including a camera, a microphone, and a stress sensor, each device configured to collect first device data. Further, the smart table system can include a plurality of smart headsets including a transparent display and coupled to a plurality of smart headset devices, the smart headset devices configured to collect second device data, wherein the second device data is smart headset device data, and each of the smart headsets configured to be worn by an individual. Further, the smart table system can include an interactive surface including a touchscreen and a processing circuit configured to generate graphical user interfaces for each of the smart headsets. Further, the processing circuit can be configured to provide the graphical user interfaces to a respective smart headset. Further, the processing circuit can be configured to update a first graphical user interface of the graphical user interfaces for a first smart headset of the smart headsets based on the first device data and the second device data, update a second graphical user interface of the graphical user interfaces for a second smart headset of the smart headsets based on the first device data and the second device data, and wherein the first graphical user interface is unique to the first smart headset and is worn by a first individual, and wherein the second graphical user interface is unique to the second smart headset and is worn by a second individual different than the first individual.

In some embodiments, each of the graphical user interfaces is configured to display content that is unique to each of the smart headsets and is based on at least one of a user preference, the first device data, or the second device data. In various embodiments, the processing circuit is configured to continuously update each of the graphical user interfaces in real-time, the graphical user interfaces can include a combination of a set of views including content based on the first device data and the second device data, wherein each of the set of views includes a subset of views. In some embodiments, the smart table system can further include a mobile device associated with a customer, wherein the customer is the first individual, the mobile device configured to communicate over a network with a network circuit of the smart table system, and configured to provide authentication information of the customer to the network circuit, wherein the authentication information is at least one of a customer password, biometric data, or geometric information.

An additional example embodiment relates to a smart system. The smart table system can include an interactive surface including a touchscreen and a plurality of interactive surface sensors. Further, the smart table system can include a plurality of smart headsets including a transparent display and a plurality of smart headset sensors, each of the smart headsets configured to be worn by an individual and a processing circuit configured to generate graphical user interfaces for each of the smart headsets. Further, the processing circuit can be configured to provide the graphical user interfaces to each of the smart headsets. Further, the processing circuit can be configured to receive sensor data associated with at least one of biological data, behavioral data, or a user input from at least one of the plurality of interactive surface sensors or the plurality of smart headset sensors. Further, the processing circuit can be configured to in response to receiving the sensor data, update a first graphical user interface for a first smart headset of the smart headsets based on the sensor data, wherein the first graphical user interface is unique to the first smart headset and is worn by a first individual, and in response to receiving the sensor data, update a second graphical user interface for a second smart headset of the smart headsets based on the sensor data, and wherein the second graphical user interface is unique to the second smart headset and is worn by a second individual different than the first individual.

In some embodiments, each of the graphical user interfaces is configured to display content that is unique to each of the smart headsets and is based on at least on one of a user preference or the sensor data and the user preference can include size and color parameters of a user, and wherein the processing circuit is configured to adjust content displayed on each of the graphical user interfaces In various embodiments, the processing circuit is configured to continuously update each of the graphical user interfaces in real-time, the graphical user interfaces can include a combination of a set of views including content based on the sensor data, wherein each of the set of views includes a subset of views, and the set of views can include a table view and a plurality of smart headset views, and the subset of views can include a customer view, a provider view, and a manager view, and wherein each of the set of views and each of the subset of views can include different content unique to the individual. In some embodiments, the processing circuit is further configured to receive, from a microphone, sound input from a customer, wherein the customer is the first individual, update the first graphical user interface of the first smart headset of the smart headsets based on the sound input, wherein the update can include updating content of the first graphical user interface, and update the second graphical user interface of the second smart headset of the smart headsets based on the sound input, wherein the update can include updating second content of the second graphical user interface different from the first content. In various embodiments, the smart system can further include a mobile device associated with a customer, wherein the customer is the first individual, the mobile device configured to communicate over a network with a network circuit of the smart table system and con- figured to provide authentication information of the customer to the network circuit, wherein the authentication information is at least one of a customer password, biometric data, or geometric information. In some embodiments, the biological data, the behavioral data, or the user input is indicative of at least one of a user sentiment, a user emotion, a user attentiveness, a user gesture, or a user preference.

These and other features, together with the organization and manner of operation thereof, will become apparent from the following detailed description when taken in conjunction with the accompanying drawings.

Figure 1A:
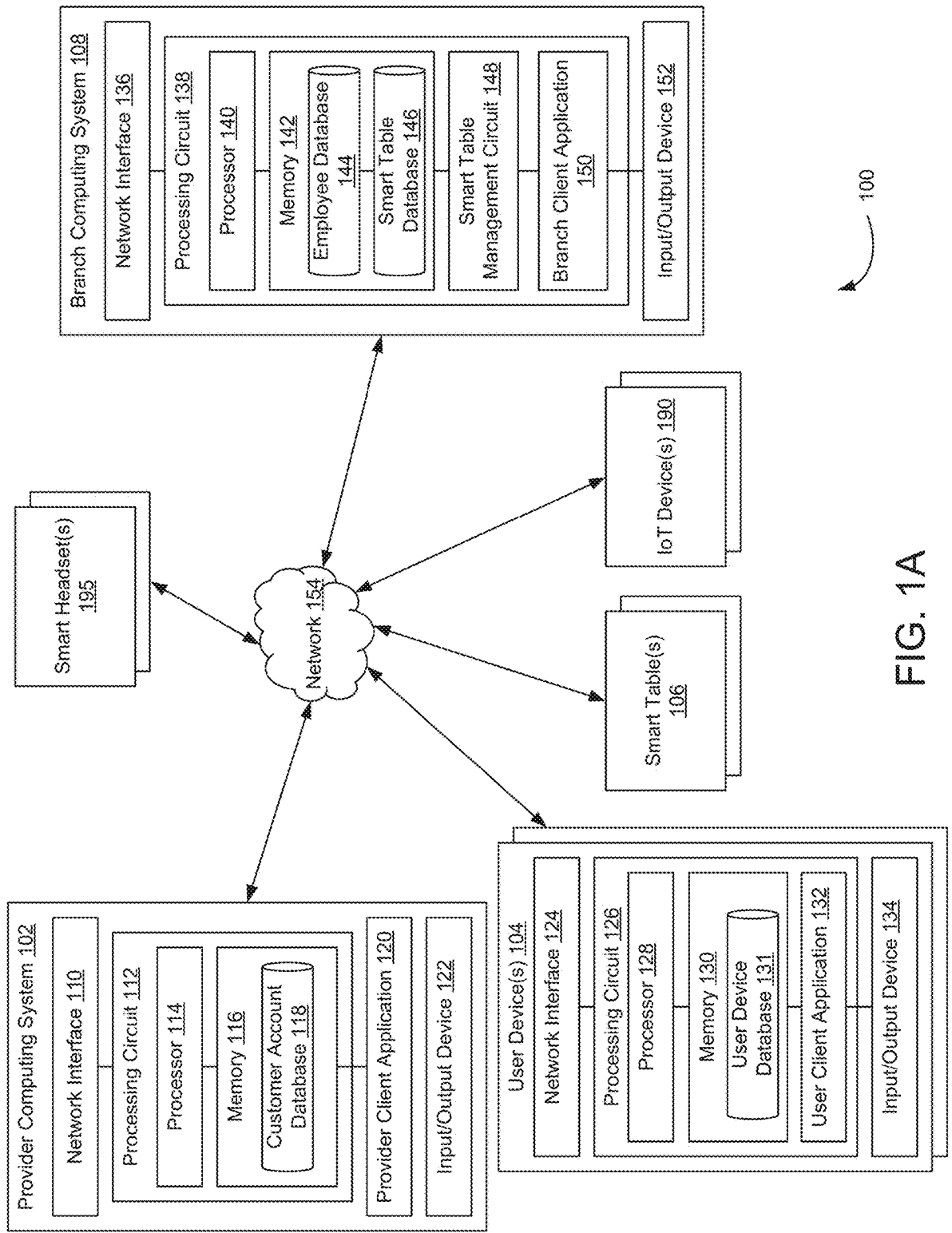
FIG. 1A is a block diagram of a smart table system including a provider computing system and a smart table, according to example embodiments.

It will be recognized that the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, the systems and methods relate generally to a smart table system and configuring content (e.g., shared multi-dimensional graphical user interface) on a plurality of user interactive devices based on real-time environment analysis and specific preferences of users. The content of the plurality of user interactive devices can be specific to a user such that each user can be presented unique content via a variety of views (e.g., customer, employee, manager, and so on). In some embodiments, the real-time environment analysis can include receiving sensor data (sometimes referred to herein as "IoT device data") from one or more sensors and updating content for one or more of the plurality of user interactive devices (e.g., smart headset, smart table, and so on). In various embodiments, the content can further be magnified, highlighted, colored, bolded, variously emphasized, and/or variously manipulated to draw the attention of a user and/or notify the user.

In many embodiments, a computing device (e.g., desktop computer, mobile device, smart device) can present a variety of content (e.g., within the viewport of the computing device) that is universal to the viewers such that the viewers can view the presented variety of content jointly. That is, the ability to view content unique to a viewer within a viewport of the computing device, such as when one or more viewers are viewing the computing device, they view different content, provides computing devices enhanced flexibility on how content is presented within the viewport of the computing device. This causal approach allows computing devices to produce significant improvements to the engagement and noticeability of content when presented through the viewport of computing devices. Therefore, the smart table system addresses problems in application development by providing an improved content management tool for the production and presentation of content.

Accordingly, the present disclosure is directed to a smart table system including systems and methods for configuring content based on the environment in which one or more users are present and sensors of various computing devices (e.g., smart table, smart headsets, IoT devices) within the environment. That is, the content viewed by a specific user can be unique (e.g., user specific) to the specific user based on environment data and sensor data associated with the specific user. In some implementations, the described systems and methods involve generating and providing a shared multi-dimensional graphical user interface (e.g., sometime referred to herein as a "multi-dimensional graphical user interface system"). The shared multi-dimensional graphical user interface enables a variety of computing devices to work in combination to present user specific content to one or more users. Providing the user specific graphical user interfaces within the viewport of the one or more computing devices leads to an improvement in the human-machine interaction process as the user is provided with improved control over the content. Furthermore, said user specific graphical user interfaces can ensure, for example, that the content is presented in a manner such that the user can understand, further improving the end user experience. Additionally, the user specific graphical user interfaces provides the end user with control over how the content is executed, providing an improved user interface.

The present disclosure can also provide improvements to traditional computing systems by providing a smart table system that can organize content on a graphical user interface based on the user preferences and environmental data (e.g., smart table, smart headsets, IoT devices, sensor data, and so on). Moreover, this technical solution enables smart table systems to customize user experiences on particular devices to improve engagement and noticeability of content when presented through the viewport of the computing device.

Therefore, aspects of the present disclosure also address problems in content presentation by providing improved presentation technology for the presentation of content on particular computer devices. In particular, the present disclosure addresses the technical challenges in interfacing by presenting personalized content. Moreover, the user specific graphical user interfaces that are provided based on sharing the processing load across a variety of computing devices can save processing power and other computing resources such as memory, reduce electrical power consumption by the computing devices described herein and reduce data transmissions via the computer network to reduce bandwidth requirements and usage of the data processing system (e.g., adapting to network traffic needs, leveraging storage on computing devices and sharing content via local communications networks (e.g., shared connection, Bluetooth™, NFC, and so on)).

Additionally, the present disclosure is directed to improvements of user interfaces for electronic device, thus improving upon conventional user interfaces to increase the efficiency of using electronic devices (e.g., smart tables, smart headsets, mobile devices, and so on). For example, said user specific graphical user interfaces can display on the screen tasks and indicators (e.g., icons, notifications, magnifications, and so on) that can be displayed and/or navigated to and displayed on various devices, such that the tasks and indicators display user specific data and can enable data to be selected and adjusted. In another example, one or more process circuits of the electronic devices can determine the amount of use (e.g., selected five times, utilized once, and so on) of each tasks and indicators over a period of time and determine how much memory has been allocated to various tasks and indicators over a period of time (e.g., tracking memory usage during sessions and over a period of a time) such that adjustments to the user interface can be done in real-time (e.g., end high memory usage processes, allocate more memory usage to certain processes, enable more memory for usage, and so on). Moreover, the present disclosure is directed to improvements of identity verification such that a user can be verified for sessions. For example, said identity verification can include provisioning a random code (e.g., token) to a communication device of the user and receive correspondence including authentication information (e.g., biometric data, token, geometric data) such that one or more processors of the provider can analyze and authenticate the user (e.g., cross-reference a token vault, cross-reference biometric templates, cross-reference latitude and longitude of known locations) for one or more sessions at the provider (e.g., automatically send a control signal to an input of the smart table system to provide access to view user interfaces on a smart headset and/or smart table).

Referring to FIG. 1A, a block diagram of a smart table system 100 is shown, according to potential embodiments. The smart table system 100 (e.g., sometimes referred to herein as the "multi-dimensional graphical user interface system") includes a provider computing system 102 associated with a provider, such as a service provider, bank, or financial institution (FI). The smart table system 100 further includes one or more user devices (e.g., user device 104), one or more smart tables (e.g., smart table 106), and a branch computing system 108 (e.g., a computing system of a branch location of the FI). In some embodiments, the provider computing system 102, user device 104 (as well as any additional user devices), smart table 106 (and any additional smart tables), IoT devices 190, smart headsets 195, and branch computing system 108 are directly communicably coupled. In some embodiments, the components of smart table system 100 may be communicably and operatively coupled to each other over a network, such as network 154, that permits the direct or indirect exchange of data, values, instructions, messages, and the like (represented by the double-headed arrows in FIG. 1A). The network 154 may include one or more of a cellular network, the Internet, Wi-Fi™, Wi-Max™, a proprietary provider network, a proprietary retail or service provider network, and/or any other kind of wireless or wired network.

Each system or device in smart table system 100 may include one or more processors, memories, network interfaces (sometimes referred to herein as a "network circuit") and user interfaces. The memory may store programming logic that, when executed by the processor, controls the operation of the corresponding computing system or device. The memory may also store data in databases. For example, memory 142 may store programming logic that when executed by processor 140 within processing circuit 138, causes employee database 144 to update information for an employee account with communications received from a user device 104. The network interfaces (e.g., network interface 110 of provider computing system 102, sometimes referred to herein as a "network circuit") may allow the computing systems and devices to communicate wirelessly or otherwise. The various components of devices in smart table system 100 may be implemented via hardware (e.g., circuitry), software (e.g., executable code), or any combination thereof. Devices and components in FIG. 1A can be added, deleted, integrated, separated, and/or rearranged in various embodiments of the disclosure.

The provider computing system 102 may be managed by a provider, such as a credit card issuer, a consultant, a retailer, a service provider, and/or the like. The provider computing system 102 includes a network interface 110, a processing circuit 112, and an input/output device 122. The network interface 110 is structured and used to establish connections with other computing systems and devices (e.g., the user devices 104, the smart tables 106, the branch computing system 108, etc.) via the network 154. The network interface 110 includes program logic that facilitates connection of the provider computing system 102 to the network 154. For example, the network interface 110 may include any combination of a wireless network transceiver (e.g., a cellular modem, a Bluetooth™ transceiver, a WiFi™ transceiver, etc.) and/or a wired network transceiver (e.g., an Ethernet transceiver). In some arrangements, the network interface 110 includes the hardware (e.g., processor, memory, and so on) and machine-readable media sufficient to support communication over multiple channels of data communication. Further, in some arrangements, the network interface 110 includes cryptography capabilities to establish a secure or relatively secure communication session in which data communicated over the session is encrypted. In various embodiments, the smart table system 100 can adapt to network traffic needs by compressing content, by any computing device described herein, and sending it (e.g., via network 154) to various other computing devices, by adjusting security filters to remove junk traffic off network 154 (e.g., by monitoring packets), and so on.

The processing circuit 112 includes a processor 114, a memory 116, and a provider client application 120. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the provider computing system 102 is configured to run a variety of application programs and store associated data in a database of the memory 116 (e.g., customer account database 118). One such application may be the provider client application 120.

The memory 116 may store a customer account database 118, according to some embodiments. The customer account database 118 may be configured to store updated personal information for customer accounts associated with the provider (e.g., the FI). For example, the customer account database 118 saves personal user information, such as name, age, gender, address, education, occupation, etc., customer preferences, such as notification preferences, security preferences, etc., and authentication information, such as customer passwords, biometric data for the customer, geometric information (e.g., latitude, longitude), etc. In some embodiments, the customer account database 118 includes a token vault that stores an associated customer token and/or device token for each customer account. The customer account database 118 may further be configured to store financial data for each customer account, such as past transactions, different provider account information (e.g., balances, debt, type of account, etc.), investments, loans, mortgages, and so on.

In some embodiments, the provider client application 120 may be incorporated with an existing application in use by the provider computing system 102 (e.g., a mobile provider application, a service provider application, etc.). In other embodiments, the provider client application 120 is a separate software application implemented on the provider computing system 102. The provider client application 120 may be downloaded by the provider computing system 102 prior to its usage, hard coded into the memory 116 of the provider computing system 102, or be a network-based or web-based interface application such that the provider computing system 102 may provide a web browser to access the application, which may be executed remotely from the provider computing system 102. Accordingly, the provider computing system 102 may include software and/or hardware capable of implementing a network-based or web-based application. For example, in some instances, the provider client application 120 includes software such as HTML, XML, WML, SGML, PHP (Hypertext Preprocessor), CGI, and like languages.

In the latter instance, a user (e.g., a provider employee) may log onto or access the web-based interface before usage of the application. In this regard, the provider client application 120 may be supported by a separate computing system (e.g., user device 104) including one or more servers, processors, network interface (sometimes referred to herein as a "network circuit"), and so on, that transmit applications for use to the provider computing system 102.

In certain embodiments, the provider client application 120 includes an application programming interface (API) and/or a software development kit (SDK) that facilitate the integration of other applications with the provider client application 120. For example, the provider client application 120 is configured to utilize the functionality of the branch computing system 108 by interacting with the branch client application 150 through an API.

Still referring to FIG. 1A, the input/output device 122 is structured to receive communications from and provide communications to provider employees associated with the provider computing system 102. The input/output device 122 is structured to exchange data, communications, instructions, etc. with an input/output component of the provider computing system 102. In one embodiment, the input/output device 122 includes communication circuitry for facilitating the exchange of data, values, messages, and the like between the input/output device 122 and the components of the provider computing system 102. In yet another embodiment, the input/output device 122 includes machine-readable media for facilitating the exchange of information between the input/output device and the components of the provider computing system 102. In yet another embodiment, the input/output device 122 includes any combination of hardware components, communication circuitry, and machine-readable media.

In some embodiments, the input/output device 122 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 122 may provide an interface for the user to interact with various applications (e.g., the provider client application 120) stored on the provider computing system 102. For example, the input/output device 122 includes a keyboard, a keypad, a mouse, joystick, a touch screen, a microphone, a biometric device, a virtual reality headset, smart glasses, smart headsets, and the like. As another example, input/output device 122, may include, but is not limited to, a television monitor, a computer monitor, a printer, a facsimile, a speaker, and so on. As used herein, virtual reality, augmented reality, and mixed reality may each be used interchangeably yet refer to any kind of extended reality, including virtual reality, augmented reality, and mixed reality.

The branch computing system 108 similarly includes a network interface 136, a processing circuit 138, and an input/output device 152. The network interface 136, the processing circuit 138, and the input/output device 152 may function substantially similar to and include the same or similar components as the components of provider computing system 102, such as the network interface 110, the processing circuit 112, and the input/output device 122, described above. As such, it should be understood that the description of the network interface 110, the processing circuit 112, and the input/output device 122 of the provider computing system 102 provided above may be similarly applied to the network interface 136, the processing circuit 138, and the input/output device 152 of the branch computing system 108.

For example, the network interface 136 is similarly structured and used to establish connections with other computing systems (e.g., the provider computing system 102, the user devices 104, and/or the smart tables 106) via the network 154. The network interface 136 may further include any or all of the components discussed above, with reference to the network interface 110.

The processing circuit 138 similarly includes a processor 140 and a memory 142. The processor 140 and the memory 142 are substantially similar to the processor 114 and the memory 116 described above, with reference to the provider computing system 102. In some embodiments, the memory 142 includes an employee database 144 and a smart table database 146. The employee database 144 may be structured to store data concerning each employee associated with the branch location. In some embodiments, the employee database 144 may store data regarding an identification number, a job position, authorization information, contact information, a schedule, customer history, work history, an associated user device 104, credentials, and so forth, of an employee that works at the branch location associated with the branch computing system 108. For example, the employee database 144 may save biometric information (e.g., a fingerprint scan, an eye scan, a voice memo, etc.) and a password (e.g., PIN, alphanumeric code, QR code, barcode, etc.) for each employee at the branch location. As another example, the employee database 144 stores security and data access rights for each employee that are utilized in conducting particular transactions (high-risk transactions, transactions with high-confidentiality customers, etc.).

Additionally, the employee database 144 may include the types of trainings each employee has received, the clearances (e.g., access) that each employee has obtained, a trustworthiness score for each employee, and any other pertinent information pertaining to each employee that may be used to determine the employees qualifications for performing various transactions and other tasks using a smart table 106.

The smart table database 146 may be structured to store data for each smart table 106 at the branch location. The smart table database 146 may save information regarding an identification number of each smart table 106, service history information (e.g., a last date a smart table was serviced for repairs and/or updates), transaction history information (e.g., number of customers that used the smart table 106), scheduling information (e.g., customers assigned to the smart table 106 for an upcoming smart table provider session, and/or power status (e.g., charging, operating on a low battery level, etc.). For example, the smart table database 146 may store a schedule of which customers will be using a particular smart table 106 at the branch location. Beneficially, this may allow for branch managers to more effectively plan out smart table provider sessions and decrease the likelihood of scheduling conflicts, such as two customers having conflicting sessions at the same smart table 106.

The processing circuit 138 also is shown to include a smart table management circuit 148. In some embodiments, the smart table management circuit 148 is configured to receive new data (e.g., from the network 154) relating to employees and smart tables 106 at a branch location. The smart table management circuit 148 may then update a correct, corresponding database (e.g., employee database 144 or smart table database 146). In some embodiments, the smart table management circuit 148 is configured to receive requests from customers for an appointment at a smart table 106. The smart table management circuit 148 may then schedule the appointment based on what the client wants to accomplish during the provider session (e.g., to ensure the assigned smart table 106 has the necessary capabilities, such as a functional cash dispenser, credit card printer, check depositor, biometric authenticator, and so on) and the available smart tables 106 during a time slot desired by the customer.

The smart table management circuit 148 may also be configured to identify which employees may be needed (e.g., based on experience and/or access) at a smart table 106 in order to conduct a planned transaction with a customer during a provider session. For example, in generating a request for a smart table provider session, a customer may be asked (e.g., via the user device 104 associated with the customer) what type of transaction or provider task does the customer want to complete during the smart table session. In some embodiments, the smart table management circuit 148 may generate and transmit a notification to user device 104 of an employee that a new smart table provider session, assigned to the employee, has been scheduled.

Although the employee database 144, smart table database 146, and smart table management circuit 148 are shown as being a part of the branch computing system 108, these components may alternatively be a part of the provider computing system 102 and/or integrated into one or more smart tables 106. In some embodiments, each of the provider computing system 102 and the branch computing system 108 may include a corresponding smart table management circuit the same as or similar to the smart table management circuit 148.

The branch computing system 108 is similarly structured as the provider computing system 102 to run a variety of application programs and store associated data in a database of the memory 142. One such application may be the branch client application 150, for example.

The branch client application 150 may be substantially similar to the provider client application 120, but may instead be tailored toward branch employees or a branch manager at the branch location. For example, branch client application 150 is structured to generate user interfaces to display on a smart table 106 to facilitate improved customer experiences and employee interactions during an established provider session. Particularly, the branch client application 150 is configured to communicate with the provider computing system 102, the user devices 104 (e.g., customer user devices and employee user devices), the IoT devices 190, the smart headsets 195, and smart tables 106 to receive instructions or documents from the provider computing system 102 and/or the branch computing system 108 to complete specific tasks during a provider session at a smart table 106. Furthermore, the branch client application 150 may be configured to communicate reminders to user devices 104 of employees regarding upcoming provider sessions at a smart table 106 and/or ongoing provider sessions at a smart table 106 to perform a task associated with the provider session. For example, the branch client application 150 may be configured to generate a reminder for a branch employee to prepare a smart table 106 for an upcoming provider session. Accordingly, the branch client application 150 is communicably coupled to the provider computing system 102 (e.g., through interactions with the provider client application 120), the user devices 104 (e.g., through interactions with the user client application 132), and the smart tables 106 (e.g., through interactions with the smart table client application 218 (FIG. 2A)).

The branch client application 150 may thus communicate with the provider computing system 102, the user device 104, and the smart tables 106 to perform a variety of functions. For example, the branch client application 150 is configured to reset a display of a smart table 106 (e.g., reset a display to a generic welcome display or sleep mode display) at the end of a provider session with a customer. As such, the branch client application 150 allows for a branch manager and branch employees associated with the branch location to monitor and update user interfaces of the smart tables 106 before, during, and after provider sessions with one or more customers paired to one of the smart tables 106.

The input/output device 152 may function substantially similarly to and include the same or similar components as the input/output device 122 described above, with reference to the provider computing system 102. Accordingly, it will be understood that the description of the input/output device 122 described above may also be applied to the input/output device 152 of the branch computing system 108. As an example, the input/output device 152 is similarly structured to receive communications from and provide communications to user devices 104 of branch employees and/or the branch manager associated with the branch computing system 108.

The smart table system 100 also includes one or more user devices 104, according to some embodiments. The user devices 104 may be a variety of suitable user computing devices. For example, the user devices 104 may comprise mobile phones. In other embodiments, the user devices 104 include personal computers (e.g., desktop computers or laptop computers), tablets, smart watches or other wearable devices (e.g., rings, jewelry, headsets, bands), smart glasses, headphones, smart vehicle voice/touch command systems, virtual/augmented reality (VR/AR) systems (e.g., smart glasses, smart headsets), appliances, internet of things (IoT) devices, voice assistants, at-home touch screen display systems, and/or any other suitable user computing devices capable of accessing and communicating using local and/or global networks (e.g., the network 154). The user devices 104 may be associated with employees or with customers of the provider (e.g., customers at the FI). As such, the customer account database 118 may be further configured to store device information concerning each user device 104 associated with a customer of the provider. Similarly, the employee database 144 may be further configured to store device information pertaining to each user device 104 of an employee at a branch location. For example, the device information may include a device form (e.g., the type of user device 104), a set of device capabilities (e.g., types of input/output devices, device mobility, operating system, installed applications, camera capabilities, device communication capabilities, and so on), device location information (e.g., geolocation data such as, latitude and longitude information), and/or device identification and authentication information (e.g., an encrypted device token for each user device 104, user authentication information, such as a PIN or biometric data, associated with each user device 104, etc.).

The user devices 104 may each similarly include a network interface 124, a processing circuit 126, and an input/output device 134. The network interface 124, the processing circuit 126, and the input/output device 134 may be structured and function substantially similar to and include the same or similar components as the network interface 110, the processing circuit 112, and the input/output device 122 described above, with reference to the provider computing system 102. Therefore, it should be understood that the description of the network interface 110, the processing circuit 112, and the input/output device 122 of the provider computing system 102 provided above may be similarly applied to the network interface 124, the processing circuit 126, and the input/output device 134 of each of the user devices 104.

In some embodiments, the network interface 124 is similarly structured and used to establish connections with other computing systems (e.g., the provider computing system 102, the branch computing system 108, other user devices 104, and the smart tables 106) via the network 154. The network interface 124 may further include any or all of the components discussed above, with reference to the network interface 110.

The processing circuit 126 similarly includes a memory 130 and a processor 128. The memory 130 and the processor 128 are substantially similar to the memory 116 and the processor 114 described above. Accordingly, the user devices 104 are similarly configured to run a variety of application programs and store associated data in a database of the memory 130 (e.g., user device database 131). For example, the user devices 104 may be configured to run an application such as the user client application 132 that is stored in the user device database 131. In another example, the user devices 104 may be configured to store various user data, such as, but not limited to, personal user device information (e.g., names, addresses, phone numbers, contacts, call logs, installed applications, and so on), user device authentication information (e.g., username/password combinations, device authentication tokens, security question answers, unique client identifiers, biometric data (such as digital representations of biometrics), geographic data, social media data, application specific data, and so on), and user device provider information (e.g., token information, account numbers, account balances, available credit, credit history, exchange histories, and so on) relating to the various accounts.

The user client application 132 may be substantially similar to the provider client application 120, the branch client application 150, and the smart table client application 218 (FIG. 2A), but may instead be specifically tailored to the user associated with the user devices 104. For example, the user client application 132 is similarly structured to selectively provide displays and/or audio/visual communications to each user device 104 to allow for improved interactions between a customer and branch employees, branch managers, and provider employees.

Particularly, the user client application 132 is configured to communicate with the provider computing system 102, the branch computing system 108, and the smart tables 106 to facilitate user interactions with a smart table 106 during a provider session at a branch location. As such, the user devices 104 are communicably coupled to the provider computing system 102 (e.g., through interactions with the provider client application 120), the branch computing system 108 (e.g., through interactions with the branch client application 150), and the smart tables 106 (e.g., through interactions with the smart table client application 218 (FIG. 2A)).

The user client application 132 may therefore communicate with the provider computing system 102, the smart tables 106, and the branch computing system 108 to perform a variety of functions. For example, the user client application 132 is similarly configured to receive user inputs (e.g., via a user interface of the user device 104) to complete provider interactions during a user session with a smart table 106, depending on whether the individual associated with the user device 104 is an employee or a customer. Additionally, the user client application 132 is configured to output information to a display of the user device 104 regarding information on the provider interaction. For example, the user client application 132 is configured to generate a user interface to show graphics regarding a financial history of a customer.

The user client application 132 is further configured to allow for communication with the provider client application 120 to allow a user associated with the various user devices 104 to update account information and/or provide feedback during a provider session with a smart table 106. Accordingly, the user client application 132 facilitates effective communication with a branch manager, other branch employees, the provider employees, and/or other customers (e.g., during a provider session with two customers, such as a mother and daughter) during a connected session with a smart table 106.

The user client application 132 may also be structured to allow the user devices 104 to retrieve and submit documents, forms, and/or any type of necessary information to and/or from a smart table 106 during an established session, as required to complete certain financial tasks. In some instances, the user client application 132 may be configured to automatically retrieve and/or submit documents, forms, or other necessary information to and/or from a smart table 106 in response to the establishment of a secure connection to the smart table 106. In some embodiments, the user client application 132 may be configured to temporarily store the various documents, forms, and/or necessary information, which may then be selectively transmitted to the smart table 106 in response to a user input from a customer or employee (e.g., received via the input/output device 134).

In some embodiments, the user client application 132 may be configured to temporarily store the various documents, forms, and/or necessary information and then selectively transmit the various documents, forms, and/or necessary information to the smart table 106 in response to a customer's arrival at a branch location. For example, the user device 104 may automatically connect to the branch computing system 108 and/or the one or more smart tables 106 when the user device 104 is within range of a network or communication device associated with the branch computing system 104 and/or the one or more smart tables 106.

In some embodiments, a customer or employee may identify various levels of authority associated with each of the user devices 104. For example, in some implementations, a user may set a first user device 104 as a primary user device and a second user device 104 as a secondary user device. In some instances, there may be various approved users of the user devices 104, excluding the user, such as family members, caretakers, business partners for customers, or other branch employees, a branch manager, a supervising employee for employees at the branch location. As such, in some embodiments, a primary user device may have the authority to veto or cancel the actions taken by a secondary user device.

Furthermore, the user client application 132 may be configured to provide a device status for each user device 104 and/or each pair of smart headsets 195 to the provider session management circuit 210 (FIG. 2A) of a smart table 106. The device status may include both a device location and an indication of whether the respective user device 104 and/or each pair of smart headsets 195 is active (e.g., turned on, connected to the internet, active notifications, within a specific distance, communicating with a beacon, currently used, any combination, and so on). For example, the user client application 132 may be configured to automatically, periodically, and/or selectively provide geographical location information (e.g., latitude and longitude) to the provider session management circuit 210. Additionally, the user client application 132 may be configured to send the provider session management circuit 210 a notification and/or an update when a given user device 104 is active.

In some embodiments, a user device 104 may be considered active if, for example, the user device 104 is currently being used (e.g., by a customer or by an employee during a provider session with a smart table 106), a user has indicated that the provider computing system 102, the branch computing system 108, and/or the smart tables 106 are permitted to send/retrieve data to/from the user device 104, and/or the user device 104 is within a predetermined distance from the branch computing system 108 or one of the smart tables 106. In some embodiments, there may be additional manners in which the user device 104 may be considered active.

The input/output device 134 of each user device 104 may function substantially similar to and include the same or similar components as the input/output device 122 previously described, with reference to the provider computing system 102. As such, it should be understood that the description of the input/output device 122 provided above may also be applied to the input/output device 134 of each of the user devices 104. In some embodiments, the input/output device 134 of each user device 104 is similarly structured to receive communications from and provide communications to a user (e.g., customer or employee) associated with the plurality of user devices 104.

For example, the input/output device 134 may include one or more user interfaces, which may include one or more biometric sensors (such as an iris scanner, a fingerprint scanner, a heart monitor that identifies cardiovascular signals, etc.). The input/output device 134 may also include components that provide perceptible outputs (such as displays and light sources for visually-perceptible elements, a speaker for audible elements, and haptics for perceptible signaling via touch, etc.) and/or that permit the user to enter inputs (such as a stylus or force sensor for detecting pressure on a display screen). One or more user devices 104 may include one or more location sensors to allow the user devices 104 to detect its location relative to other physical objects (e.g., a smart table 106 or other user devices) or geographic locations. Example location sensors may include global positioning system (GPS) devices and other navigation and geolocation devices, digital compasses, gyroscopes and other orientation sensors, as well as proximity sensors or other sensors that permit the user device 104 to determine the presence and relative distance of nearby devices, objects, and/or locations.

Still referring to FIG. 1A, the smart table system 100 includes one or more smart tables 106. The smart tables 106 may be tables of varying sizes integrated with cash handling endpoints. Furthermore, the smart tables 106 may provide a shared graphical user interface for various scenarios. In some embodiments, each of the smart tables 106 are associated with a smart table identifier, such as a numeric or alphanumeric code, to identify the respective smart table to the branch computing system 108, the IoT devices 190, the smart headsets 195, the provider computing system 102, and the user devices 104. For example, in response to walking into a lobby of a branch location for a scheduled provider session, a user device 104 associated with the customer may indicate to the customer which smart table 106 to go to in order to initiate the session. While described with regards to a FI, the smart tables 106 may be used in other scenarios. For example, the smart tables 106 may be used at a car dealership or car rental company, a hotel, a booking agent, and/or a medical office. The features of the smart tables 106 are described in greater detail below, with reference to FIG. 2A.

The smart table system 100 can include one or more internet of things devices 190 (collectively referred to herein as "IoT devices 190"), according to some embodiments. The IoT devices 190 can be disposed in various locations within an area, according to some embodiments. The IoT devices 190 can be configured within network 154 (e.g., wired and/or wireless network), according to some embodiments. The IoT devices 190 can communicate data with various systems described herein. For example, the IoT devices 190 can include cameras that can communicate videography and/or photography to the smart table 106 and/or smart headset 195. In another example, the IoT devices 190 can include a haptic sensor that can communicate force exerted by a user to the smart tables 106. In various implementations, the IoT devices 190 can be new or potentially legacy IoT devices 190 that are already in the building where the smart table system 100 is located and/or integrated in computing devices described herein (e.g., IoT devices 410 and 510) such that the existing infrastructure can be utilized.

Each IoT device can include one or more processors (e.g., any general purpose or special purpose processor), and can include and/or be operably coupled to one or more transitory and/or non-transitory storage mediums and/or memory devices (e.g., any computer-readable storage media, such as a magnetic storage, optical storage, flash storage, RAM, etc.). In various implementations, one or more IoT Devices (e.g., of the IoT Devices 190) can be implemented as separate systems or integrated within a single system. The IoT devices 190 may be configured to communicate over network 154 via a variety of architectures (e.g., client/server, peer-to-peer, etc.). The IoT devices 190 can be configured to provide a variety of interfaces for scene recognition (e.g., facial recognition, track movement, identify objects, adjust light, adjust angles, and so on).

The IoT devices 190 can include, but are not limited to, any or all user mobile devices (phones, GPS devices), network enabled devices, acoustic sensors, infrared (IR) counter sensors, cameras (e.g., of any wavelength and including low resolution cameras, high resolution cameras, infrared, artificial intelligence cameras, etc.), radio-frequency identification (RFID) sensors, Bluetooth™ low energy (BLE) beacon sensors, near field communication (NFC) sensors, IP microphones, decibel meter, a passive infrared (PIR) sensors, infrared (IR) sensors, seismometers, barometers, relays, haptic sensors, touch screen sensors, electrooculography (EOG) sensors, electroencephalography (EEG) sensors, Wi-Fi™ triangulation sensors, geolocation sensors, pulse oximetry's (detect oxygen saturation of blood), altitude sensors, humidity sensors, magnetometers, accelerometers, gyroscopes, stress sensors (e.g., Galvanic Skin Response (GSR) sensor, sweat sensor, heart rate sensor, pulse wave sensor), desktop computers, laptops or notepad computers, mobile devices (e.g., user devices 104) such as tablets or electronic pads, personal digital assistants, smart phones, smart jewelry (e.g., ring, band, neckless), motion sensors, video gaming devices, virtual reality headsets, smart glasses (e.g., smart headsets 195), televisions or television auxiliary boxes (also known as set-top boxes), kiosks, hosted virtual desktops, or any other such device capable of exchanging information via the network 154.

The smart table system 100 can use a combination of different types of IoT devices 190 connected within a network (or outside a network) (e.g., network 154) to perform automatic scene recognition (e.g., facial recognition, track movement, identify objects, adjust light, adjust angles, and so on). In various implementations, the IoT devices 190 can be utilized to perform various tasks. For example, the cameras can be used for facial or cranial recognition, according to some embodiments. In various implementations, cameras can be used for general object identification (e.g. finding a person, finding a vehicle, scanning documents, authenticating individuals, and so on). In another example, the cameras can also be used to calculate the number of people in a room and/or at a table, according to some embodiments. In yet another example, the cameras, stress sensors, EEG sensors, EOG sensors, can be used to analyze people's gait or emotional state, according to some embodiments. In yet another example, the cameras can be used to identify dangerous objects (e.g., weapons, dangerous chemicals, etc.). In some implementations, the IoT devices 190 can be used to assemble/create objects from multiple photos and/or videos. The IR sensors can detect people in any light environment (e.g., bright light, dark light, etc.), according to some embodiments. The IR sensors, user devices 104, NFC sensors, cameras, PIR sensors, Wi-Fi™ triangulation sensors, can be used to count people anonymously, or designate people by role (e.g., staff, visitors, vendors, student, manager, construction worker, manufacturer worker, etc.). The Wi-Fi™ triangulation sensor can be used to locate mobile devices that are connected to a Wi-Fi™ network, according to some embodiments. The BLE beacon sensors can be used to provide a precise location of people who may carry a mobile device, or may carry a beacon (e.g., a work ID, card key, etc.), according to some embodiments. The smart table system 100 may determine a total number of people within an area using multiple IoT devices 190 at the same time, according to some embodiments. In various embodiments, the IoT devices 190 (also referred to herein as "input/output devices") can be integrated in any device and/or system described herein (e.g., in the smart table 106, in the smart headsets 195, and so on).

In various embodiments, the smart table system 100 includes one or more smart headsets 195. The smart headsets 195 may be headsets of varying sizes integrated with integrated with various input/output devices (e.g., sensors, IoT devices, cameras). Furthermore, the smart headsets 195 may provide a shared multi-dimensional graphical user interface for various scenarios. In some embodiments, each smart headsets 195 are associated with a smart headset identifier, such as a numeric or alphanumeric code, to identify the respective smart headset to the branch computing system 108, the provider computing system 102, and the user devices 104. For example, in response to walking into a lobby of a branch location for a scheduled provider session, a user device 104 associated with the customer may indicate to the customer which smart table 106 to go and which of the smart headsets 195 to wear in order to initiate the session. While described with regards to a FI, the smart headsets 195 may be used in other scenarios. For example, the smart headsets 195 may be used at a car dealership or car rental company, a hotel, a booking agent, and/or a medical office. The features of the smart headsets 195 are described in greater detail below, with reference to FIG. 2B.

Figure 1B:
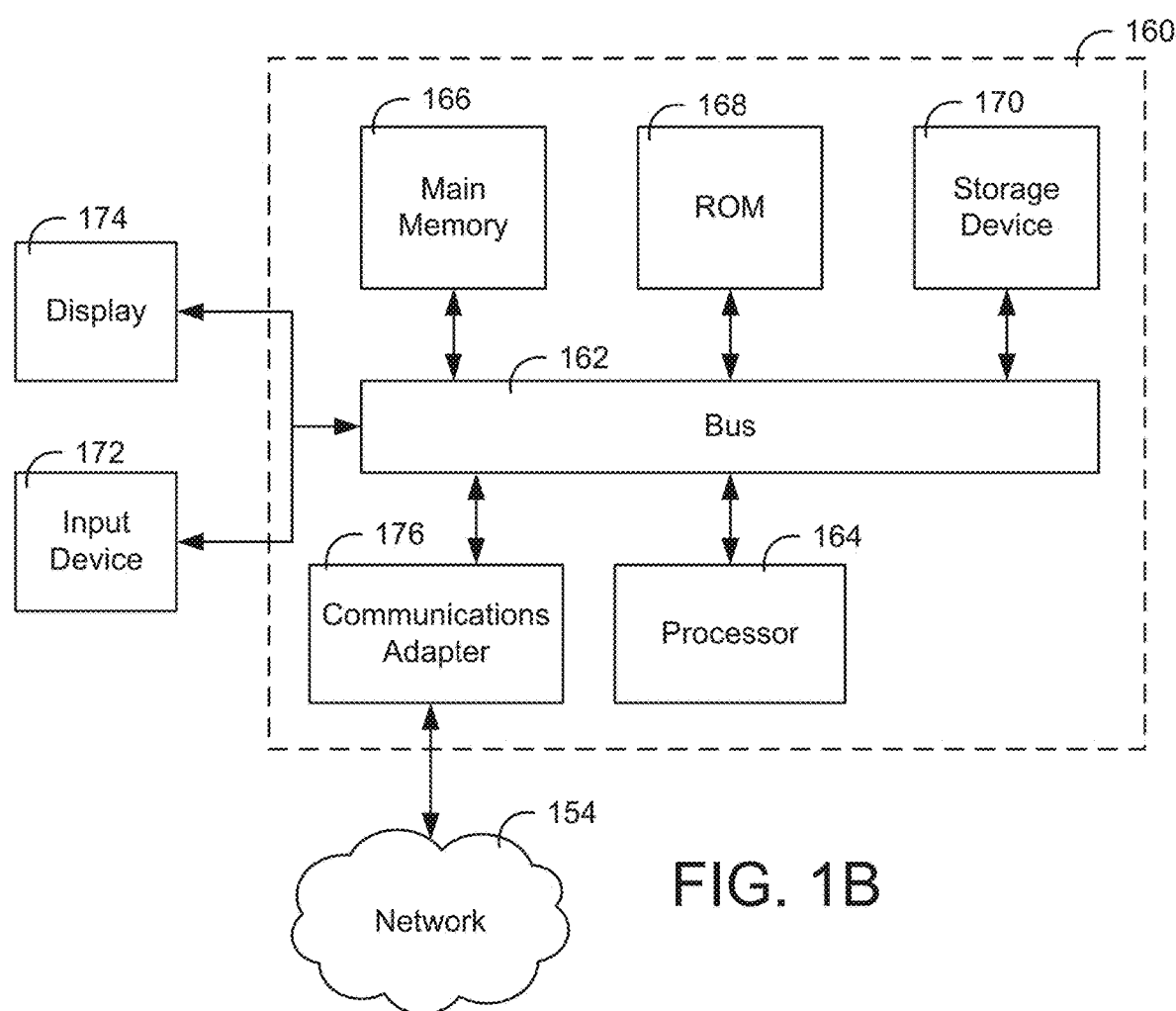
FIG. 1B is a block diagram illustrating an example computing system suitable for use in the example embodiments described herein.

FIG. 1B illustrates a depiction of a computing system 160 that can be used, for example, to implement a smart table system 100, provider computing system 102, user device 104, smart tables 106, branch computing system 108, and/or various other example systems described in the present disclosure. The computing system 160 includes a bus 162 or other communication component for communicating information and a processor 164 coupled to the bus 162 for processing information. The computing system 160 also includes main memory 166, such as a random-access memory (RAM) or other dynamic storage device, coupled to the bus 162 for storing information, and instructions to be executed by the processor 164. Main memory 166 can also be used for storing position information, temporary variables, or other intermediate information during execution of instructions by the processor 164. The computing system 160 may further include a read only memory (ROM) 168 or other static storage device coupled to the bus 162 for storing static information and instructions for the processor 164. A storage device 170, such as a solid-state device, magnetic disk or optical disk, is coupled to the bus 162 for persistently storing information and instructions.

The computing system 160 may be coupled via the bus 162 to a display 174, such as a liquid crystal display, or active matrix display, for displaying information to a user. An input device 172, such as a keyboard including alphanumeric and other keys, may be coupled to the bus 162 for communicating information, and command selections to the processor 164. In another arrangement, the input device 172 has a touch screen display 174. The input device 172 can include any type of biometric sensor, a cursor control, such as a mouse, a trackball, or cursor direction keys, for communicating direction information and command selections to the processor 164 and for controlling cursor movement on the display 174.

In some arrangements, the computing system 160 may include a communications adapter 176, such as a networking adapter. Communications adapter 176 may be coupled to bus 162 and may be configured to enable communications with a computing or communications network 154 and/or other computing systems. In various illustrative arrangements, any type of networking configuration may be achieved using communications adapter 176, such as wired (e.g., via Ethernet), wireless (e.g., via WiFi™, Bluetooth™, and so on), satellite (e.g., via GPS) pre-configured, ad-hoc, LAN, WAN, and so on.

According to various arrangements, the processes that effectuate illustrative arrangements that are described herein can be achieved by the computing system 160 in response to the processor 164 executing an arrangement of instructions contained in main memory 166. Such instructions can be read into main memory 166 from another computer-readable medium, such as the storage device 170. Execution of the arrangement of instructions contained in main memory 166 causes the computing system 160 to perform the illustrative processes described herein. One or more processors in a multi-processing arrangement may also be employed to execute the instructions contained in main memory 166. In alternative arrangements, hard-wired circuitry may be used in place of or in combination with software instructions to implement illustrative arrangements. Thus, arrangements are not limited to any specific combination of hardware circuitry and software.

Although an example processing system has been described in FIG. 1B, arrangements of the subject matter and the functional operations disclosed herein can be carried out using other types of digital electronic circuitry, or in computer software (e.g., application, blockchain, distributed ledger technology) embodied on a tangible medium, firmware, or hardware, including the structures disclosed in this application and their structural equivalents, or in combinations of one or more of them. Arrangements of the subject matter disclosed herein can be implemented as one or more computer programs, e.g., one or more subsystems of computer program instructions, encoded on one or more computer storage medium for execution by, or to control the operation of, a data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 1B as singular, stand-alone devices, one of ordinary skill in the art will appreciate that, in some arrangements, the computing system 160 may comprise virtualized systems and/or system resources. For example, in some arrangements, the computing system 160 may be a virtual switch, virtual router, virtual host, virtual server, etc. In various arrangements, computing system 160 may share physical storage, hardware, and other resources with other virtual machines. In some arrangements, virtual resources of the network 154 (e.g., network 154 of FIG. 1A) may include cloud computing resources such that a virtual resource may rely on distributed processing across more than one physical processor, distributed memory, etc.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.).

Figures 2A, 2B:
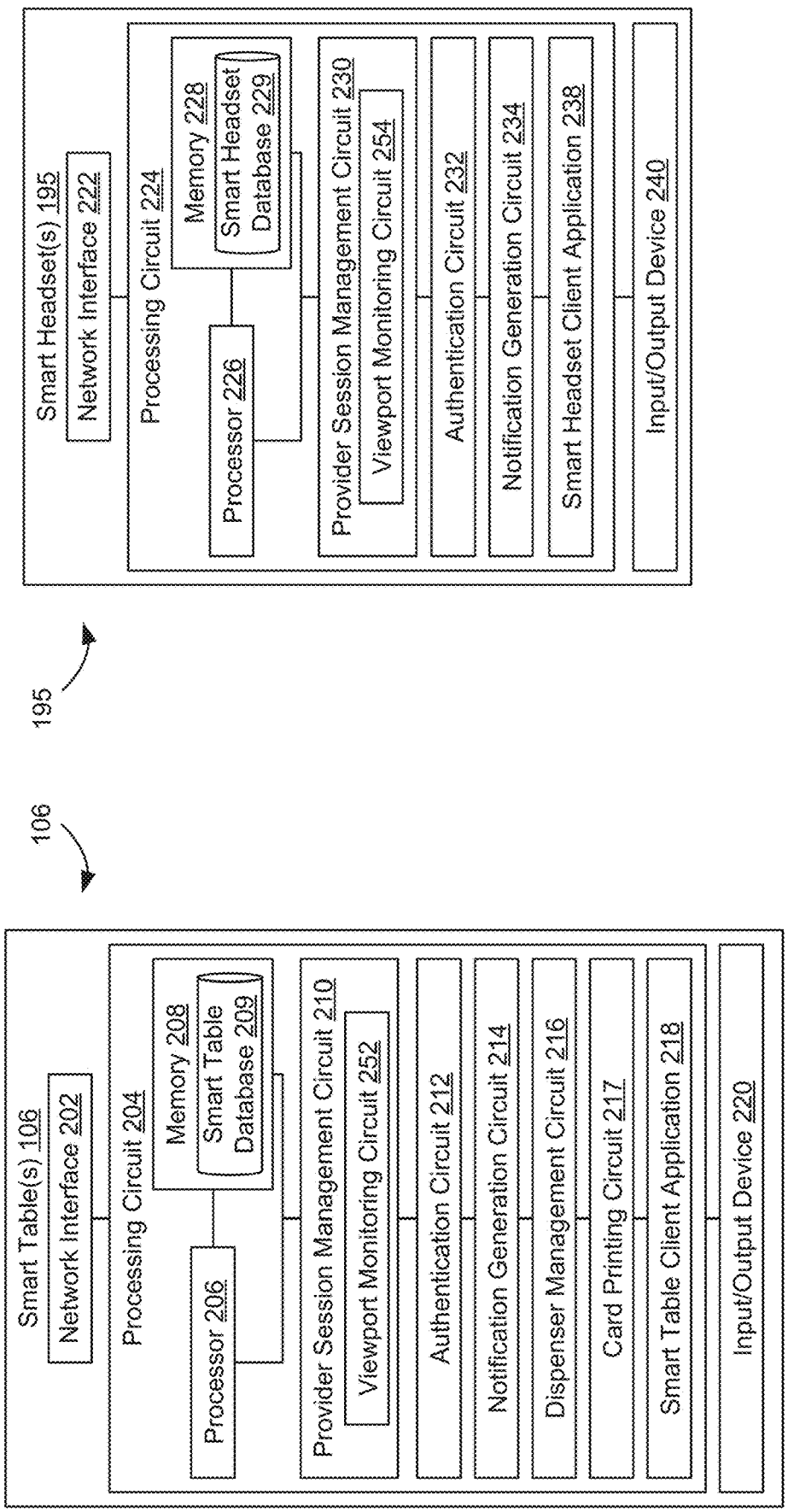
FIG. 2A is a block diagram of the smart table of FIG. 1A, according to example embodiments.
FIG. 2B is a block diagram of the smart headsets of FIG. 1A, according to example embodiments.

Referring now to FIG. 2A, a block diagram of the smart tables 106 is shown, according to some embodiments. The smart tables 106 each similarly include a network interface 202, a processing circuit 204, and an input/output device 220. The network interface 202, the processing circuit 204, and the input/output device 220 may function substantially similar to and include the same or similar components as the network interface 110, the processing circuit 112, and the input/output device 122 described above, with reference to the provider computing system 102. Thus, it should be understood that the description of the network interface 110, the processing circuit 112, and the input/output device 122 of the provider computing system 102 provided above may be similarly applied to the network interface 202, the processing circuit 204, and the input/output device 220 of each of the smart tables 106.

For example, the network interface 202 is similarly structured and used to establish connections with other computing systems (e.g., the provider computing system 102, the branch computing system 108, the user devices 104, the smart headsets 195) via the network 154. The network interface 202 may further include any and/or all of the components discussed above, with reference to the network interface 110.

The processing circuit 204 similarly includes a processor 206 and a memory 208. The processor 206 and the memory 208 are substantially similar to the processor 114 and the memory 116 described above. As such, the smart tables 106 are similarly configured to run a variety of application programs and store associated data in a database (e.g., smart table database 209) of the memory 208. For example, the smart tables 106 may be configured to run the smart table client application 218 that is stored in the smart table database 209. In another example, the smart tables 106 may be configured to store various provider and user data, such as, but not limited to, personal information (e.g., names, addresses, phone numbers, contacts, call logs, installed applications, and so on), authentication information (e.g., username/password combinations, device authentication tokens (e.g., pseudo-random code), security question answers, unique client identifiers, biometric data (such as digital representations of biometrics), geographic data, social media data, application specific data, and so on), and provider information (e.g., token information, account numbers, account balances, available credit, credit history, exchange histories, and so on) relating to the various users and/or various accounts.

The smart table client application 218 may be substantially similar to the provider client application 120 and the branch client application 150, but may instead be specifically for personalized provider sessions between customers and employees at the provider. For example, the smart table client application 218 is similarly structured to provide displays to each customer user device 104 to facilitate improved interactions between customers and specific branch employees associated with each smart table 106. Particularly, smart table client application 218 is configured to communicate with the provider computing system 102, the branch computing system 108, the user devices 104, and the smart headsets 195, to receive instructions and notifications from the provider computing system 102 and/or the branch computing system 104 for the branch employees associated with each smart table 106 to perform various tasks associated with a provider session. Accordingly, the smart tables 106 are communicably coupled to the provider computing system 102 (e.g., through interactions with the provider client application 120), the branch computing system 108 (e.g., through interactions with the branch client application 150), the user devices 104 (e.g., through interactions with the user client application 132), via a network (e.g., network 154), and the smart headsets 195 (e.g., through interactions with the smart headset client application 238), via a network (e.g., network 154).

The smart table client application 218 may therefore communicate with the provider computing system 102, the branch computing system 108, the user devices 104, and the smart headsets 195, to perform several functions. For example, the smart table client application 218 is configured to receive data from the provider computing system 102 and/or the branch computing system 104 pertaining to necessary inputs for authenticating a particular transaction during a provider session. The smart table client application 218 is further configured to allow for communication with the provider client application 120 to allow the various branch employees that operate the smart tables 106 to provide questions or comments regarding any concerns with the smart tables. As such, the smart table client application 218 allows for the branch employees associated with the smart tables 106 to communicate with the customer, branch manager, and/or provider employees throughout the process of a provider session.

The input/output device 220 of each smart table 106 may function substantially similar to and include the same or similar components as the input/output device 134 described above, with reference to the user devices 104. Accordingly, it should be understood that the description of the input/output device 134 provided above may also be applied to the input/output device 220 of each of the smart tables 106. For example, the input/output device 220 of each smart table 106 is similarly structured to receive communications from and provide communications to customers paired (e.g., via a network connection, communicably coupled, via Bluetooth™, via a shared connection, and so on) with a smart table 106 and to the branch employee or branch employees associated with each smart table 106.

The processing circuit 204 also includes a provider session management circuit 210, a viewport monitoring circuit 252, an authentication circuit 212, a notification generation circuit 214, and a cash dispenser management circuit 216, for example. In other embodiments, the processing circuit 204 may contain more or less components than shown in FIG. 2A. The components of FIG. 2A are meant for illustrative purposes only, and should not be regarded as limiting in any manner. The provider session management circuit 210 may be configured to detect a trigger event for a provider session with the smart table 106. A provider session may include one customer (e.g., the smart table 106 is configured as a self-service ATM), a branch employee and a customer, a branch employee and more than one customer, and/or more than one branch employee and a customer, and/or more than one branch employee and more than one customer, according to some embodiments. For example, two customers that have a joint account together may participate in a provider session with a branch employee. In some embodiments, a trigger event includes detecting a user device 104 within a communication range of the smart table 106. In other embodiments, a trigger event includes the activation of a selectable icon on a graphical user interface of the smart table 106. In response to detecting a trigger event, the provider session management circuit 210 may be configured to send instructions to the notification generation circuit 214 to request input for customer and/or employee authentication.

In some embodiments, the provider session management circuit 210 is further configured to receive sensor data from the input/output device 220 of the smart table 106. For example, the provider session management circuit 210 may be configured to receive camera data of documents that a customer wants to scan and save, movement data from a motion detector, temperature sensor data, audio data indicating a selection and/or action, haptic feedback indicating selection action, and so on. Additionally, the provider session management circuit 210 may determine when to send reminders to a user device 104 and/or smart headset 195 of the branch employee regarding a provider session (e.g., to fill out a certain form, an individual's stress level, elevated access, manager help, to pre-load a compartment of the smart table 106) and/or when to send a session end reminder for a scheduled provider session. For example, the provider session management circuit 210 may be configured to track how much time is remaining in a scheduled session to wrap up a provider interaction with the customer.

In some embodiments, the provider session management circuit 210 can further be configured to generate content for display to users (e.g., employees, users, managers, and so on). The content can be selected from among various resources (e.g., webpages, applications, databases, and so on). The provider session management circuit 210 is also structured to provide content (e.g., graphical user interface (GUI)) to the smart tables 106 and smart headsets 195, over the network 154, for display within the resources. For example, in various arrangement, a customized dashboard may be integrated in an institution's application (e.g., provider client application 120, branch client application 150, user client application 132, and smart table client application 218 of FIG. 2) or provided via an internet browser. In various embodiments, the content from which the provider session management circuit 210 selects may be provided by the provider computing system 102 and/or branch computing system 108 (e.g., via the network 154) to one or more smart tables 106 and/or smart headsets 195. In some implementations, provider session management circuit 210 may select content to be displayed on the user devices 104. In various implementations, the provider session management circuit 210 may determine content to be generated and published in one or more content interfaces of resources (e.g., webpages, applications, and so on).

In various embodiments, the provider session management circuit can include a viewport monitoring circuit 252. The viewport monitoring circuit 252 can be configured to cause the smart table 106 to identify a plurality of coordinate values of the graphical user interface based on relative position of content items in a resource (sometimes referred to herein as a "viewport") of the smart table 106. For instance, as shown in FIGS. 4-9, a viewport can be a touchscreen display configured to receive information from the smart table 106 indicative of a selection (e.g., touchscreen selection) of a document associated with the viewport or a content item. In some implementations, the viewport monitoring circuit 252 can be configured to monitor a position of the scroll tab relative to the scroll bar or relative to the viewport based on, for instance, scroll information received from the smart table 106. That is, state information relating to the position of the content item within an application (e.g., smart table client application 218) is acquired and used in the subsequent determining of the values of the one or more properties of the viewport.

The viewport monitoring circuit 252 can be configured to cause the smart table 106 to monitor a viewport of an application to append (e.g., modify the values for the one or more properties) one or more of the content items identified by the smart table client application 218. In some implementations, the content item can be a document object model element (i.e., DOM). In some implementations, the content item can be a DOM element that can be rendered for presentation on the touchscreen display of the smart table 106. In some implementations, the content item can be a visual representation of a DOM element that can be rendered for presentation on the touchscreen display of the smart table 106. In some implementations, the content item can be an image, a video, a document, an animation, among others.

In some implementations, the viewport monitoring circuit 252 can be configured to cause the smart table 106 to determine coordinates of the content items relative to a reference point of the smart table client application 218. In some implementations, the reference point of the smart table client application 218 can include a top corner of the application. In some implementations, the viewport monitoring circuit 252 can determine that the application is configured to extend vertically or horizontally. In implementations in which the application is configured to extend vertically, the viewport monitoring circuit 252 can cause the smart table 106 to determine a coordinate value of content items along the vertical axis, or stated differently, the y-axis coordinate. In implementations in which the application is configured to extend horizontally, the viewport monitoring circuit 252 can cause the smart table 106 to determine a coordinate value of content items along the horizontal axis, or stated differently, the x-axis coordinate. The coordinate value can be a number of pixels, a distance, or a scaled distance from the reference point of the application. In some implementations, the coordinate value can be a percentage corresponding to a point of the content items, for instance, a top edge of the content items.

In some implementations, the viewport monitoring circuit 252 can be configured to cause the touchscreen display of the smart table 106 to detect if a user activity occurred within and/or in the environment of the touchscreen display (e.g., from an input/output device 220) and/or smart table 106. For instance, the viewport monitoring circuit 252 can be configured to receive information from the application indicative of a movement (e.g., up or down) of a scroll tab of a scroll bar associated with the viewport or the application. In some implementations, the viewport monitoring circuit 252 can determine if scroll activity occurred by employing one or more listeners that detect scroll activity. In another instance, the viewport monitoring circuit 252 can be configured to receive sensor input from one or more input/output device 220 (and/or from IoT devices 190) around the environment (e.g., at the smart table 106, within the space, within the building, and so on). In one example, the sensor input may be a hand gesture (e.g., wave, swipe, point) of an individual that does not contact the touchscreen display. In one example, the sensor input may be an audible and/or visual output of an individual indicating a specific action to be performed (e.g., selection action, fill-in action, type action, next page action, head action, foot action, and so on) from one or more input/output device 220 (and/or from IoT devices 190) around the environment.

The authentication circuit 212 may be configured to determine whether a user is authenticated to initiate a provider session and/or to complete certain provider tasks. For example, the authentication circuit 212 may be configured to request an authorization approval from the provider computing system 102 of a received PIN or biometric input. In some embodiments, the authentication circuit 212 is also configured to determine the level of authentication necessary to complete different types of financial tasks (e.g., withdrawal cash, take out a loan, make a new investment, change address, request new debit card, etc.). The authentication circuit 212 may be configured to generate a score of how authenticated a user is during a provider session. For example, a user that entered both a biometric input and an alphanumeric passcode may receive a first score of 100% authenticated, and a user that only entered a PIN may receive a second score of 50% authenticated. The authentication circuit 212 is also configured to send instructions to the cash dispenser management circuit 216 in response to receiving an approved authorization (e.g., from the provider computing system via the network 154) to dispense cash to a customer for a withdrawal request.

The notification generation circuit 214 may be configured to create alerts regarding an upcoming provider session, an in-progress provider session, and/or a completed provider session, according to some embodiments. The notification generation circuit 214 may also receive instructions on the format of a notification from the provider session management circuit 210. In some embodiments, the notification generation circuit 214 is configured to instruct the input/output device 220 of the smart table 106 to provide audible and/or visual output to a customer regarding information displayed during a provider session. For example, the notification generation circuit 214 may be configured to cause an NFC icon on a graphical user interface of the smart table 106 to flash to indicate to a user to place a user device 104 on the NFC icon to pair to the smart table 106. As another example, the notification generation circuit 214 may be configured to generate a notification that outputs a voice-over indicating the provider session will terminate within a certain time interval, such as a five minute warning to complete any unfinished tasks.

Still referring to FIG. 2A, the cash dispenser management circuit 216 may be configured to control the use of the cash dispenser of the smart table 106. In some embodiments, the cash dispenser management circuit 216 is further configured to determine when the amount of available cash at the smart table 106 is below a threshold value (e.g., $100). The cash dispenser management circuit 216 may then instruct the notification generation circuit 214 to create a notification of the low amount of cash at the smart table 106 to the branch computing system 108 and/or a user device 104 (e.g., a branch manager user device 104). In some embodiments, the cash dispenser management circuit 216 is also configured to transmit an instruction to update a balance of the customer account to the provider computing system 102, for example, after the transaction request is completed. The cash dispenser management circuit 216 may further be configured to instruct the input/output device 220 of the smart table 106 to print a receipt with transaction details, such as the amount of cash withdrawn, the time of the completed transaction, and/or an updated balance for the customer account used to complete the transaction.

The card printing circuit 217 may be configured to control the use of the card printer of the smart table 106. In some embodiments, the card printing circuit 217 is further configured to determine various information for printing a card (e.g., debit card, credit card, rewards card, and so on). For example, a pseudo-random number (e.g., debit card number unique to an individual and/or a particular account of the individual) for the card may be generated by the card printing circuit 217. In another example, a design (e.g., color, artwork, templates) for the card may be determined based on a user preference and/or smart table 106 preference. In some embodiments, the card printing circuit 217 is also configured to transmit an instruction to update a card of the customer account to the provider computing system 102, for example, after a new card is printed. The card printing circuit 217 may further be configured to instruct the input/output device 220 of the smart table 106 to print a receipt with card details, such as the limit on the card, the name on the card, an updated card verification value (CVV), an updated PIN, and so on.

The use of the smart table 106 within the smart table system 100 may beneficially reduce significant amounts of time to complete provider interactions during a provider session and/or fill out paperwork forms. Furthermore, the smart tables 106 may help improve transparency of customer account information and employee services and increase face-to-face time with the branch employees. By providing a larger graphical user interface to share customer account information, rather than on a tiny screen on a single user device, the smart tables 106 also increase the amount of inclusion for each party participating in the provider session. The smart tables 106 may additionally help inform customers of several choices and advise the customers by displaying information from the branch employee regarding the customer account information utilizing visual tools. In some embodiments, the visual tools may include pie charts, bar graphs, scatterplots, user graphics, and so on. The smart tables 106 may be configured such that a customer sits while using, or may be configured such that a customer stands while using.

Referring now to FIG. 2B, a block diagram of the smart headsets 195 is shown, according to some embodiments. The smart headsets 195 each similarly include a network interface 222, a processing circuit 224, and an input/output device 240. The network interface 222, the processing circuit 224, and the input/output device 240 may function substantially similar to and include the same or similar components as the network interface 110, the processing circuit 112, and the input/output device 122 described above, with reference to the provider computing system 102. Thus, it should be understood that the description of the network interface 110, the processing circuit 112, and the input/output device 122 of the provider computing system 102 provided above may be similarly applied to the network interface 222, the processing circuit 224, and the input/output device 240 of each of the smart headsets 195.

For example, the network interface 222 is similarly structured and used to establish connections with other computing systems (e.g., the provider computing system 102, the branch computing system 108, the user devices 104, the smart tables 106) via the network 154. The network interface 222 may further include any and/or all of the components discussed above, with reference to the network interface 110.

The processing circuit 204 similarly includes a processor 226 and a memory 228. The processor 226 and the memory 228 are substantially similar to the processor 114 and the memory 116 described above. As such, the smart headsets 195 are similarly configured to run a variety of application programs and store associated data in a database (e.g., smart headset database 229) of the memory 228. For example, the smart headsets 195 may be configured to run the smart headset client application 238 that is stored in the smart headset database 229. In another example, the smart headsets 195 may be configured to store various provider and user data, such as, but not limited to, personal information (e.g., names, addresses, phone numbers, contacts, call logs, installed applications, and so on), authentication information (e.g., username/password combinations, device authentication tokens, security question answers, unique client identifiers, biometric data (such as digital representations of biometrics), geographic data, social media data, application specific data, and so on), and provider information (e.g., token information, account numbers, account balances, available credit, credit history, exchange histories, and so on) relating to the various users and/or various accounts.

The smart headset client application 238 may be substantially similar to the provider client application 120, the branch client application 150, and the smart table client application 218, but may instead be specifically for personalized provider session views between various users (e.g., customers, employees, and managers at the provider). For example, the smart headset client application 238 is similarly structured to provide personalized views to each smart headset 195 to facilitate improved content presentation to various users of a session (e.g., customer, employee, manager, and so on) associated with each smart table 106 and one or more smart headsets 195. Particularly, smart headset client application 238 is configured to communicate with the provider computing system 102, the branch computing system 108, the user devices 104, and the smart tables 106 to receive instructions and notifications from the provider computing system 102, and/or the branch computing system 104, for the branch employees and/or manager associated with each smart headset 195 to perform various tasks associated with a provider session. Accordingly, the smart headsets 195 are communicably coupled to the provider computing system 102 (e.g., through interactions with the provider client application 120), the branch computing system 108 (e.g., through interactions with the branch client application 150), the user devices 104 (e.g., through interactions with the user client application 132), and the smart tables 106 (e.g., through interactions with the smart table client application 218), via a network (e.g., network 154).

The smart headset client application 238 may therefore communicate with the provider computing system 102, the branch computing system 108, the user devices 104, and the smart tables 106, to perform several functions. For example, the smart headset client application 238 is configured to receive data from the provider computing system 102 and/or the branch computing system 104 pertaining to necessary inputs for authenticating a particular transaction during a provider session. In this example, the smart headset client application 238 may magnify, highlight, color, bold, and/or variously emphasize necessary input. In another example, the smart headset client application 238 is configured to receive data from the smart table 106 and overlay additional content and/or provide additional input (e.g., audio, vibrations, light, colors, and so on) on (e.g., display) and/or in (e.g., sensors) the smart headsets 195 pertaining to the content displayed on the smart table 106. In this example, the smart headset client application 238 may provide notifications, tools (e.g., settings icons, menu options, customization options, and so on), status indicators (e.g., session completion percentage, emotional state, task in progress), and various sensor input (e.g., from IoT devices 190). The smart headset client application 238 is further configured to allow for communication with the provider client application 120 to allow the various branch employees that operate the smart headsets 195 to provide questions or comments regarding any concerns with the smart tables. As such, the smart headset client application 238 allows for the branch employees associated with the smart headsets 195 to communicate with the customer, branch manager, and/or provider employees throughout the process of a provider session.

The input/output device 240 of each smart headset 195 may function substantially similar to and include the same or similar components as the input/output device 134 described above, with reference to the user devices 104. Accordingly, it should be understood that the description of the input/output device 134 provided above may also be applied to the input/output device 240 of each of the smart headsets 195. For example, the input/output device 240 of each smart headset 195 is similarly structured to receive communications from and provide communications to customers paired (e.g., via a network connection, communicably coupled, via Bluetooth™, via a shared connection, and so on) with a smart headset 195 and to the branch employee or branch employees associated with each smart headset 195. In various implementations, the input/output device 240 can include various cameras and/or sensors within the housing of the smart headset 195. For example, the smart headset 195 can include one or more cameras (e.g., for detecting movement, motion, and view environment), audio sensor, temperature sensor, haptic feedback sensor, biometric sensor, pulse oximetry (detect oxygen saturation of blood), altitude sensor, humidity sensor, magnetometer, accelerometer, gyroscope, stress sensors, various IoT devices 190, and so on.

The processing circuit 204 also includes a provider session management circuit 230, an authentication circuit 232, a notification generation circuit 234, and a viewport monitoring circuit 254, for example. In other embodiments, the processing circuit 224 may contain more or less components than shown in FIG. 2B. The components of FIG. 2B are meant for illustrative purposes only, and should not be regarded as limiting in any manner. The provider session management circuit 230 and viewport monitoring circuit 254 of each smart headset 195 may function substantially similar to and include the same or similar components as the provider session management circuit 210 and viewport monitoring circuit 252 respectively. Accordingly, it should be understood that the description of the provider session management circuit 210 and viewport monitoring circuit 252 provided above may also be applied to the provider session management circuit 230 and viewport monitoring circuit 254 of each of the smart headsets 195. For example, the provider session management circuit 230 of each smart headset 195 is similarly structured to be configured to detect trigger events for provider sessions and monitor a viewport (e.g., by the and viewport monitoring circuit 254) of the smart headsets 195 (explained in detail with reference to FIGS. 13-17).

The authentication circuit 232 of each smart headset 195 may function substantially similar to and include the same or similar components as the authentication circuit 212. Accordingly, it should be understood that the description of the authentication circuit 212 provided above may also be applied to the authentication circuit 232 of each of the smart headsets 195. For example, the authentication circuit 232 of each smart headset 195 is similarly structured to determine whether a user is authenticated to initiate a provider session and/or a level of authentication necessary to complete different types of financial tasks.

The notification generation circuit 234 of each smart headset 195 may function substantially similar to and include the same or similar components as the notification generation circuit 214. Accordingly, it should be understood that the description of the notification generation circuit 214 provided above may also be applied to notification generation circuit 234 of each of the smart headsets 195. For example, the notification generation circuit 234 of each smart headset 195 is similarly structured to create and provide alerts regarding an upcoming provider session, an in-progress provider session, and/or a completed provider session.

Figure 3:
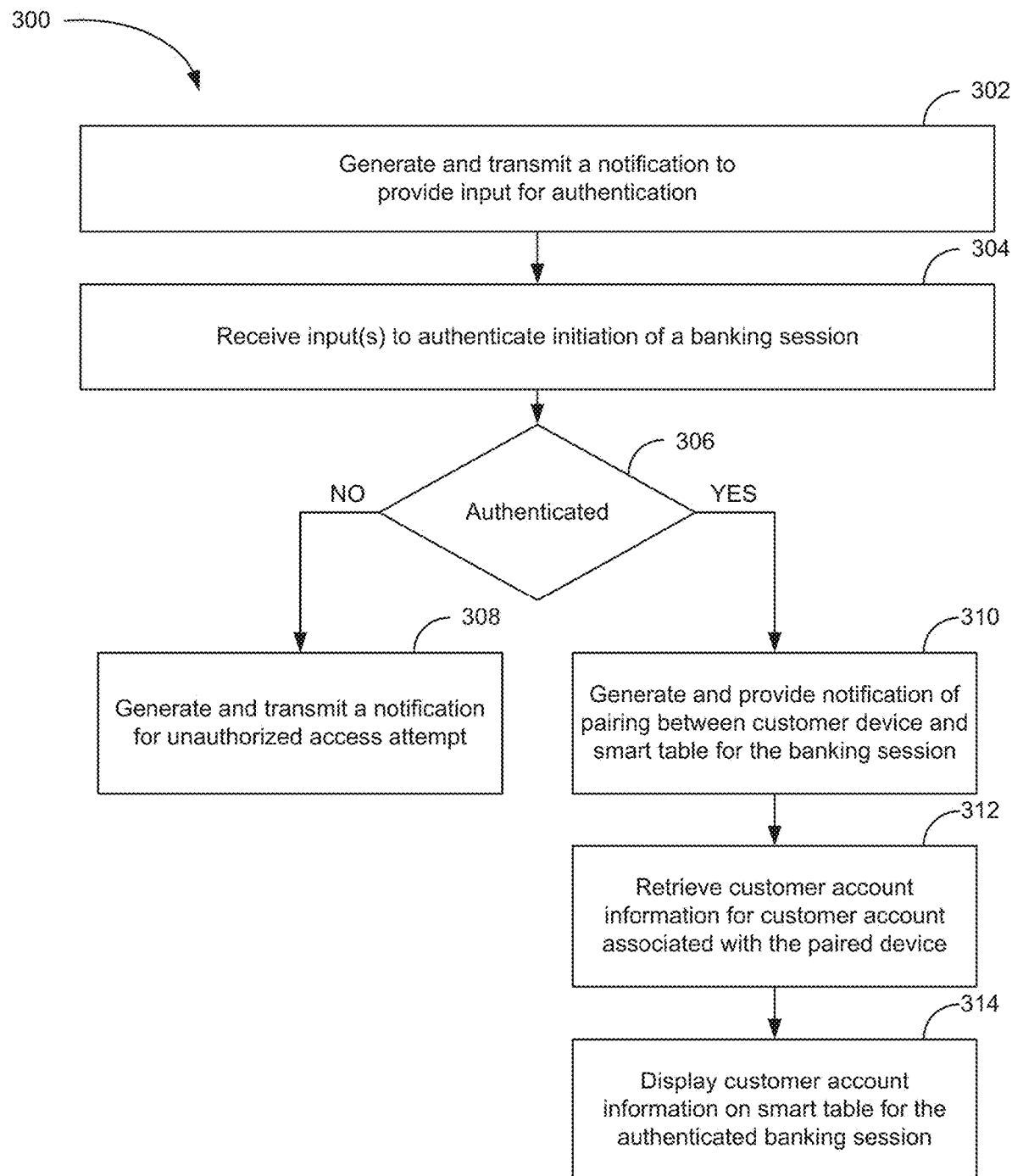
FIG. 3 is a flow diagram of a method for initiating a session with the smart table of FIG. 1A, according to example embodiments.

Referring now to FIG. 3, a flow diagram of a method 300 for initiating a session between one or more user devices 104 and a smart table 106 is shown, according to some embodiments. The method 300 may be provided by and/or accessible by the provider client application 120, the branch client application 150, the user client application 132, and the smart table client application 218, for example. The method 300 may be performed by the smart table system 100 described above pertaining to FIGS. 1 and 2. In some embodiments, the method 300 begins in response to receiving, by a smart table 106, a session trigger event. A session trigger event may be any event that triggers the beginning of a session between the smart table 106 and a user device 104. For example, when a customer is within a certain proximity of the smart table 106, the user device 104 associated with the customer that the customer is holding may be within a wireless communication range of various devices (e.g., the branch computing system 108 and/or the smart table 106) associated with the branch location. In response to entering the wireless communication range, the respective user device 104 may be configured to automatically request the customer, via the user device 104, to enter confirmation to establish a secure connection with the smart table 106. As such, the security of the provider session may increase, as a customer may be required to be within a certain proximity (e.g., latitude and longitude) of the smart table 106 to begin the provider session. In some embodiments, similarly, a user device 104 of an employee scheduled to be running a provider session for the smart table 106 may also be required to be within proximity of the smart table 106 in order to initiate the provider session. A session trigger event may also include receiving an input via input/output device 220, such as receiving a user interaction via a touch screen display of the smart table 106. In other embodiments, a session trigger event may include a customer or employee logging into a user client application 132 on a user device 104. In additional embodiments, a session trigger event may occur at a specific time, such as in response to the provider session management circuit determining there is a scheduled provider session at a smart table 106 at a specific time. In some embodiments, the smart table 106 may be configured to operate in a low power mode or "sleep mode" until a session trigger event is received.

At 302, the method 300 includes generating and transmitting a notification to a customer device (e.g., a user device 104) to provide an input for authentication. In some embodiments, the notification generation circuit 214 is configured to execute step 302 in response to receiving an instruction from the provider session management circuit 210. The notification generation circuit 214 may be configured to generate a notification requesting user authentication based on information received, via the network 154, from the smart table management circuit 148 and customer account database 118. For example, specific smart tables 106 may require higher levels of authentication before a user may initiate a provider session based on the capabilities of the smart table. Additionally, the customer account database 118 may have stored customer preferences indicating one or more types of input the customer wants to use for authenticating a provider session. Input for authentication may include a personal identification number (PIN), a biometric input (e.g., a fingerprint, a palm print, an eye scan, a voice sample, etc.), a haptic device input (e.g., rings, jewelry, headsets, bands), smart headsets input, an alphanumeric passcode, a barcode, a QR code, a physical key, an electronic key (e.g., a token stored on the user device 104 of the customer), a physical or mobile wallet card (e.g., a credit card with chip technology, a virtual provider card), and so on. In some embodiments, the generated notification may include audible or tactile output when received by the user device 104. For example, in response to receiving the generated notification, the user device 104 may create an audible sound, via the input/output device 134, to catch the attention of the customer and/or an employee working with the customer and/or may cause the user device 104 to vibrate.

In other embodiments, instead of transmitting the notification to a user device 104, the notification requesting an input to authenticate the customer is shown on a display screen of the smart table 106. For example, the notification generation circuit 214 may generate a notification requesting a customer to place a palm on a highlighted area of the display screen of the smart table 106. As another example, the notification generation circuit 214 may provide a notification shown on the display screen of the smart table 106 asking a customer to enter a customer PIN on the customer's user device 104. In some embodiments, the generated notification also includes a message to place the user device 104 associated with the customer on a particular area of the smart table 106. For example, a highlighted area may indicate where to place the user device 104 in order to facilitate using near-field communication data exchange.

The input to authenticate initiation of a provider session is received at step 304. In some embodiments, the authentication circuit 212 is configured to receive the input to authorize initiating the provider session. One or more inputs may be received at step 304, according to some embodiments. For example, in some provider sessions, more than one customer may be detected and/or scheduled to participate in the provider session. As such, the authentication circuit 212 may receive inputs from each customer for the provider session. Additionally, an input to authenticate an employee scheduled to participate in the provider session may also be received at 304. For example, for provider sessions scheduled to conduct transactions with higher security, a branch manager may be required in order to initiate the provider session. As such, authentication inputs may be received from the customer and the branch manager at step 304.

In some embodiments, the inputs are received via the user devices 104 and transmitted to the smart table 106 via the network 154. In other embodiments, the one or more inputs may be received directly by the smart table 106 via the input/output device 220. For example, a PIN for authentication may be entered via a user interface of the customer's user device 104, or a fingerprint may be entered via the input/output device 220 (e.g., a fingerprint scanner) of the smart table 106. Beneficially, a customer may then enter personal authentication information in a more private setting, rather than entering personal authentication information on the smart table 106. As such, the security of the customer's personal information may be improved.

At step 306, the method 300 includes determining whether one or more users are authenticated to initiate the provider session. In some embodiments, the authentication circuit 212 is configured to determine whether authentication for the provider session is successful. The network interface 202 may transmit, via the network 154, the received input to the branch computing system 108 and/or the provider computing system 102. In some embodiments, the provider computing system 102 and/or the branch computing system 108 then determine whether the received input matches user information stored in a database (e.g., in customer account database 118, in employee database 144). For example, the provider computing system 102 determines whether a device token received from the user device 104 matches a token stored in a token vault of the customer account database 118. The network interface 202 may then receive confirmation or a denial of authentication for the one or more users (e.g., a customer, a customer and an employee, more than one customer, etc.). In some embodiments, the authentication circuit 212 is configured to execute step 306 at certain intervals throughout a provider session. For example, after a predetermined time interval, or at the end of a scheduled provider session, the authentication circuit 212 may be configured to re-authenticate the one or more customers and/or employee.

In response to determining one or more of the users were not authenticated, the method 300 proceeds to step 308. The method 300 includes generating and transmitting a notification for an unauthorized access attempt at step 308. In some embodiments, the notification generation circuit 214 is configured to execute the operations at 308. The notification generation circuit 214 may be configured to generate a text notification, an email notification, an automated voiceover notification, and/or any kind of alert to notify a user. The notification generation circuit 214 may be configured to include details concerning the access attempt in the generated notification. For example, the notification may include branch location information (e.g., name, address) and/or a timestamp of when the attempt to initiate a provider session was denied. In some embodiments, the notification also may include contact information for a branch manager and instructions concerning the security of a customer's personal data. For example, the generated notification may include options to view user account details, transaction history, previous provider session history, and so on. The generated notification may also include selectable options to change one or more inputs for authentication (e.g., change a user passcode, change a user PIN, print a new card, etc.) and/or user preferences (e.g., preferences for increased security before access is granted to customer information). In some embodiments, the notification is transmitted to a user device 104 associated with a customer. The notification may also be transmitted, via the network 154, to a user device 104 associated with a branch manager and/or an employee assigned to a scheduled provider session.

On the other hand, if the authentication circuit 212 determines at step 306 that the one or more users are successfully authenticated, the method 300 proceeds to step 310. At step 310, the method 300 includes generating and providing a notification of a successful pairing between customer device (e.g., user device 104) and the smart table 106 for the provider session. In some embodiments, the notification generation circuit 214 is configured to generate a text alert or email alert indicating the establishment of a secure communication session with the smart table 106. The type of generated notification (e.g., email, text, phone call, etc.) may be based on user preferences. For example, the provider session management circuit 210 may receive session preferences for a customer stored in customer account database 118. The provider session preferences may include the kind of notifications the customer wants to receive. The preferences may also include information on where to direct the generated notification. For example, customer preferences may include contact information (e.g., an email of a parent of the customer, a phone number, etc.) to send the generated notification. As such, in some embodiments, the notification may be provided to one or more user devices 104. The generated notification for a successful pairing between the customer user device 104 and the smart table 106 may also be provided via the input/output device 220 of the smart table 106. For example, the smart table 106 may show the notification on a display screen.

At step 312, the method 300 includes retrieving customer account information for the customer account associated with the pair customer user device 104. In some embodiments, the provider session management circuit 210 is configured to execute step 312. The provider session management circuit 210 may be configured to request, via the network interface 202, customer account information from the provider computing system 102. In some embodiments, the amount of customer account information retrieved is relative to the security of the provider session. For example, the customer account information retrieved is relative to the type of input received for user authentication. As an example, if only a passcode was entered, the customer account information that is retrieved may be more limited than if a passcode and a biometric input were entered to authenticate the customer. In some embodiments, customer account information may include previous provider session history, transaction history for the customer account, balances for various accounts (e.g., savings accounts, checking accounts, credit card accounts), loan information, mortgage information, personal information (e.g., name, address, age, education, occupation, salary, etc.), credit card debt, current investments, retirement plans, savings goals, and so on. The provider session management circuit 210 may also be configured to pull specific documents concerning planned transactions for a scheduled provider session at 312. For example, a prepared document regarding a loan may be retrieved at step 312 for a branch employee to review with the customer during the scheduled provider session.

Once the customer account information has been retrieved, at step 314, the customer account information may be displayed on the smart table 106 for the authenticated provider session. In some embodiments, the customer account information may be displayed in a customer area of a display screen of the smart table 106. In other embodiments, the customer account information may be displayed on the customer's user device 104 rather than on a display screen of the smart table 106. For example, for certain customer account information that is more confidential, such as a social security number, and/or customer account information that a customer indicated in preferences should not be shown during a provider session on a smart table, such as a salary or the customer's overall financial worth, the provider session management circuit 210 may be configured to only provide that information on the customer's user device 104. In some embodiments, the customer account information may be displayed using tables, graphics, and/or other visual tools to help convey the data to the customer in a meaningful manner. For example, concerning retirement, a graphic may show a portion of the customer's current earnings that should be set aside for retirement and the progress the customer has made in saving for retirement over a specific period of time.

Figure 4:
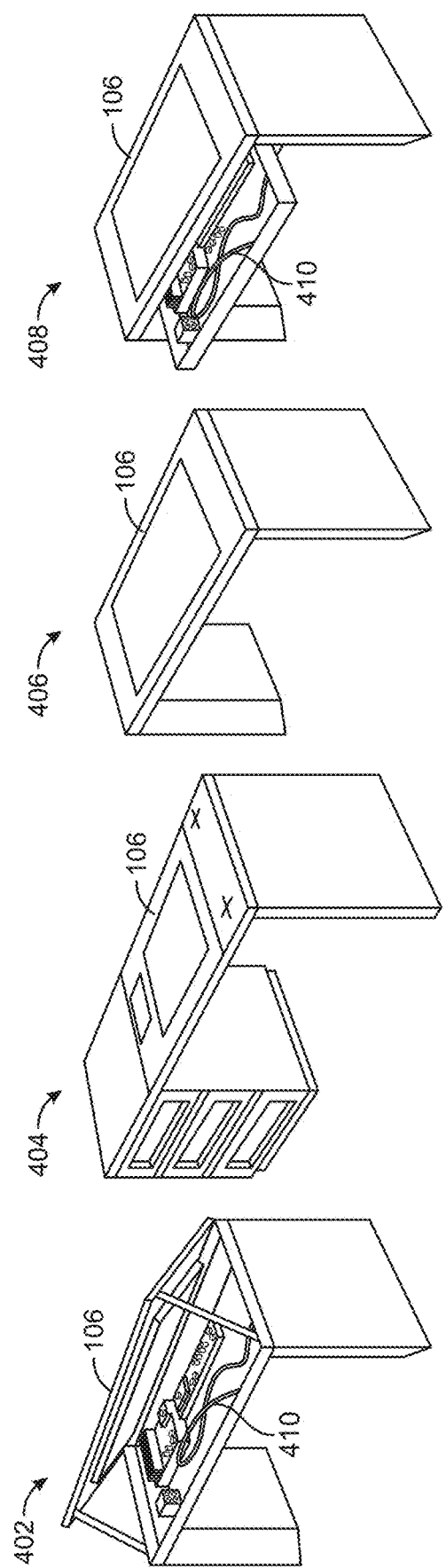
FIG. 4 is an illustration of various configurations of the smart table of FIG. 1A, according to example embodiments.

Referring now to FIG. 4, an illustration of various configurations of the smart table 106 are shown, according to some embodiments. A perspective view 402 of a smart table 106 depicts a storage compartment beneath a top surface of the smart table 106. In some embodiments, the cash dispenser of the smart table 106 may be accessed by lifting a top surface of the smart table 106. As such, the cash dispenser and/or various input/output devices (collectively referred to herein as "IoT devices 410") may easily be serviced by lifting the top surface of the smart table 106, covering the storage compartment. In other embodiments, a storage compartment of the smart table 106 may be accessed by sliding the top surface (e.g., perspective view 408) to a side of the smart table 106, rather than lifting the top surface. A perspective view 404 of a smart table 106 shows an integration of storage compartments for the smart table 106 and a digitally enabled, touch screen display, according to some embodiments. A perspective view 406 of a smart table 106 depicts a touch screen display encompassing the top surface of the smart table 106. In some embodiments, the smart table 106 may not include a cash dispenser, as shown in perspective view 406. The views shown in FIG. 4 are meant to be illustrative in purpose only, and should not be regarded as limiting in any manner.

Figure 5:
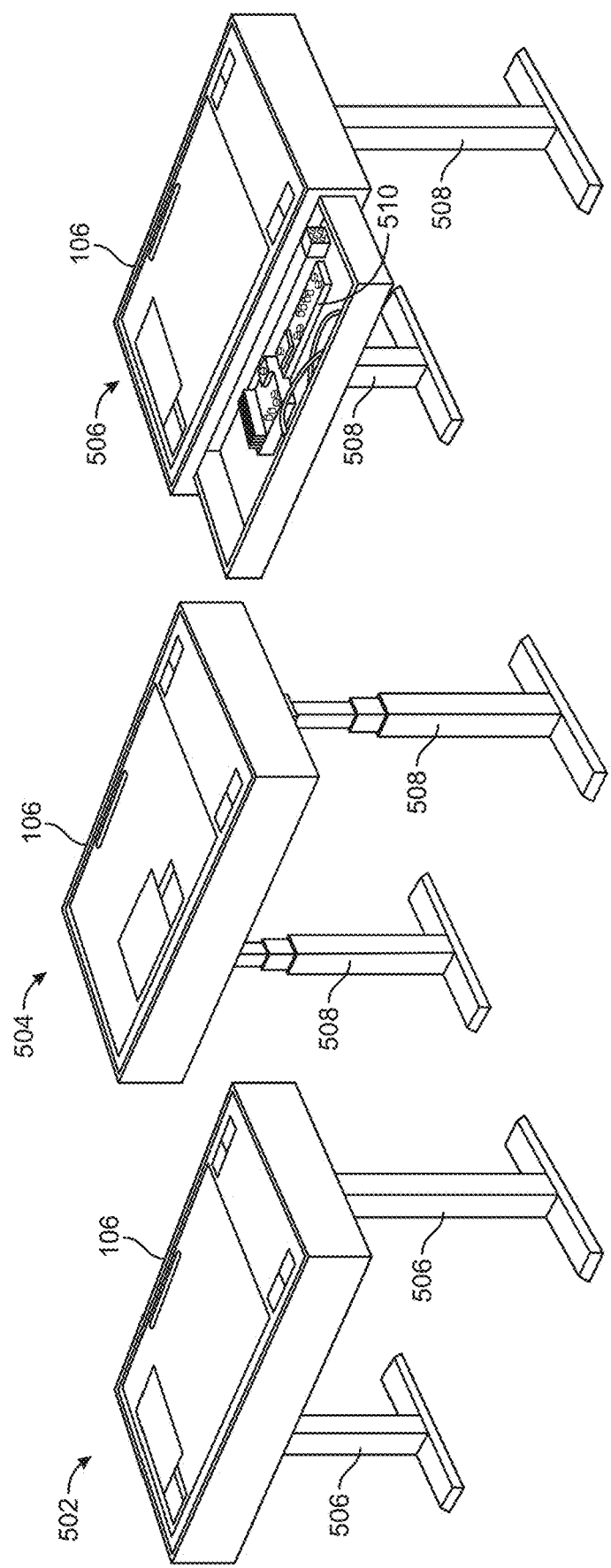
FIG. 5 is an illustration of additional configurations of the smart table of FIG. 1A, according to example embodiments.

Referring now to FIG. 5, an illustration of additional configurations of the smart table is shown, according to some embodiments. Perspective view 502 depicts a smart table 106 with a touch screen display and legs 506 at a set height. Perspective view 504 shows a smart table 106 including a touch screen display and legs 508. In some embodiments, the legs 508 may be adjusted to varying heights based on user preference. For example, a user may increase or decrease the height of the smart table 106 by operating motorized lifting columns to increase or decrease the height of the legs 508. In some embodiments, the motorized lifting columns of the legs 508 are activated using a switch on the smart table 106. In other embodiments, the height of the smart table 106 is increased or decreased by entering an input via a touch screen of the smart table 106. A perspective view 506 of a smart table 106 depicts a storage compartment beneath a top surface of the smart table 106. In some embodiments, the cash dispenser of the smart table 106 may be accessed by sliding (or lifting) a top surface of the smart table 106. As such, the cash dispenser and/or various input/output devices (collectively referred to herein as "IoT devices 510") may easily be serviced by sliding (or lifting) the top surface of the smart table 106, covering the storage compartment.

Figure 6:
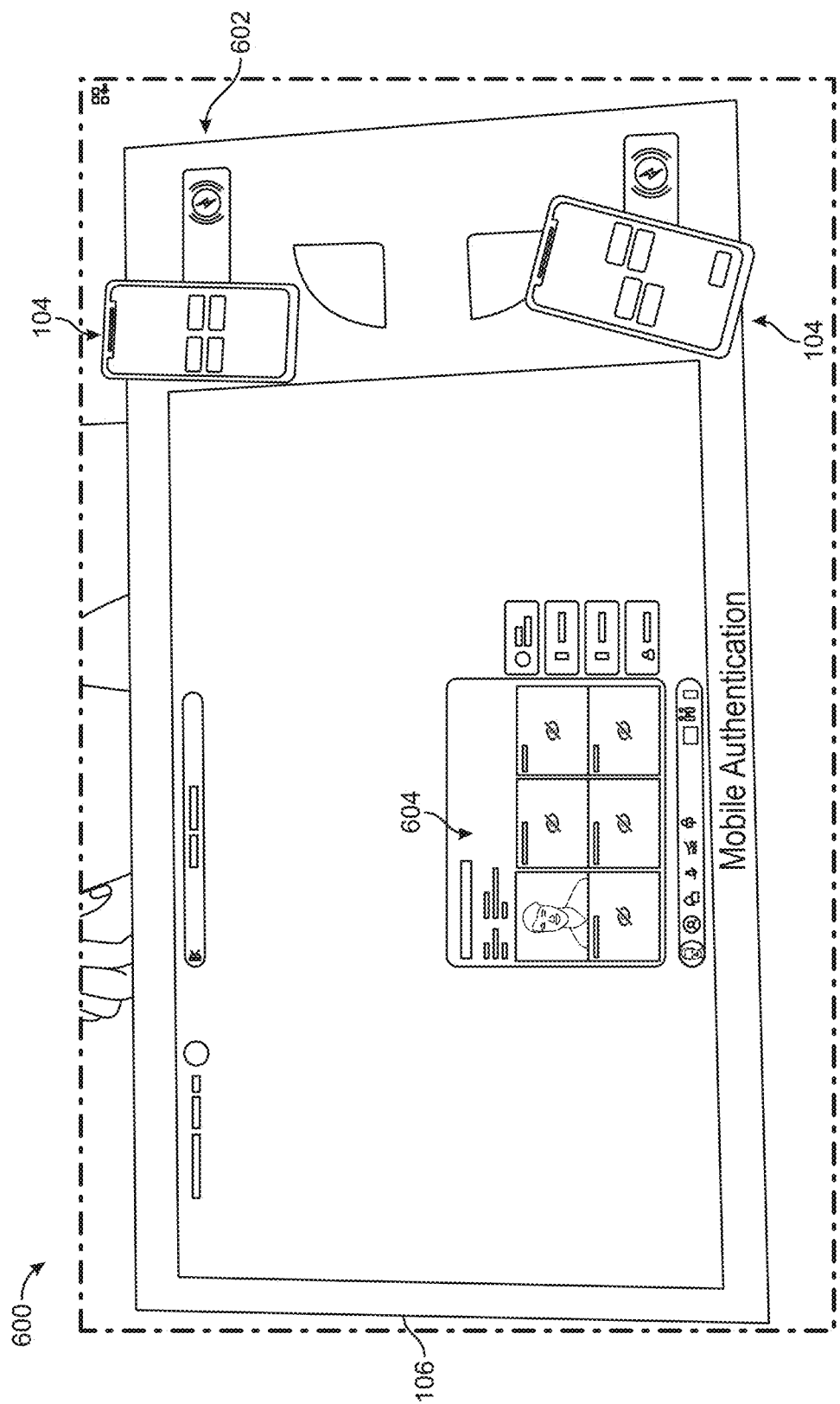
FIG. 6 is an illustration of a user interface of the smart table and paired user devices of FIG. 1A, according to example embodiments.

Referring now to FIG. 6, an illustration of a user interface 600 of the smart table 106 and paired user devices 104 is shown, according to some embodiments. The user interface 600 may be provided by the smart table client application 218. In some embodiments, the user interface 600 is generated and displayed, via an input/output device 220, by the provider session management circuit 210. The user interface 600 includes account summary window 604, for example. The account summary window 604 may include a name, address, photo identification, and contact information for a customer. In some embodiments, the account summary window 604 is displayed in response to receiving a selection of a profile icon on the user interface 600. The user interface 600 also includes a device area 602. In some embodiments, the device area 602 includes a charging icon and a wireless connection icon. The connection icon may indicate to one or more users (e.g., a customer, two customers, a customer and an employee, etc.) where to place a user device 104 in order to pair to the smart table 106. As such, the connection icons shown on the user interface 600 may be used as indicators of the locations of NFC tags within the smart table 106. In some embodiments, the user interface 600 may utilize different colors to indicate a successful pairing and an unsuccessful pairing in device area 602. For example, the connection icon may turn green in response to a successful pairing to the respective user device 104 placed over the connection icon. Although FIG. 6 depicts two user devices 104, the smart table 106 may be configured to pair to more than two different user devices 104, according to some embodiments.

Figure 7:
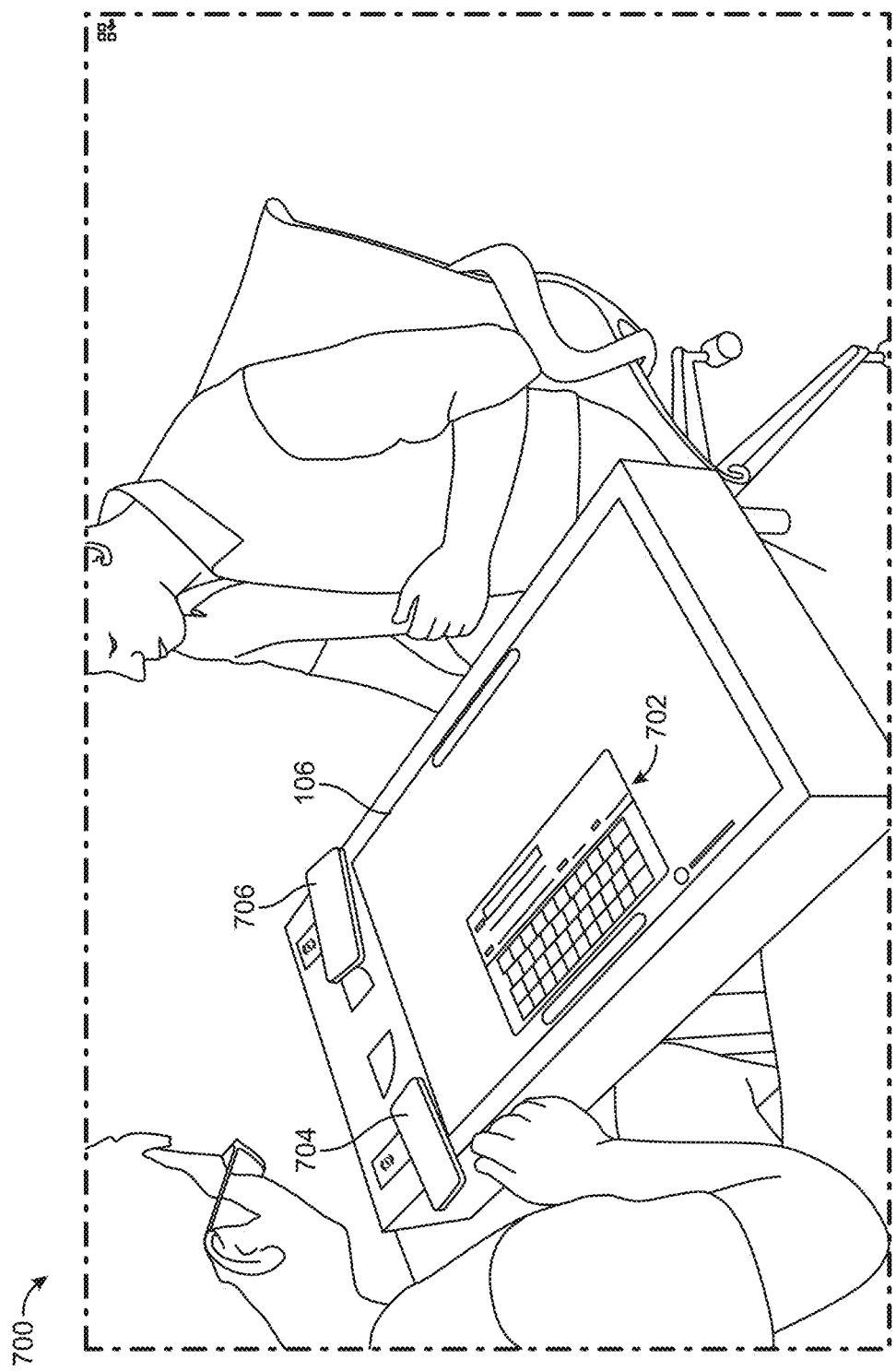
FIG. 7 is an illustration of a user interface of the smart table of FIG. 1A configured to receive an input from a customer or provider representative, according to example embodiments.

Referring now to FIG. 7, an illustration 700 of a user interface of the smart table 106 configured to receive an input from a customer or provider representative is shown, according to some embodiments. The illustration 700 depicts a keyboard 702, a customer device 704, and an employee device 706. The customer device 704 and the employee device 706 may both be the same or similar as the user devices 104 described above. In some embodiments, the keyboard 702 is displayed on a user interface of the smart table 106 to provide an input for the customer. The keyboard 702 may be displayed to enter new information, such as a change of address for the customer. In some embodiments, the keyboard 702 is oriented on a display screen of the smart table 106 based on whether a customer or an employee needs to enter information. For example, the smart table 106 may serve as a desk for a provider employee (e.g., a lawyer, a consultant, a real estate agent). As such, while sitting down at the smart table 106, the customer and the branch employee may be seated on opposite sides of the smart table 106. In some embodiments, the input/output device 220 of the smart table 106 is configured to determine an orientation and position for the keyboard 702 based on data received from sensors and/or cameras of the smart table 106.

Figure 8:
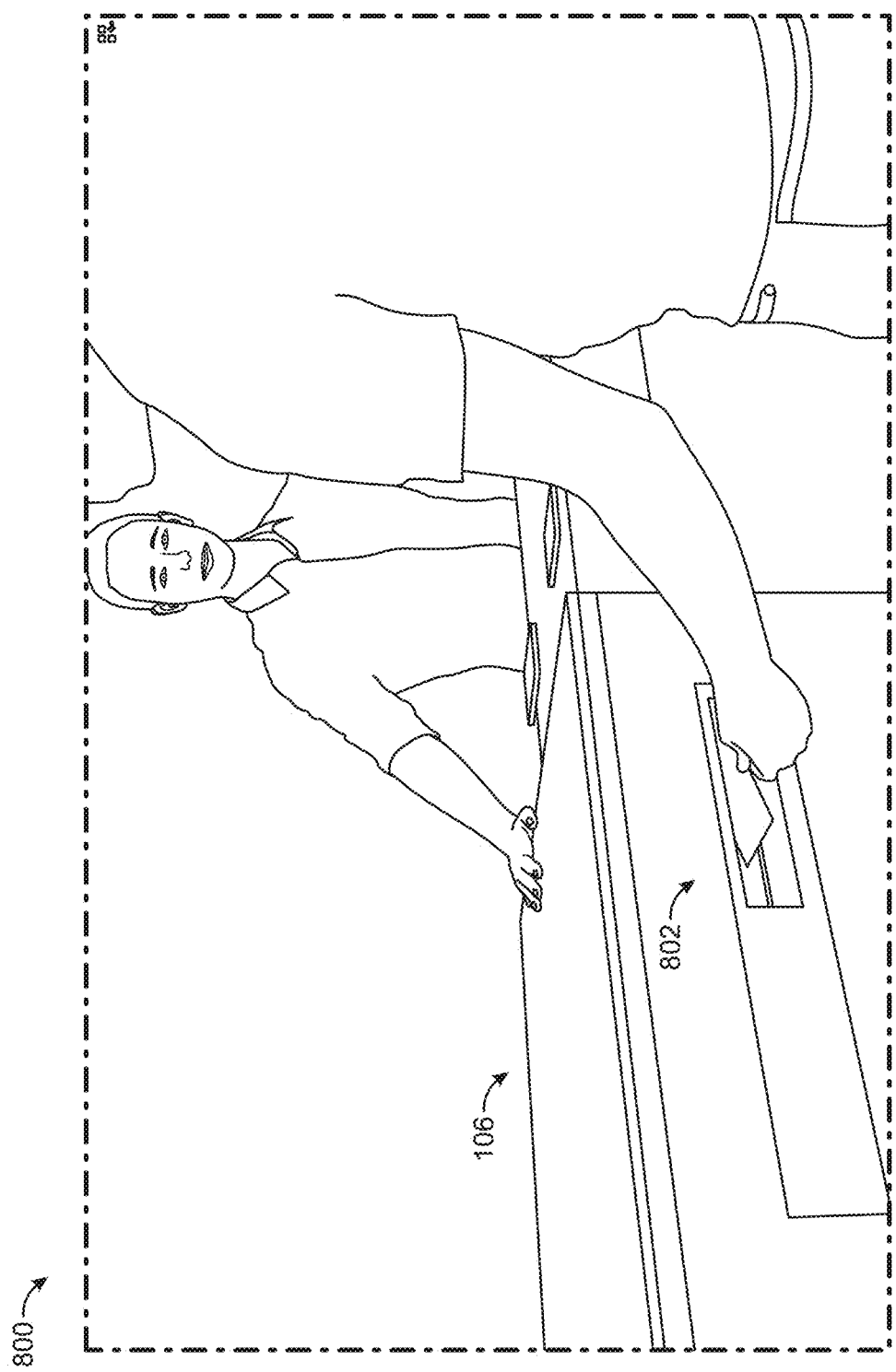
FIG. 8 is an illustration of the smart table of FIG. 1A including a dispensing mechanism, according to example embodiments.

Referring now to FIG. 8, an illustration 800 of the smart table 106 including a dispensing mechanism 802 is shown, according to some embodiments. The dispensing mechanism 802 can be a cash dispenser, though it will be appreciated that the dispensing mechanism 802 can be configured to dispense any type of item, such as cash, a receipt, checks, stamps, and so on. Accordingly, the smart table 106 may beneficially be utilized as an automated teller machine (ATM). In some embodiments, the smart table 106 may be used as an assisted-service ATM, as shown in FIG. 7. The smart table 106 may also function as a station for tellers at a branch location. In other embodiments, the smart table 106 may be used as a self-service ATM, without using employees to supervise the transaction at the smart table 106. The smart table 106 may be configured to pair with the user device 104 of the customer before dispensing cash via the dispensing mechanism 802. For example, the dispenser management circuit 216 is configured to receive approval from the authentication circuit 212 before providing cash to a customer using the smart table 106.

Figure 9:
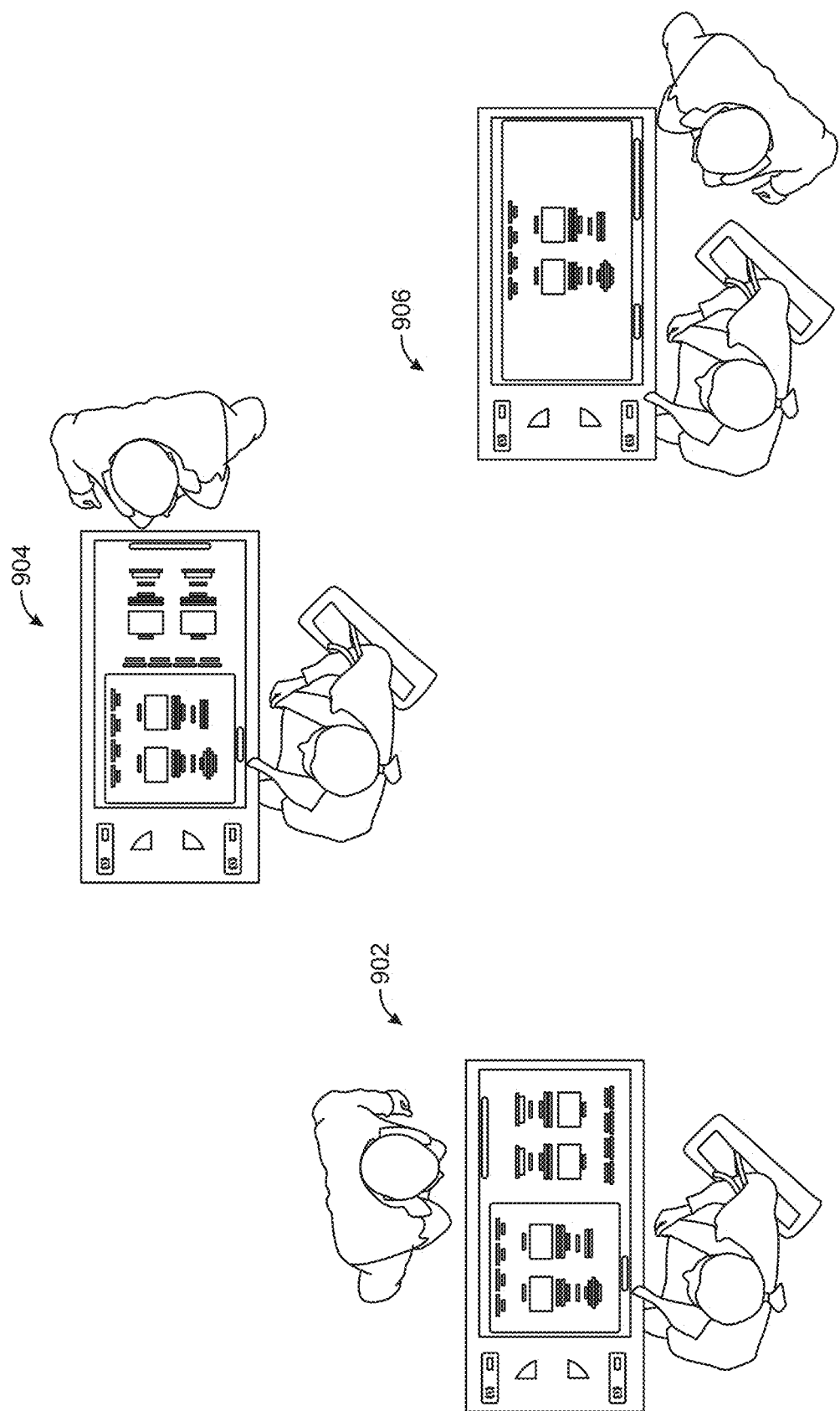
FIG. 9 is an illustration of various user interface orientations displayable by the smart table of FIG. 1A, according to example embodiments.

Referring now to FIG. 9, an illustration 902 of various user interface orientations displayable by the smart table 106 is shown, according to some embodiments. A first user interface orientation 902 includes a user interface of a smart table 106 with half of a customer interface area and half of a branch employee interface area. In some embodiments, the branch employee interface area is rotated 180 degrees from the customer interface area in a traditional setting for when the branch employee is on an opposite side of the smart table 106 from the customer. A second user interface orientation 904 includes a user interface of the smart table 106 with the customer interface area and the branch employee interface area rotated 90 degrees from the customer interface area for a more casual setting. A third user interface orientation 906 includes a user interface of the smart table 106 with one interface area for both the customer and the branch employee. In some embodiments, the third user interface orientation 906 shows the customer interface area for when the customer and the branch employee are on the same side of the smart table 106, for example.

Figure 10:
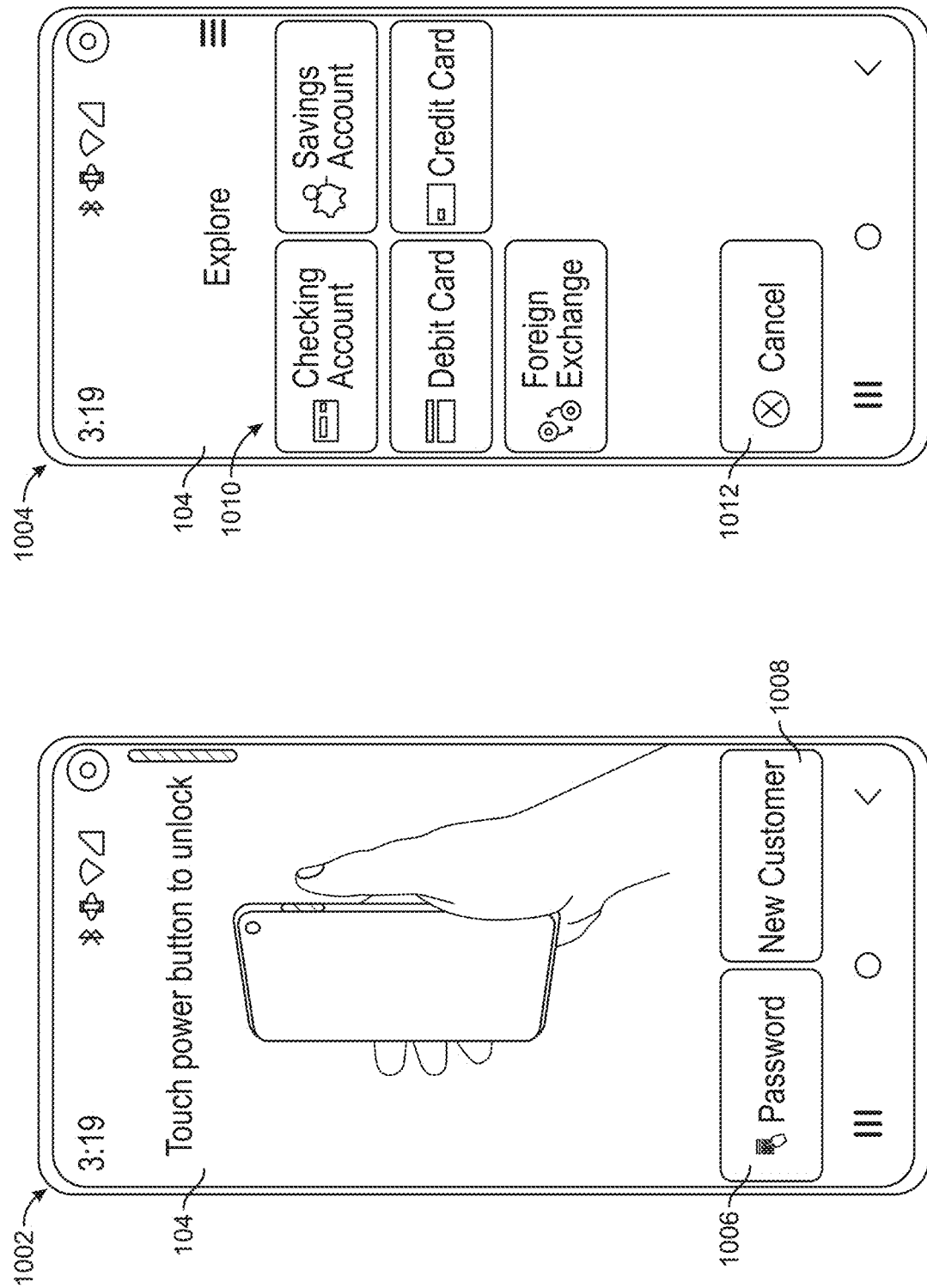
FIG. 10 is an illustration of example user interfaces of the user device of FIG. 1A when the user device is paired to the smart table of FIG. 1A, according to example embodiments.

Referring now to FIG. 10, an illustration of example user interfaces of the user device 104 when the user device 104 is paired to the smart table 106 is shown, according to some embodiments. FIG. 10 includes user interface 1002 and user interface 1004. In various embodiments, the user interface 1002 and the user interface 1004 are generated by the smart table system 100 described above with reference to FIG. 1A. In some embodiments, the user interface 1002 and the user interface 1004 are generated during the method 300 described above with reference to FIG. 3. The user interface 1002 may be displayed on a user device 104 associated with a customer attempting to pair to a smart table 106, for example. The user interface 1002 may include activatable icons for selecting various options regarding authenticating the customer. In some embodiments, the user interface 1002 includes a password activatable icon 1006 and a new customer activatable icon 1008. In response to receiving a user selection of the password activatable icon 1006, a prompt, generated by the notification generation circuit 214, to enter a password for customer authentication may be displayed. Upon selection of the new customer activatable icon 1008, the notification generation circuit 214 may generate and display a new user interface requesting the user to fill out information to create an account (e.g., a provider account associated with the provider).

The user interface 1004 may be displayed on the user device 104 in response to successful authentication and pairing with the smart table 106. In some embodiments, the user interface 1004 includes activatable icons list 1010 for selecting various options regarding accounts of the customer. For example, the activatable icons list 1010 may include options to view information pertaining to a checking account, a savings account, a debit card, a credit card, and/or foreign exchange. The user interface 1004 may also include a cancel activatable option 1012. In some embodiments, in response to selection of the cancel activatable option 1012, the provider session ends and the established connection between the smart table 106 and the one or more paired user devices 104 ends. In some embodiments, the user device 104 may return to a home page of the user client application 132 in response to receiving a selection of the cancel activatable option 1012.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

Figure 11:
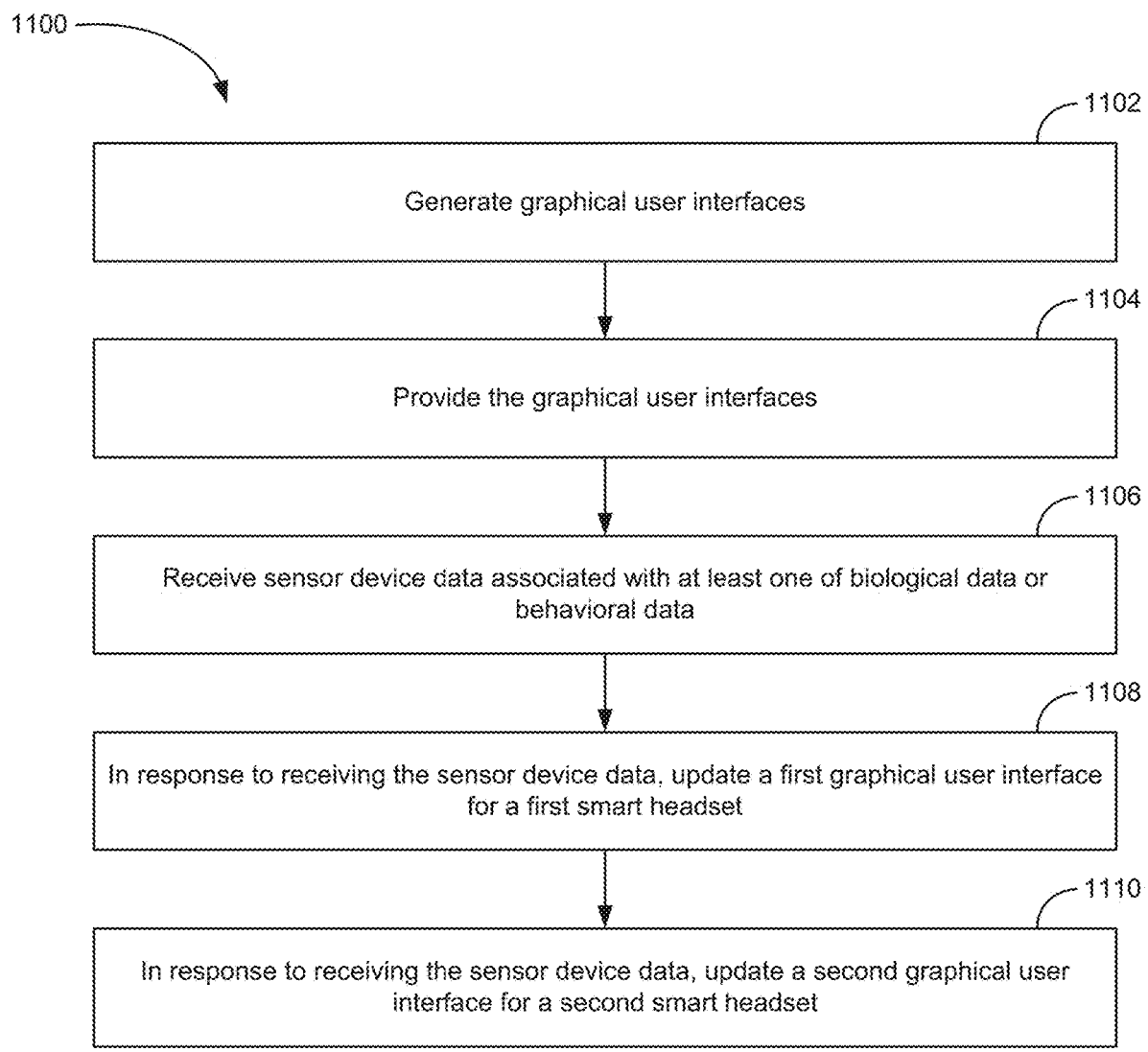
FIG. 11 is a flow diagram of a method for managing content with the smart table and smart headsets of FIG. 1A, according to example embodiments.

Referring now to FIG. 11, a flow diagram of a method 1100 for managing content with the smart table and smart headsets of FIG. 1A, according to example embodiments. Provider computing system 102, user devices 104, smart tables 106, branch computing system 108, IoT devices 190, and smart headsets 195 can be configured to perform operations of the method 1100.

In broad overview of method 1100, at block 1102, one or more processing circuits (e.g., provider computing system 102, user devices 104, smart tables 106, branch computing system 108, IoT devices 190, and smart headsets 195 in FIG. 1A, and computing system 160 in FIG. 1B, and so on) can generate graphical user interfaces. At block 1104, the one or more processing circuits (sometimes referred to herein as "a processing circuit") can provide the graphical user interfaces. At block 1106, the one or more processing circuits can receive sensor device data associated with at least one of biological data or behavioral data. At block 1108, the one or more processing circuits can, in response to receiving the sensor device data, update a first graphical user interface for a first smart headset. At block 1110, the one or more processing circuits can, in response to receiving the sensor device data, update a second graphical user interface for a second smart headset. Additional, fewer, or different operations may be performed in the method depending on the particular arrangement. In some arrangements, some or all operations of method 1100 may be performed by one or more processors executing on one or more computing devices, systems, or servers. In various arrangements, each operation may be re-ordered, added, removed, or repeated.

Referring to method 1100 in more detail, at block 1102, the one or more processing circuits can generate graphical user interfaces for each of the smart headsets. In various embodiments, each of the graphical user interfaces is unique to each of the smart headsets and is based on at least on one of a user preference or the sensor data (sometimes referred to herein as "IoT device data"). In some embodiments, each of the graphical user interfaces can be configured to display content that can be unique to each of the smart headsets and can be based on at least on one of a user preference or the sensor device data. The user preference can include size and color parameters of a user, and the one or more processing circuits can be configured to adjust content displayed on each of the graphical user interfaces. In some embodiments, the processing circuit can be configured to continuously update each of the graphical user interfaces in real-time (e.g., update as shown in block 1108 and 1110), such that the graphical user interfaces can include a combination of a set of views including content based on the sensor device data, where each of the set of views includes a subset of views. Furthermore, set of views can include a table view and a plurality of smart headset views, and the subset of views can include a customer view, a provider view, and a manager view, and where each of the subset of views includes different content unique to the individual.

At block 1104, the one or more processing circuits can provide the graphical user interfaces to each of the smart headsets. In some embodiments, a mobile device associated with a customer configured to provide authentication information of the customer to the interactive surface. In various embodiments, providing the graphic user interface to each of the smart headsets can be transferred over a network connection (e.g., wireless, communicably coupled, wired, direct wireless connection, network 154, and so on), and/or a pairing network (e.g., Bluetooth™, NFC, hotspot, communicably coupled, and so on).

At block 1106, the one or more processing circuits can receive sensor device data associated with at least one of biological data, behavioral data, or a user input from at least one of the plurality of interactive surface sensor devices or the plurality of smart headset sensor devices. In various embodiments, the interactive surface further includes a microphone configured to convert sound input into an electrical signal. In some embodiments, the interactive surface can also include a plurality of IoT devices configured to receive various types of input such as those described in detail with reference to smart table 106 in FIGS. 1A and 2A. In various embodiments, biological data or behavior data is indicative of at least one of a user sentiment, a user emotion, a user attentiveness, a user gesture, a user preference, and any other biological or behavior indicator described herein. In various embodiments, sensor data from one or more sensors (e.g., sometimes referred to herein as input/output devices and/or IoT devices) can be received over a network connection (e.g., wireless, wired, communicably coupled, direct wireless connection, network 154, and so on), and/or a pairing network (e.g., Bluetooth™, NFC, hotspot, communicably coupled, and so on).

At block 1108, the one or more processing circuits can update, in response to receiving the sensor device data, a first graphical user interface for a first smart headset of the smart headsets based on the sensor device data, wherein the first graphical user interface is unique to the first smart headset and is worn by a first individual. In some embodiments, the one or more processing circuits can continuously update each of the graphical user interfaces in real-time utilizing a combination of a set of views based on the sensor data, and wherein each of the set of views includes a subset of views. That is, the set of views can include a table view and a plurality of smart headset views and the subset of views include a customer view, a provider view, and a manager view, and where each of the set of views and each of the subset of views is personalized based on the individual. In various embodiments, the table view can be a view of an environment that can be visualized (e.g., by a user) without a smart headset (e.g., as shown in FIGS. 6-9) and a smart headset view can be a view of an environment that can be visualized (e.g., by the user) with a smart headset secured to a user's head and/or body. In one example, the one or more processing circuits can receive, from the microphone, sound input from a customer, and update one or more of the graphical user interfaces for one or more of the smart headsets based on the sound input. In some embodiments, the subset of views are described in detail with reference to FIGS. 13-17.

At block 1110, the one or more processing circuits can, update, in response to receiving the sensor device data, a second graphical user interface for a second smart headset of the smart headsets based on the sensor device data, and wherein the second graphical user interface is unique to the second smart headset and is worn by a second individual different than the first individual. In one example, the one or more processing circuits can receive, from a camera, a blink from an employee indicating a task has been approved (e.g., document, authentication, and so on). In another example, the one or more processing circuits can receive, from a database system (e.g., governmental database, smart table database 209, user device database 131, and so on), an Office of Foreign Assets Control (OFAC) alert and update a graphical user interface of a manager indicated one or more users of a smart table provider session are associated with an OFAC alert. Accordingly, sensor data may be any data received from any system described herein. In some embodiments, the subset of views are described in detail with reference to FIGS. 13-17.

Figure 12:
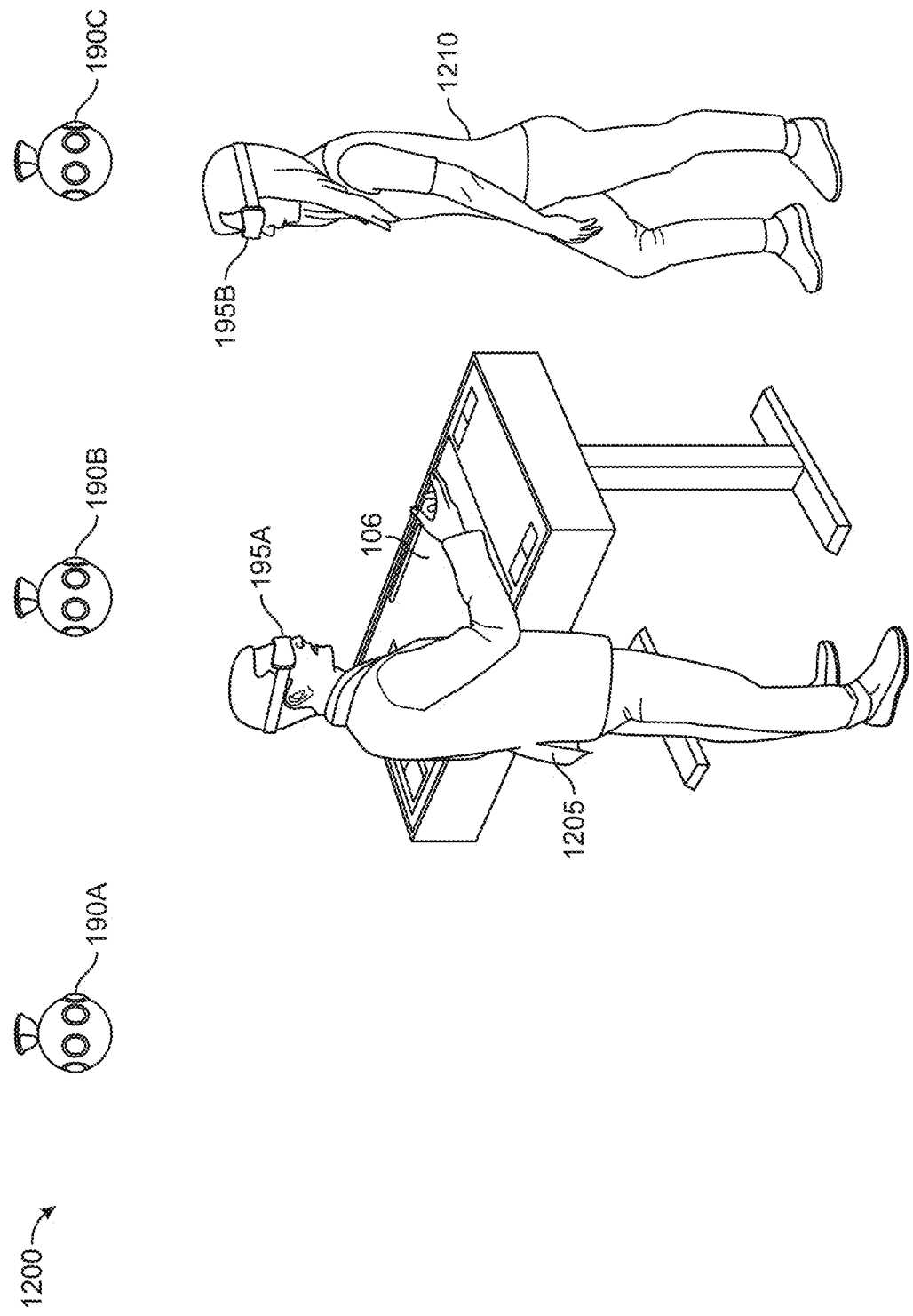
FIG. 12 is an illustration of the smart table and smart headsets of FIG. 1A including sensor devices in an environment, according to example embodiments.

Referring now to FIG. 12, an illustration of the smart table 106 and smart headsets 195 of FIG. 1A including IoT devices 190 (sometime referred to herein as "sensor devices") in an environment 1200, according to example embodiments. In some embodiments, the environment 1200 can include IoT devices 190A, 190B, 190C (described in detail with reference to FIG. 1A), one or more smart tables 106 (described in detail with reference to FIGS. 1A and 1B), one or more smart headsets (described in detail with reference to FIG. 1A, 1B, and FIGS. 13-17), and one or more users 1205 and 1210 (e.g., people, customers, employees, managers, and so on). In one example, one or more processing circuits in the environment 1200 (e.g., IoT devices 190, smart table 106, smart headsets 195) can collect biological or behavioral data to perform various actions associated with a smart table provider session.

Referring now generally to FIGS. 13-17, illustrations of various individual views of the smart headset 195 of FIG. 1A, according to example embodiments. Generally, various views can be a combination of headset display interfaces (e.g., on headset display 1301) overlaid on environment 1200 (e.g., smart table 106) during a smart table provider session. The headset display interfaces can include a plurality of interfaces (e.g., shared multi-dimensional graphical user interfaces) and objects overlaid on environment 1200 such that an individual (e.g., a user or human operator) can provide biological data (e.g., a stress level, heart rate, hand geometry, facial geometry, psyche, and so on) and/or behavioral data (e.g., haptic feedback, gesture, speech pattern, movement pattern (e.g., hand, food, arm, facial, iris, and so on), intangible feedback (e.g., selection of intangible content displayed on smart headset 195), response to stimuli, and so on) to interact with the plurality of interfaces, objects, and/or environment 1200. For example, an individual may complete an action by selecting an object overlaid on environment 1200 (e.g., intangible object) with a hand gesture (e.g., point at object). In another example, an individual may complete an action by selecting at an object overlaid on environment 1200 with an eye movement (e.g., look at object). In yet another example, an individual may provide their heart rate that may indicate a level of stress. In yet another example, an individual may touch the smart table 106 (e.g., haptic feedback) to provide input when completing a task (e.g., filling out a form, providing authentication information, pairing, and so on). In various embodiments, an individual may also receive notifications (e.g., alerts, requests, status indicators, and so on) on the headset display interface, for example, indicating an action to perform and/or current session information. Further, each view may be unique to an individual (e.g., customer view, employee view, manager view) such that each individual can view one or more different headset display interfaces overlaid on environment 1200 at any given time (e.g., at the same time) during a smart table provider session. In various embodiments, the smart headset 195 may be paired (e.g., Bluetooth™, NFC, wireless connection, wired connection, and so on) with the smart table 106 and/or any computing system described herein.

Still referring generally to FIGS. 13-17, each smart headset 195 can include a headset display (e.g., 1301, 1401, 1501, 1601, 1701). The headset display can be any suitable see-through display (sometimes referred to as a "transparent display") that utilizes any suitable technique to display a graphical user interface on the headset display. Various see-through displays can include, for example, a transparent screen substrate fused with a liquid crystal technology (LCD), a light field display (LFD), a head-up display (HUD), a transparent screen substrate fused with an organic light-emitting diode display (OLED), a transparent electroluminescent display (TASEL), and so on. Various techniques can include, for example, "Curved Mirror" (or "Curved Combiner") based, "Waveguide" (or "light-guide") based, and so on. In various embodiments, the smart headset 195 may be of varying sizes, for example, a helmet, a virtual reality headset, an augmented reality headset, smart glasses, a hat, a headdress, and/or any type of headgear. In some embodiments, the headset display may be opaque (or a percentage opaque, sometimes referred to as "translucent"). Thus, the headset display and/or smart headset 195 is not limited to any specific combination of hardware circuitry and software.

Still referring generally to FIGS. 13-17, each view may include a tool icon (e.g., 1314, 1414, 1514, 1614, 1714) configured to enable a user of the smart headset 195 to customize the experience when interacting with the smart headset 195. In various embodiments, when the tool icon is selected via a biological or behavioral action, it can enable a user to set specific arrangement and/or settings (e.g., colors, size, preferences, authentication procedure, and so on) when the shared multi-dimensional graphical user interface (collectively referred to herein as the "the headset display interface") are shown on the headset display (e.g., 1301, 1401, 1501, 1601, 1701). For example, if a user is color blind, they may configure, via the tool icon, a smart headset setting such that any notifications displayed on the headset display are not green or red. In another example, if a user has trouble with sight out of one eye, they may configure, via the tool icon, a smart headset setting such that one side of the headset display is favored over another (e.g., for showing objects/content). In yet another example, a user could configure, via the tool icon, the size of text/objects of the headset display interface. For example, improvements to traditional computing system can include rearranging (sometimes referred to herein as generating or modifying) content displayed on a first smart headset display based on a first user's preferences and environmental data and can also rearrange (e.g., at the same time, in real-time) content displayed on a second smart headset display based on a second user's preferences and environmental data such that content can be rearranged differently based on the user specific user utilizing a specific headset with particular preferences.

In some embodiments, each smart headset 195 (FIGS. 13-17) may include one or more processing circuits that when executed can generate various shared multi-dimensional graphical user interfaces. The smart headset 195 can include one or more processors (e.g., any general purpose or special purpose processor), and include and/or be operably coupled to one or more transitory and/or non-transitory storage mediums and/or memory devices (e.g., any computer-readable storage media, such as a magnetic storage, optical storage, flash storage, RAM, and so on) capable of providing one or more processors with program instructions. Instructions can include code from any suitable computer programming language. The one or more processing circuits that when executed can generate various shared multi-dimensional graphical user interfaces. In some embodiments, the smart headsets 195 may be headsets of varying sizes integrated with integrated with various input/output devices (e.g., sensors, IoT devices, cameras). In various embodiments, smart headset client application 238 of FIG. 2B can be configured to provide the multi-dimensional graphical user interfaces (e.g., personalized views) to each smart headset 195 to facilitate improved content presentation to various users of a smart table provider session (e.g., customer, employee, manager, and so on) associated with each smart table 106 and one or more smart headsets 195. Particularly, smart headset client application 238 is configured to communicate with the provider computing system 102, the branch computing system 108, the user devices 104, and the smart tables 106 to receive instructions and notifications from the provider computing system 102, the branch computing system 104, smart tables 106, and/or IoT devices 190, provide and update the personalized views based on the received information, and perform various tasks associated with a smart table provider session. Additional details relating to the various individual views of the smart headset 195 are provided herein with respect to FIGS. 14-17.

Figure 13A:
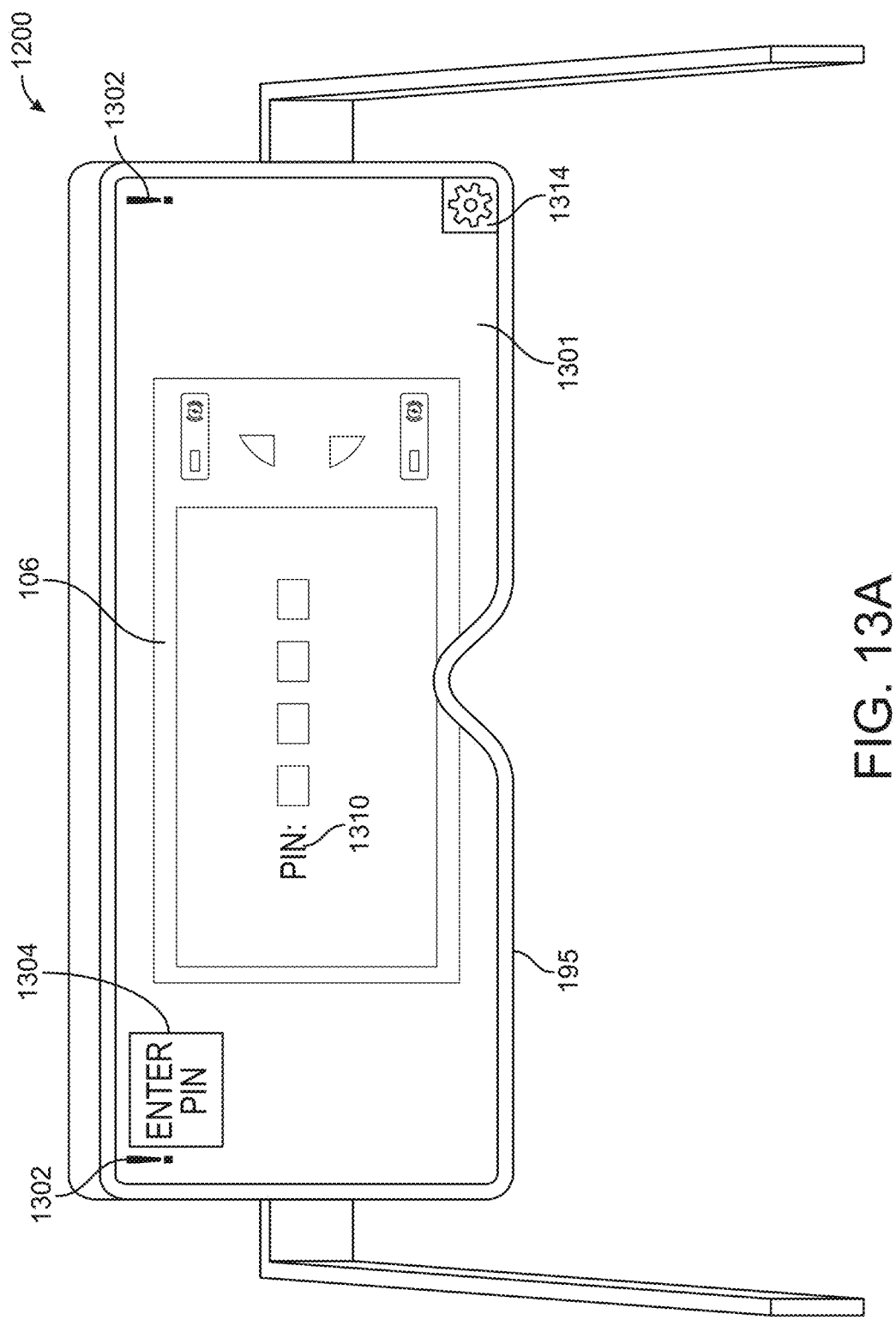
FIGS. 13A-13B are illustrations of various individual views of the smart headset of FIG. 1A, according to example embodiments.
Figure 13B:
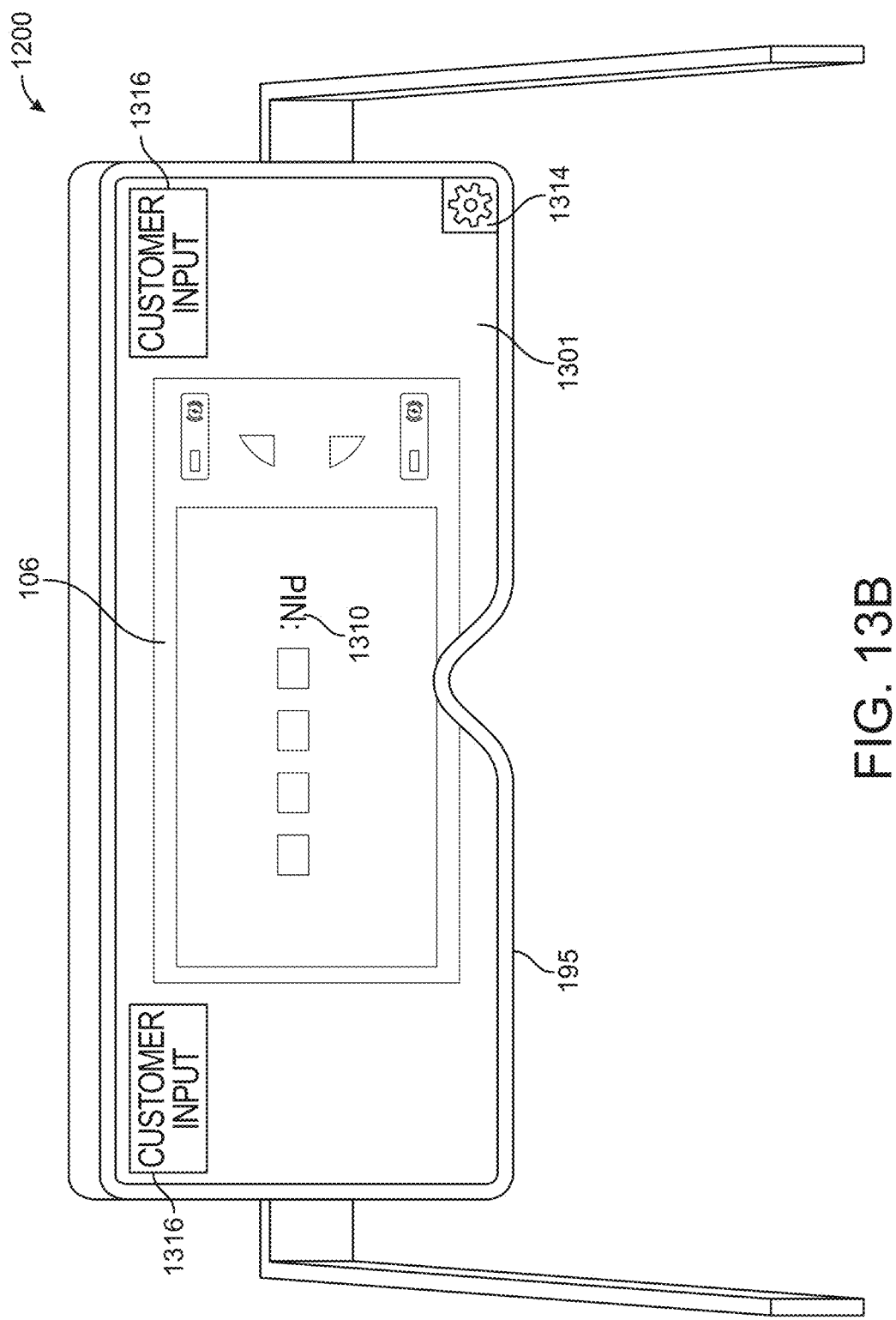

Referring now to FIGS. 13A-13B in more detail. FIG. 13A is shown to include a plurality of graphical interface objects displayed on the headset display 1301 including, an alert 1302 and a request 1304, and a tool icon 1314. In this example, a customer may be wearing the smart headset 195 and receiving the alert 1302 indicating an action should be performed, and the notification 1304 indicating what type of action should be performed (e.g., enter PIN) (e.g., customer view). As shown, and collectively referred to herein, is the "customer view." Further as shown, in the environment 1200, is a smart table 106 and a display 1310 (e.g., touchscreen) displaying a request for the user to enter a PIN. Accordingly, the headset display 1301 notifies the customer utilizing a variety of notifications (e.g., alerts, request and/or status indicators) to perform an action (e.g., enter your PIN)

associated with the smart table provider session. In one example, in response to receiving the notifications, the customer may provide the PIN via a verbalization. In a different example, in response to receiving the notifications, the customer may provide the PIN via an intangible keyboard displayed on the headset display 1301.

FIG. 13B is shown to include a plurality of graphical interface objects displayed on the headset display 1301 including, a request 1316 and a tool icon 1314. In this example, an employee of a provider may be wearing the smart headset 195 and receiving the request 1316 (e.g., "Customer Input") indicating an action should be performed by a customer (e.g., shown in FIG. 13A) (e.g., employee view). As shown, and collectively referred to herein, is the "employee view." Further as shown, in the environment 1200, is a smart table 106 and a display 1310 (e.g., touchscreen) displaying a request for the user to enter a PIN. Accordingly, the headset display 1301 notifies the employee utilizing a variety of notifications (e.g., alerts, request and/or status indicators) to inform the customer to perform an action (e.g., enter their PIN) associated with the smart table provider session. In one example, in response to receiving the notifications, the employee may verbalize to the customer to enter their PIN.

Figure 14A:
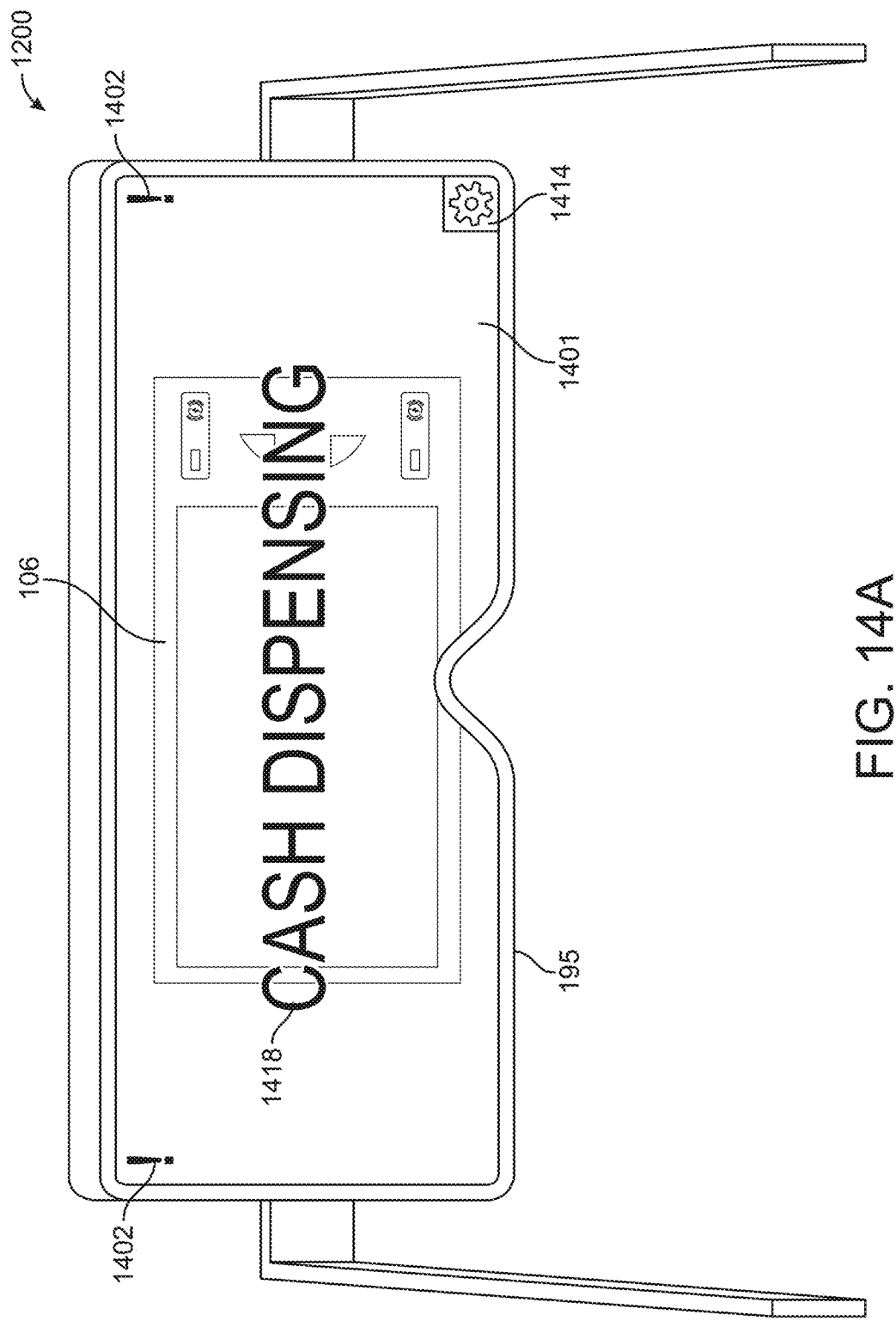
FIGS. 14A-14B are illustrations of various individual views of the smart headset of FIG. 1A, according to example embodiments.
Figure 14B:
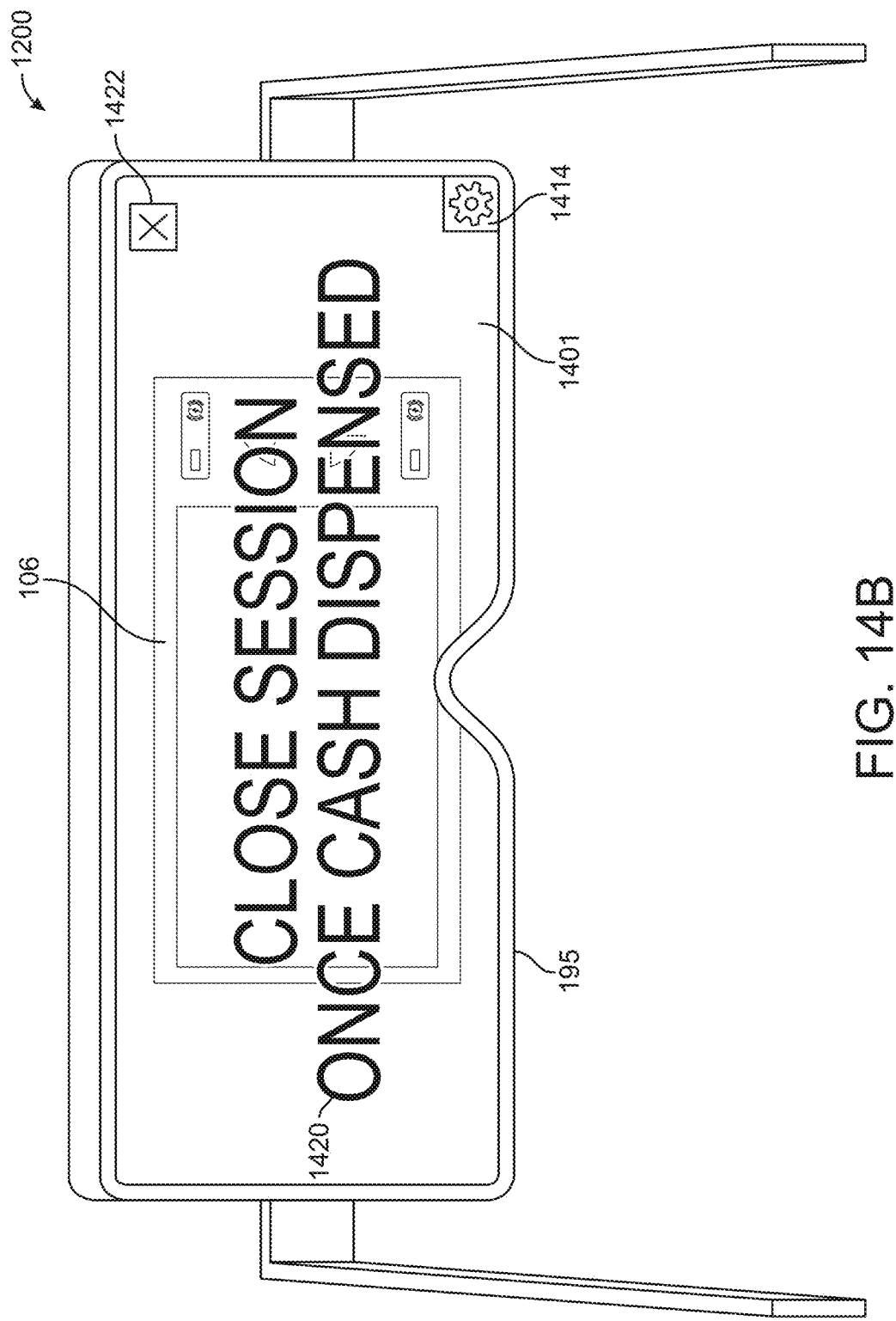

Referring now to FIGS. 14A-14B in more detail. FIG. 14A is shown to include a plurality of graphical interface objects displayed on the headset display 1401 including, alerts 1402 and 1418, and a tool icon 1414. In this example, a customer may be wearing the smart headset 195 and receiving the alerts (e.g., 1402, 1418) indicating cash is dispensing from the cash dispenser (e.g., dispenser management circuit 216 of smart table 106 in FIG. 2A) (e.g., customer view). As shown, in the environment 1200, is a smart table 106 that could dispense the cash. Accordingly, the headset display 1401 notifies the custom smart headset 195 can include one or more processors ser utilizing a variety of notifications (e.g., alerts, request and/or status indicators) that cash is dispensing associated with the smart table provider session. In one example, in response to receiving the notifications, the customer may grab the dispensed cash with their hand.

FIG. 14B is shown to include a plurality of graphical interface objects displayed on the headset display 1401 including, an alert 1420, a close session icon 1422, and a tool icon 1414. In this example, an employee of a provider may be wearing the smart headset 195 and receiving the alerts (e.g., 1420) indicating that once the cash is dispensed to the customer, the employee should close the smart table provider session (e.g., by selecting the close session icon 1422, via intangible feedback) (e.g., employee view). As shown, in the environment 1200, is a smart table 106 that could dispense the cash. Accordingly, the headset display 1401 notifies the employee utilizing a variety of notifications (e.g., alerts, request and/or status indicators) that cash is dispensing and that the smart table provider session should be closed. In various embodiments, the determination that the session should be closed could be based on a variety of factors such as the actions previously performed by the users of the smart table provider session, biological data and/or behavioral data of the users during the smart table provider session, a time (e.g., time limit, current time, and so on), IoT device data (e.g., from the smart table 106, smart headset 195, and/or IoT devices 190) the tasks completed by the users of the smart table provider session, and so on. In one example, in response to receiving the notifications, the employee swipes left utilizing a hand gesture to close the smart table provider session.

Figure 15A:
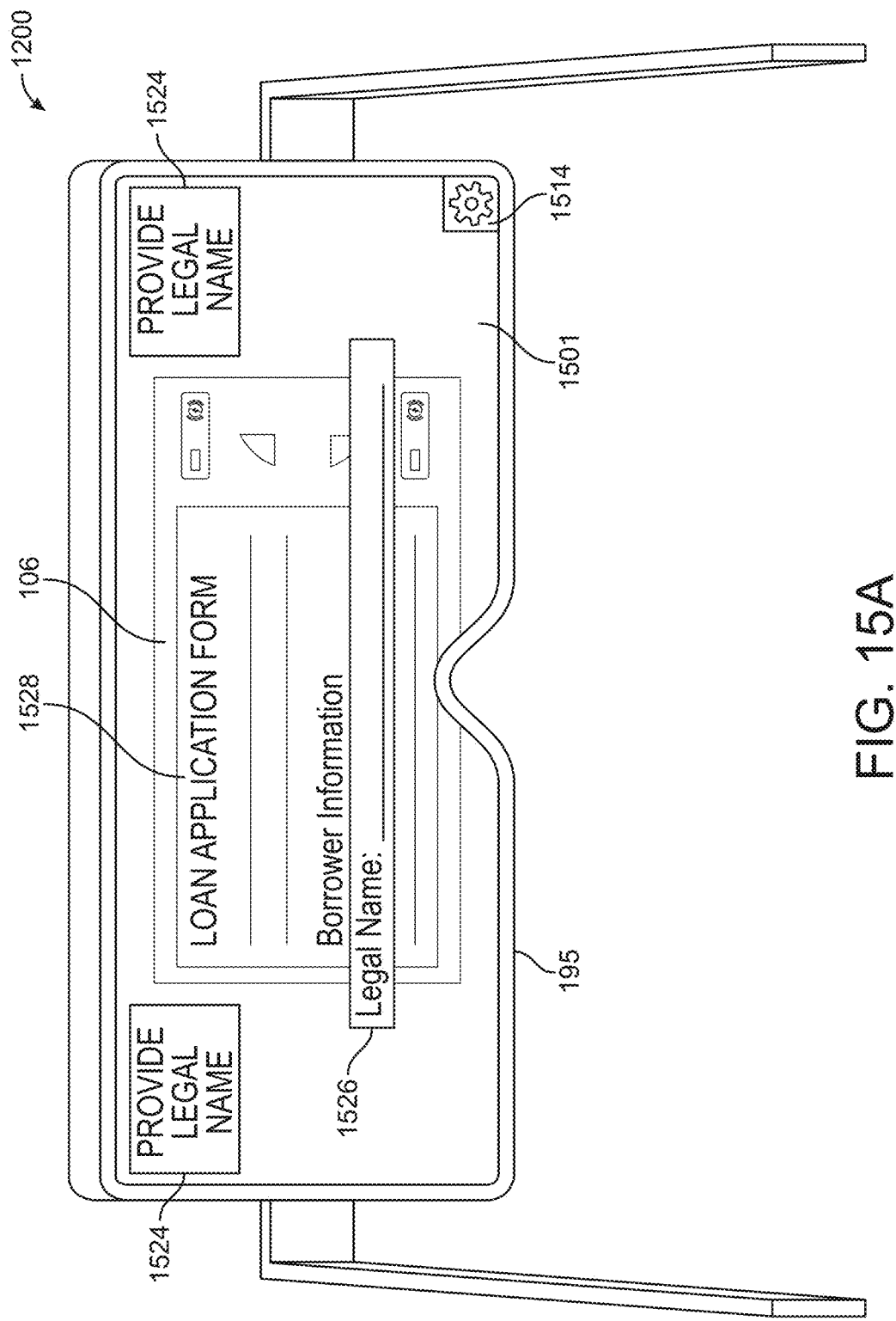
FIGS. 15A-15B are illustrations of various individual views of the smart headset of FIG. 1A, according to example embodiments.
Figure 15B:
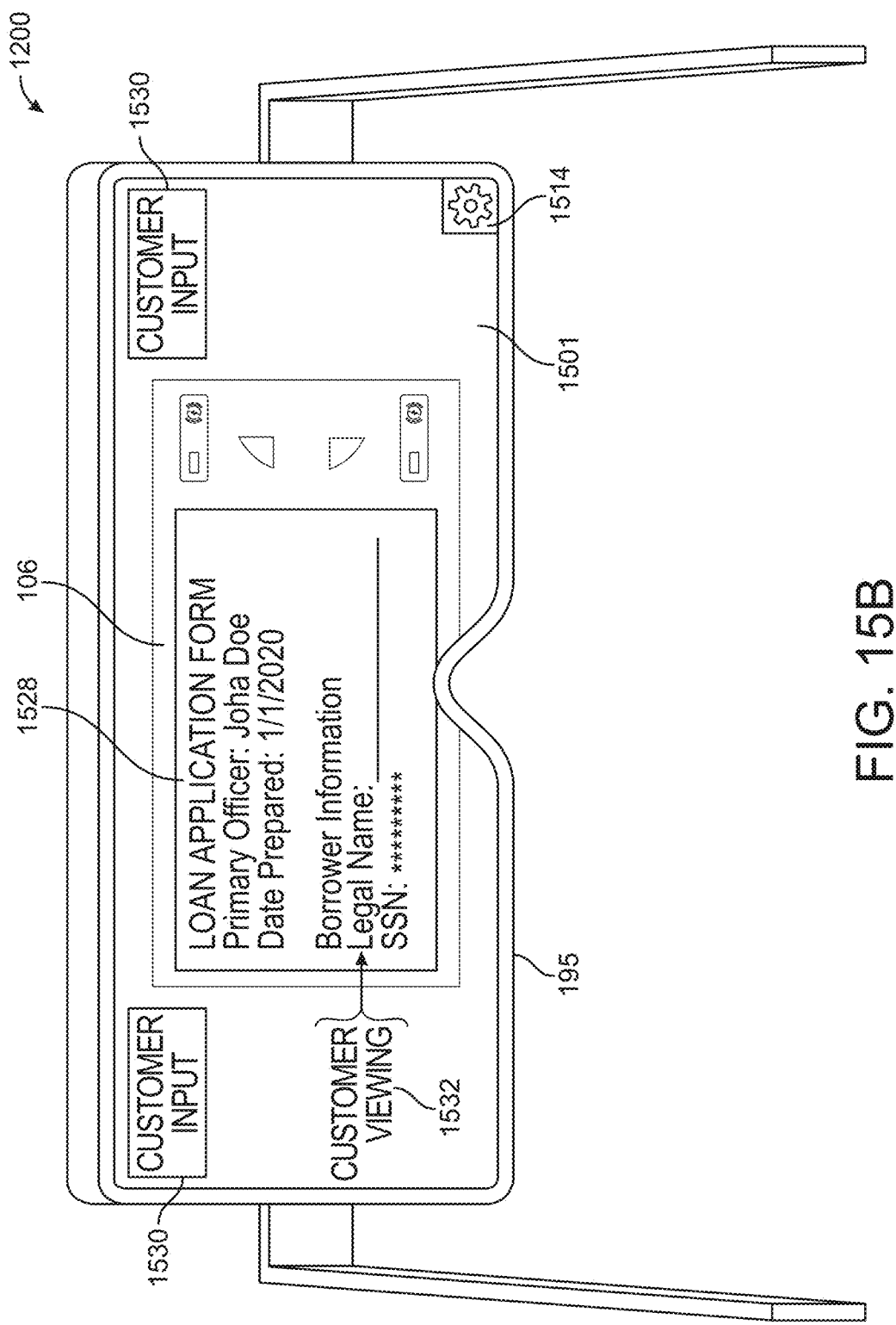

Referring now to FIGS. 15A-15B in more detail. FIG. 15A is shown to include a plurality of graphical interface objects displayed on the headset display 1501 including, a request 1524, a magnification 1526, and a tool icon 1514. In this example, a customer may be wearing the smart headset 195 and receiving the request 1524 indicating to provide their legal name (e.g., customer view). As shown, in the environment 1200, is a smart table 106 and a display 1528 displaying a loan application form. Accordingly, the headset display 1501 overlays the magnification 1526 on the loan application form emphasizing (e.g., directing attention) to the customer to input their legal name here. In one example, in response to receiving the notifications, the customer may provide a hand gesture (e.g., sign language) indicating their legal name. In various embodiments, other techniques can be utilized to emphasize content, such as, but not limited to, highlighting, bolding, underlining, arrows, hiding other content, and so on.

FIG. 15B is shown to include a plurality of graphical interface objects displayed on the headset display 1501 including, a request 1530, an alert 1532, and a tool icon 1514. In this example, an employee may be wearing the smart headset 195 and receiving the request 1530 (e.g., "Customer Input") indicating an action should be performed by a customer (e.g., shown in FIG. 15A) (e.g., employee view). As shown, in the environment 1200, is a smart table 106 and a display 1528 displaying a loan application form. Accordingly, the headset display 1301 overlays the alert 1532 ("Customer Viewing") indicating the customer is viewing a particular part of the display 1528. In one example, the employee may determine the customer has been viewing the legal name field for a long time (e.g., 1 minute, 5 minutes, and so on) and subsequently ask the customer if they need any help. Further, the display 1528 is flipped in FIG. 15B (compared to FIG. 15A if the employee and customer are on two different sides of the table as shown in FIG. 7) such that the employee can view the loan application form in a formatted reading format (e.g., reading up to down, left to right). More, the display 1528 does not show the social security number (SSN) of the customer (e.g., limited access) such that customer and users that have access can only view the SSN. In various embodiments, each user of the smart table provider session may include unique access such that each user can read (e.g., view) and write (e.g., perform actions) during a smart table provider session based on the unique access. In some embodiments, each user may have an account that has a username and password such that each user of each smart table provider session logins to their account to start a smart table provider session. Further, each user may have a specific authorization level to perform specific action and view specific data. For example, an authorization level could be, but is not limited to, basic, medium, high, and top secret. In this example, a basic authorization level may be required when a customer requests to check an account balance; a medium authorization level may be required when a customer requests to change their address and/or remove a joint owner from an account; a high authorization level may be required when a customer requests to apply for a home loan; and a top authorization level may be required when a customer requests to close their account and wire the remaining balance to another account.

Figure 16A:
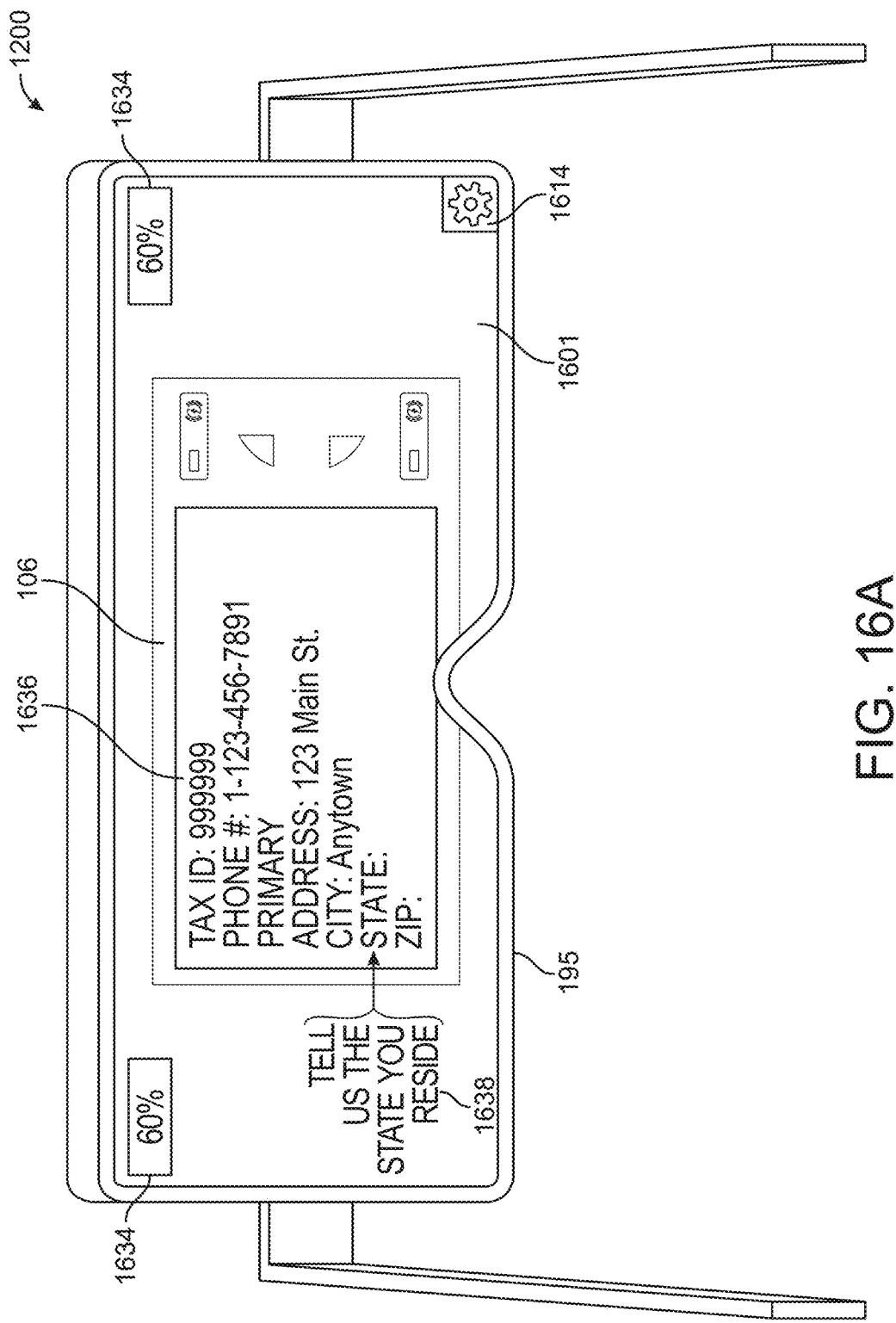
FIGS. 16A-16B are illustrations of various individual views of the smart headset of FIG. 1A, according to example embodiments.
Figure 16B:
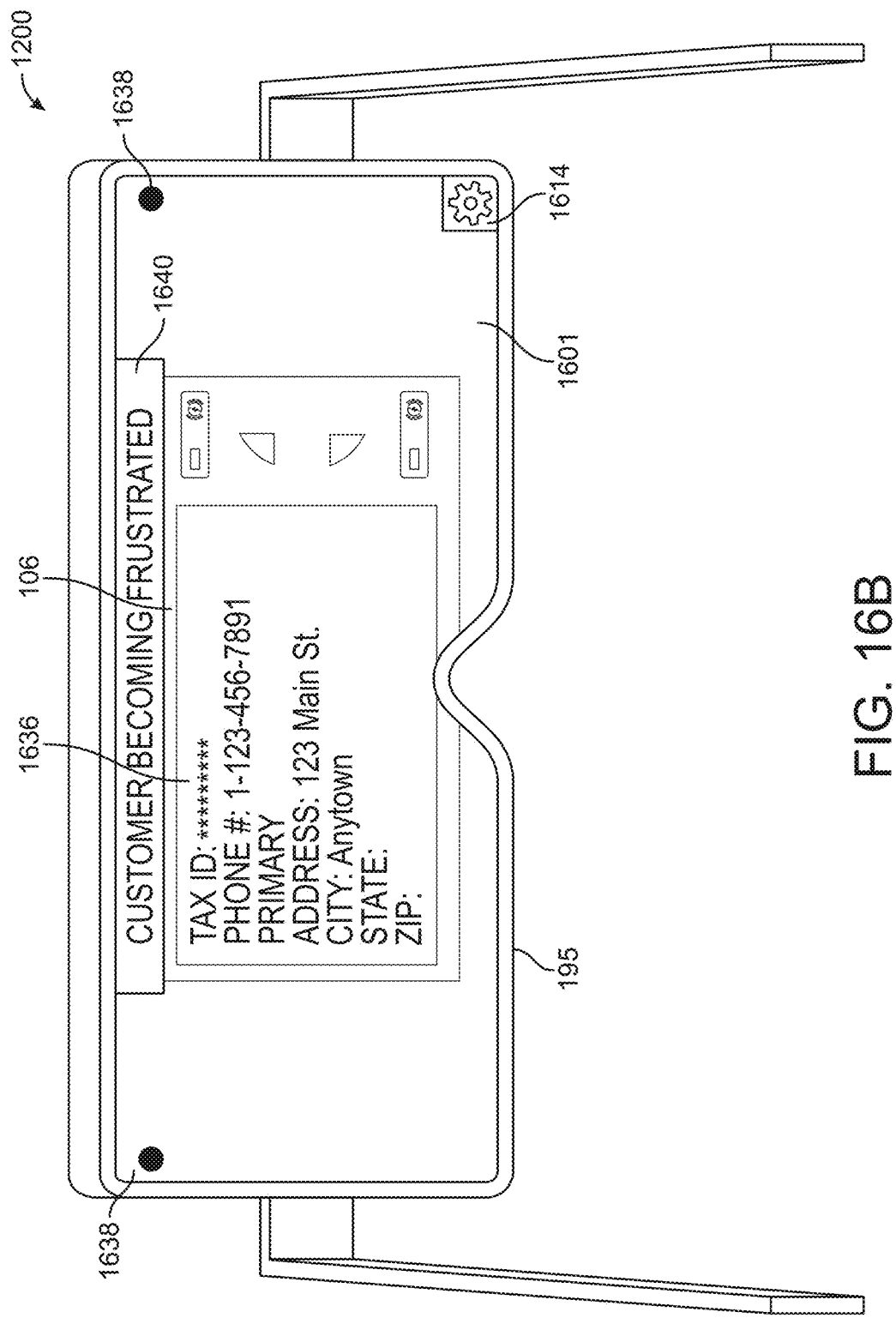

Referring now to FIGS. 16A-16B in more detail. FIG. 16A is shown to include a plurality of graphical interface objects displayed on the headset display 1601 including, a status indicator 1634, a request 1638, and a tool icon 1614. In this example, a customer may be wearing the smart headset 195 and receiving the request 1638 indicating to provide the state the customer resides in (e.g., customer view). As shown, in the environment 1200, is a smart table 106 and a display 1636 displaying a credit card application. Accordingly, the headset display 1601 overlays the request 1638 ("Tell us the state you reside") requesting the customer to input the state they reside in. Further, the headset display 1601 also indicates the percentage completed of the credit card application (e.g., 60%). In one example, in response to receiving the notifications, an input/output device (e.g., 240) of the smart headset 195 may detect and interpret brain wave patterns (e.g., using electroencephalography (EEG), also known as mind reading) to fill in the state of residency of the customer. In another example, a camera in the environment (e.g., as shown in FIG. 12) may record the facial movements of the customer to analyze and fill in the state of residency of the customer.

FIG. 16B is shown to include a plurality of graphical interface objects displayed on the headset display 1601 including, a status indicator 1638, an alert 1640, and a tool icon 1614. In this example, an employee may be wearing the smart headset 195, receiving the alert 1640 indicating the customer is becoming frustrated (e.g., level of stress), and shown the status indicator 1638 (e.g., various colors given for various statuses) indicating the customers current status (e.g., red is stressed, green is happy, yellow is undetermined, and so on) (e.g., employee view). As shown, in the environment 1200, is a smart table 106 and a display 1636 displaying a credit card application. In one example, in response to receiving the notifications and a determination that the customer is frustrated, the employee may override the customer and fill in the credit card application instead of the customer. In another example, in response to receiving the notifications and a determination that the customer is frustrated, a cup of water may be automatically filled and presented to the customer via an input/output device (e.g., 220) of the smart table 106 (e.g., automatic water dispenser).

Referring now to FIGS. 17A-17F in more detail. Each of FIGS. 17A-17F are shown to include a sub-view menu display, displayed on the headset display 1701 including a plurality of sub-views that can include a plurality of statistics regarding various sessions. For example, sub-views can include, but not limited to, a stress level sub-view 1742, a completion percentage sub-view 1744, a session task sub-view 1746, a session audio sub-view 1748, a metrics sub-view 1750, an administrative sub-view 1752. In some embodiments, statistics can include stress level, completion percentage, employees' cognitive ability, session elapsed time, other various session statistics over a period of time (e.g., current session, one hour, one day, one week, one month, and so on), and so on. In one example, the one or more processors of the smart headset 195 can determine and/or track how much memory (e.g., statistic) has been allocated to various tasks and notifications displayed on the headset display 1701. In this example, the one or more processors of the smart headset 195 can adjust the various tasks and notifications based on how much memory has been allocated (e.g., unselect certain configurations, remagnify, demagnify, remove certain tasks and/or notifications) such that the one or more processors are actively tracking memory usage throughout sessions.

In various embodiments, various users may have access to the side menu display (e.g., manager, chief operating officer (CEO), auditor, administrator, supervisor, principal, and so on). As shown, and collectively referred to herein, is the "manager view." Further as shown, in the environment 1200, is a plurality of smart tables 106 with a plurality of individuals, where each individual may be paired with a smart headset 195 and/or smart table 106 and may be in an active smart table provider session.

Figure 17A:
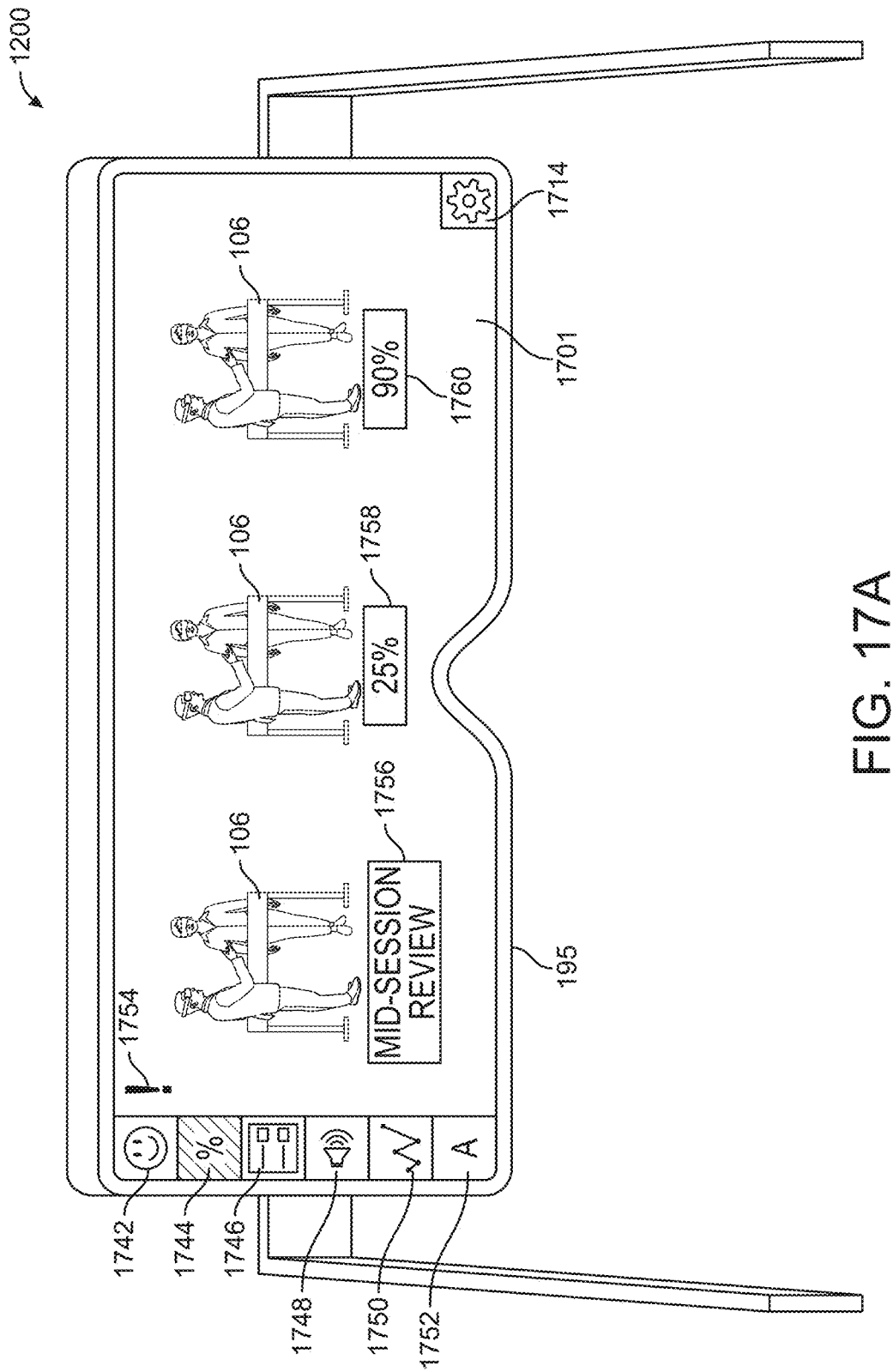
FIGS. 17A-17F are illustrations of various individual views of the smart headset of FIG. 1A, according to example embodiments.

FIG. 17A is shown to include a plurality of graphical interface objects displayed on the headset display 1701 including, a sub-view menu (e.g., 1742, 1744, 1746, 1748, 1750, 1752), an alert 1754, a plurality of completion percentage alerts (e.g., 1756, 1758, 1760), and a tool icon 1714. In this example, a manager may be wearing the smart headset 195 and selected the completion percentage sub-view 1744, such that each smart table provider session (e.g., three shown) is indicated with the percentage completed of a task and/or session. As shown, completion percentage alert 1756 does not include a percentage and instead displays a mid-session review alert that could be indicative of a 50% completion. The alert 1754 may also indicate an action is to be performed by the manager (e.g., review the current smart table provider session). Also as shown, in the environment 1200, is a plurality of smart tables 106. In one example, in response to receiving the notifications, the manager may travel to the smart table associated with the alert 1754 and perform a review (e.g., as described in detail with reference to FIG. 17F). In various embodiments, the completion percentage may be determined based on the progress of the current task and/or smart table provider session.

Figure 17B:
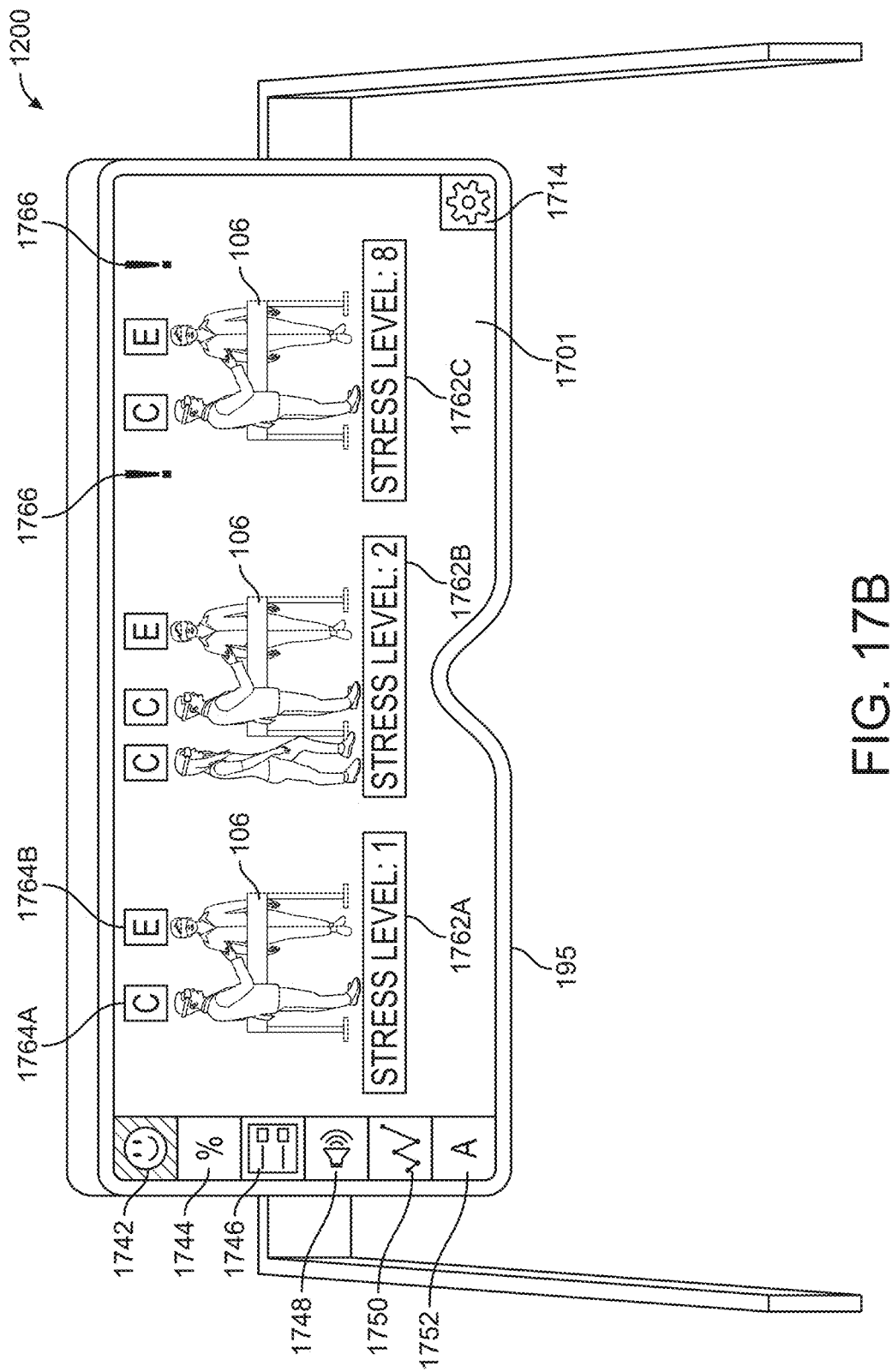

FIG. 17B is shown to include a plurality of graphical interface objects displayed on the headset display 1701 including, a sub-view menu (e.g., 1742, 1744, 1746, 1748, 1750, 1752), alerts 1762A, 1762B, and 1762C (collectively referred to herein as "alerts 1762"), alerts 1764A and 1764B, alert 1766, and a tool icon 1714. In this example, a manager may be wearing the smart headset 195 and selected the stress level sub-view 1742, such that each smart table provider session (e.g., three shown) is indicated with a stress level (e.g., alerts 1762) and each individual is designated a user type (e.g., alerts 1764A and 1764B), such as, customer (C), employee (E), and so on. The alert 1766 may also indicate an action is to be performed by the manager (e.g., mitigate stress). Also as shown, in the environment 1200, is a plurality of smart tables 106. In one example, in response to manager analyzing the environment 1200, the manager may step into smart table provider session associated with the alert 1766 to help mitigate stress. In various embodiments, stress level and user types may be determined (e.g., by a processor) based on retrieving various input/output devices (e.g., 122, 152, 134, 220, 240, 190, and so on).

Figure 17C:
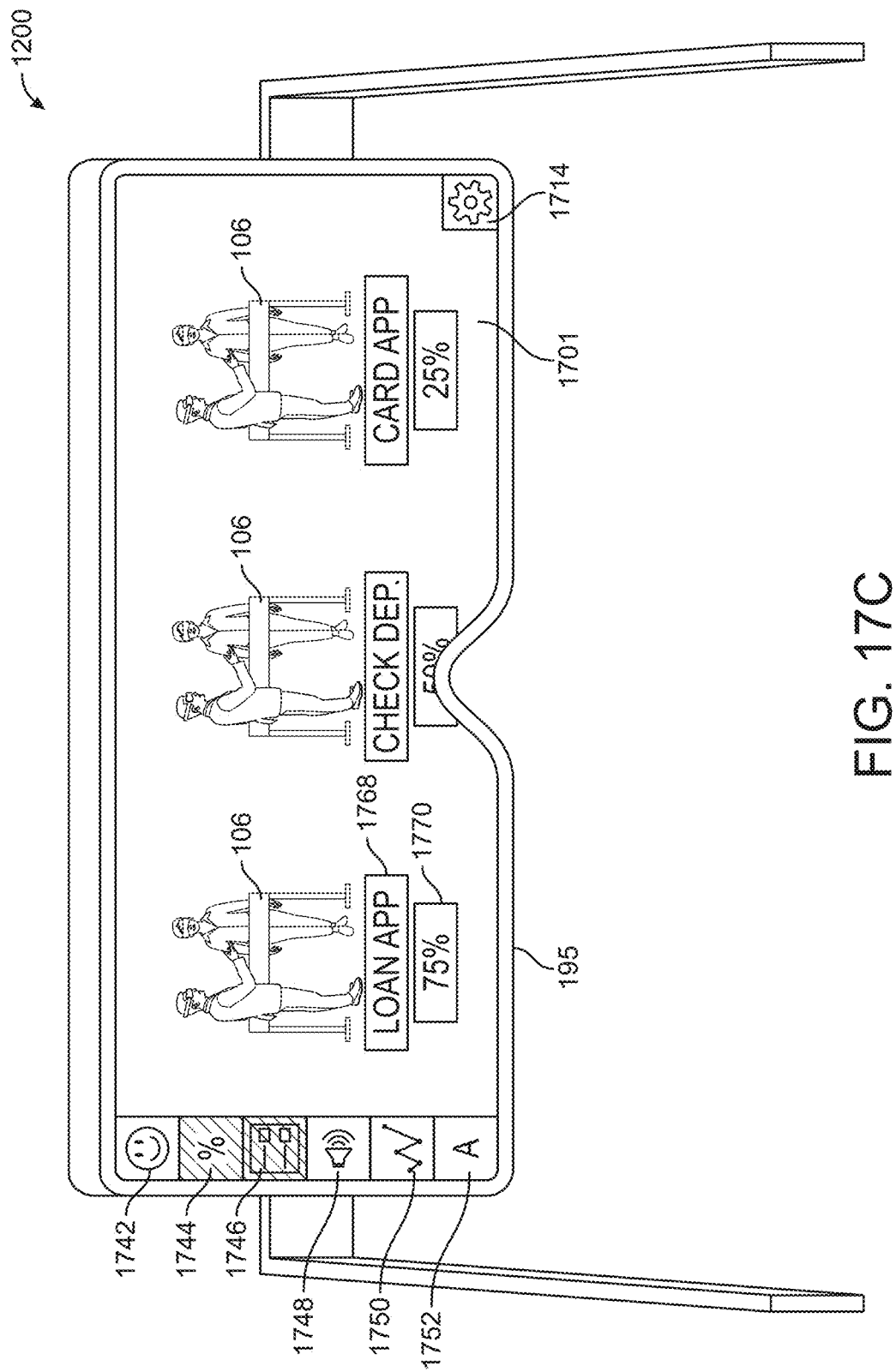

FIG. 17C is shown to include a plurality of graphical interface objects displayed on the headset display 1701 including, a sub-view menu (e.g., 1742, 1744, 1746, 1748, 1750, 1752), an alert 1768, and a completion percentage alert 1770. In this example, a manager may be wearing the smart headset 195 and selected the completion percentage sub-view 1744 and the session task sub-view 1746, such that each smart table provider session (e.g., three shown) is indicated with the percentage completed of a task and/or session and the task currently being completed (e.g., loan app, check deposit, card application, and so on). Also as shown, in the environment 1200, is a plurality of smart tables 106. In one example, in response to receiving the notifications, the manager may schedule a waiting customer to utilize the smart table 106 associated with the highest completion percentage (e.g., 75%) once the smart table provider session is completed.

Figure 17D:
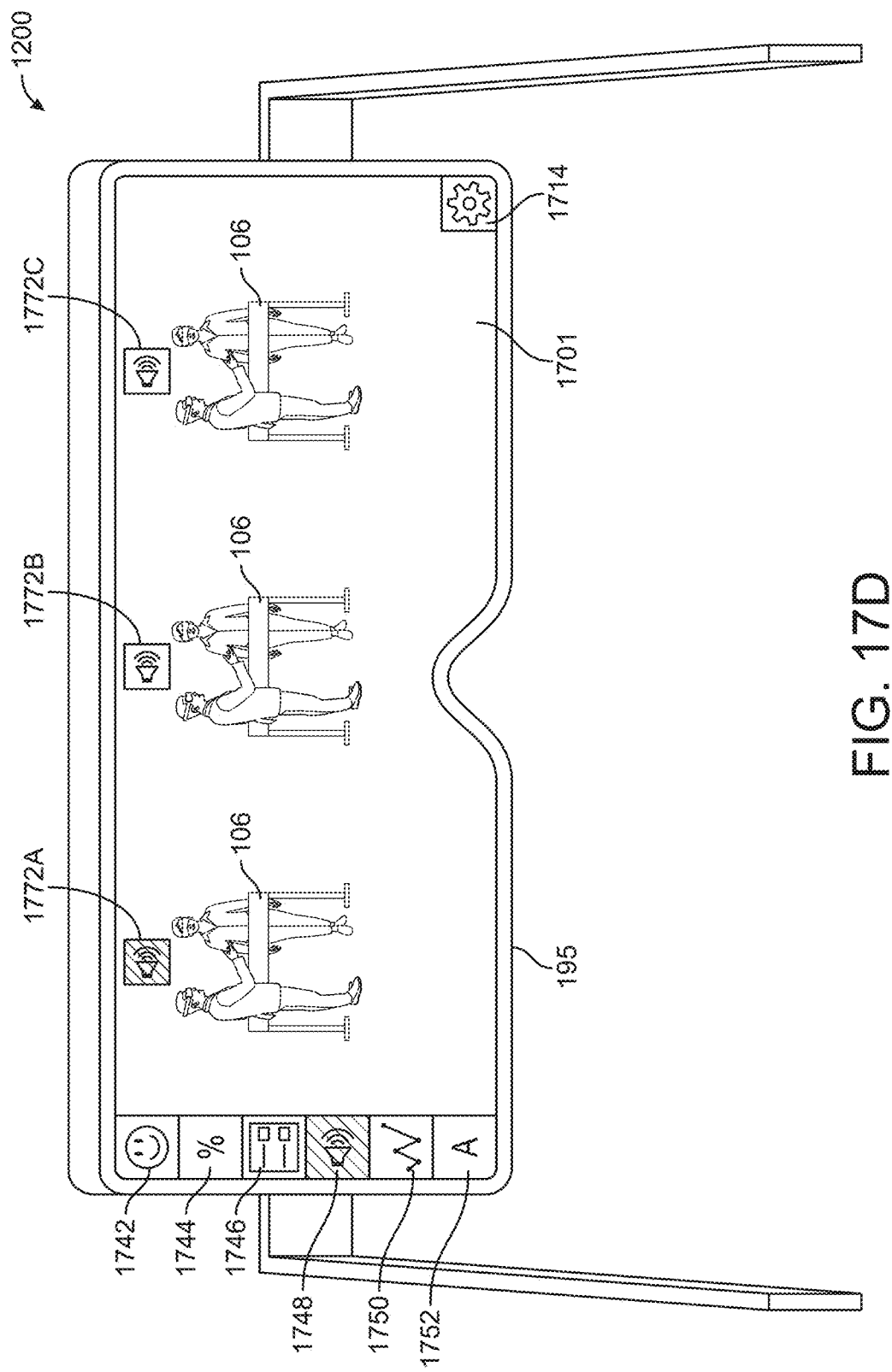

FIG. 17D is shown to include a plurality of graphical interface objects displayed on the headset display 1701 including, a sub-view menu (e.g., 1742, 1744, 1746, 1748, 1750, 1752), audio connections 1772A, 1772B, and 1772C

(collectively referred to herein as "audio connections 1772"), and a tool icon 1714. In this example, a manager may be wearing the smart headset 195 and selected the session audio sub-view 1748, such that each smart table provider session (e.g., three shown) includes an overlay audio connections 1772 overlaid above the smart table 106. Also as shown, in the environment 1200, is a plurality of smart tables 106. In one example, in response to selecting audio connection 1772A, the manager may listen (e.g., audio) in on the conversation currently occurring during the smart table provider session. In various embodiments, the audio of the conversation may be retrieved (e.g., by a processor) from various input/output devices (e.g., 122, 152, 134, 220, 240, 190, and so on). In various embodiments, the audio can be saved (e.g., stored in smart table database 209 and/or smart headset database 229) for utilization in artificial intelligence (AI) analysis in the future. In one example, the audio saved can be utilized as input into an AI model and an output prediction can include a transaction of the audio saved. In this example, the transaction could be utilized to determine stress level (e.g., trigger words (e.g., "whatever," "I'm annoyed," and so on), emotional words ("I cannot wait till I'm done today," "I'm not having a good day," and so on), current session progress (e.g., 50% complete since the checks were printed and individual said "here are your checks," 100% complete since an individual said "have a nice day," progress went from 45% to 25% because an individual said "lets retry that," and so on), and/or employees' cognitive ability (e.g., slurring words, talking slow, mispronouncing words, and so on), and so on.

In various embodiments, previously collected IoT device data (e.g., audio files, images, recording, any other IoT device data, and so on) can be used to train a machine-learning model. That is, predictions regarding smart table provider sessions could be based on artificial intelligence or a machine-learning model. For example, a first machine-learning model may be trained to identify particular biometric samples (e.g., fingerprint, face, hand) and output a prediction. In this example, a second machine-learning model may be trained to identify to particular individual based on the audio of their voice. In other examples, a machine-learning model may be trained to stitch presented documents and perform obstruction removal (e.g., hand, head, foot, and so on) associated with a smart table provider session. In various arrangements, authenticating the user and/or performing various actions in a smart table provider session may include utilizing a machine learning algorithm (e.g., a neural network, convolutional neural network, recurrent neural network, linear regression model, and sparse vector machine). The various computing systems/devices described herein can input various data (e.g., biological, behavioral, biometric, geographic, IoT device data and so on) into the machine learning model, and receive an output from the model indicating a particular action to perform (by the processing circuit, for example, 112, 126, 138, 204, 224). In one example, IoT device data may be inputted into the model and the output prediction may be a stress level prediction of a user, to which the stress level is displayed (e.g., graphical user interface updated) to a user in a view (e.g., manager view).

Figure 17E:
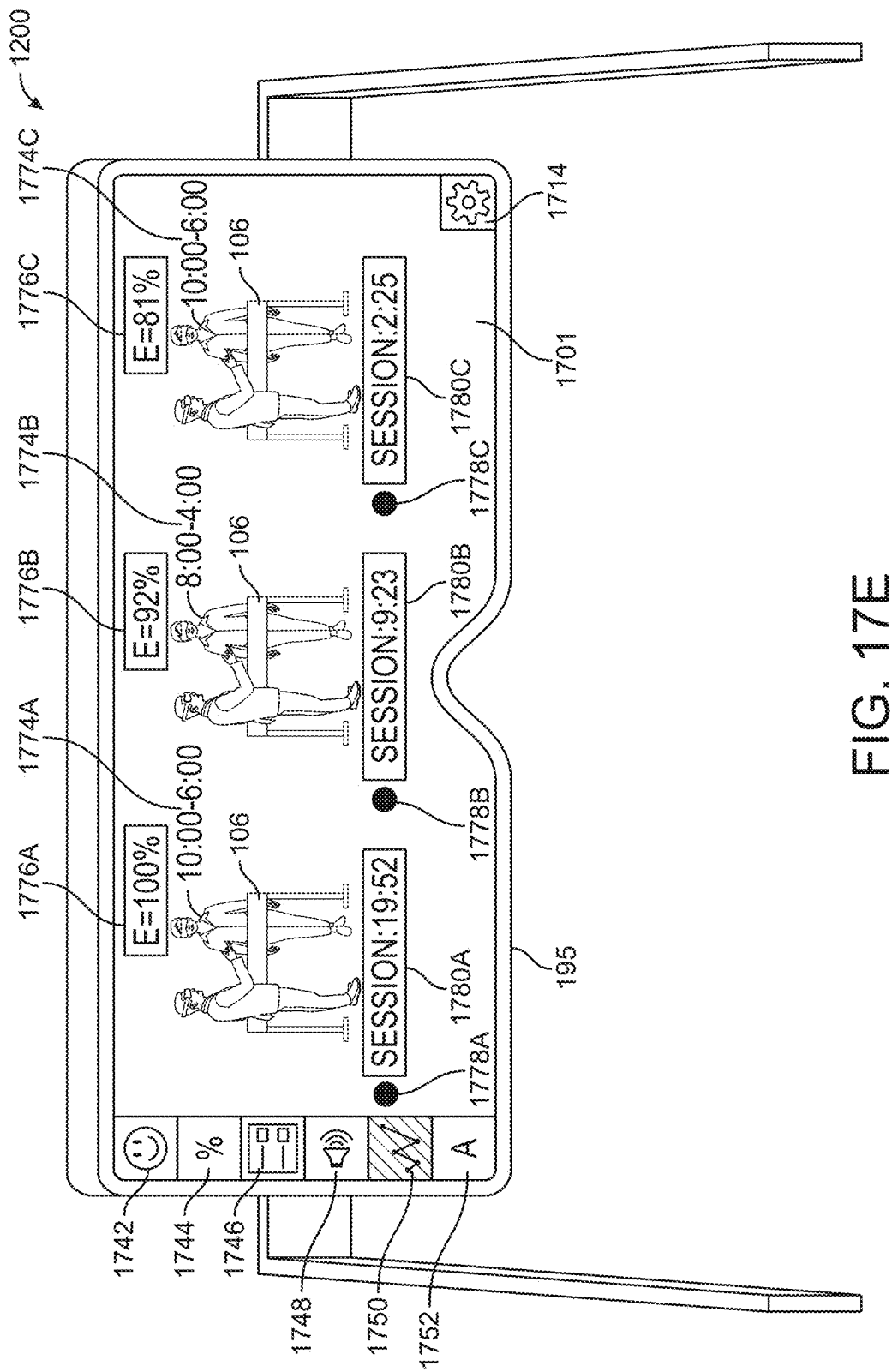

FIG. 17E is shown to include a plurality of graphical interface objects displayed on the headset display 1701 including, a sub-view menu (e.g., 1742, 1744, 1746, 1748, 1750, 1752), status indicators 1778A, 1778B, 1778C (collectively referred to herein as "status indicators 1778"), and various metric alerts (e.g., 1774A, 1774B, 1774C, 1776A, 1776B, 1776C, 1780A, 1780B, and 1780C), and a tool icon 1714. In this example, a manager may be wearing the smart headset 195 and selected the metrics sub-view 1750, such that each smart table provider session (e.g., three shown) indicates various metrics. As shown, various metrics includes, but not limited to, a current session time (e.g., 1780A, 1780B, 1780C—how long the smart table provider session has occurred), an employees' cognitive ability (e.g., 1776A, 1776B, 1776C—mental capability to perform tasks), and each employees shift start, and end time (e.g., 1774A, 1774B, 1774C). The alert 1754 may also indicate an action is to be performed by the manager (e.g., review the current smart table provider session). Also as shown, in the environment 1200, is a plurality of smart tables 106. Further as shown, and with reference to FIG. 16B, is status indicators 1778 indicative of a variety of properties associated with a smart table provider session (e.g., level of stress, completion percentage (e.g., 0%-40% is red, 41%-89% is yellow, and 90%-100% is green), session time (e.g., below 10 minutes is green, between 10-20 minutes is yellow, and above 20 minutes is red). In one example, in response to receiving the notifications, the manager may travel to the smart table where an employee's cognitive ability (e.g., 1776C) is deteriorating (e.g., falling below a threshold) and ask the employee to take a break such the manager can finish the smart table provider session. In another example, in response to a yellow status indicator (e.g., 1778A) indicating the time of session is longer than a normal session, the manager may intervene and determine the cause for the longer than normal session. In various embodiments, the cognitive ability, current session time may be determined (e.g., by a processor) based on retrieving various input/output devices (e.g., 122, 152, 134, 220, 240, 190). In various embodiments, the shift start, and end time may be determined (e.g., by a processor) based on retrieving data from various sources (e.g., 102, 104, 108, 195, 106, 190, and so on). In some embodiments, the one or more processing circuits of the various computing systems/devices described herein automatically (e.g., in real-time) send notifications to various users of smart table provider sessions.

In various embodiments, the headset display 1701 can incorporate historical data from previous sessions regarding an individual or a collections of individuals. For example, the previous levels of stress (e.g., stored in smart table database 209 and/or smart headset database 229) of a specific individual can be utilized to calculate a current stress level of the specific individual. In this example, different weights (e.g., 0.25, 0.75) can be associated with historical data such that levels of stress can be calculated by incorporating current stress (e.g., with a factor of 0.75) and previous stress (e.g., with a factor of 0.25) such that an overall stress level can be calculated. In this example, if stress level was a scale between zero and a hundred and the current stress level was 82 and the previous stress level (e.g., for the last 7 days) was 56, the level of stress would be 75.5 (e.g., ((82×0.75)+(56×0.25))=61.5+14.0=75.5). In other examples, various other calculations and factors may be utilized to calculate various statistics utilizing various data (e.g., current and/or historical).

Figure 17F:
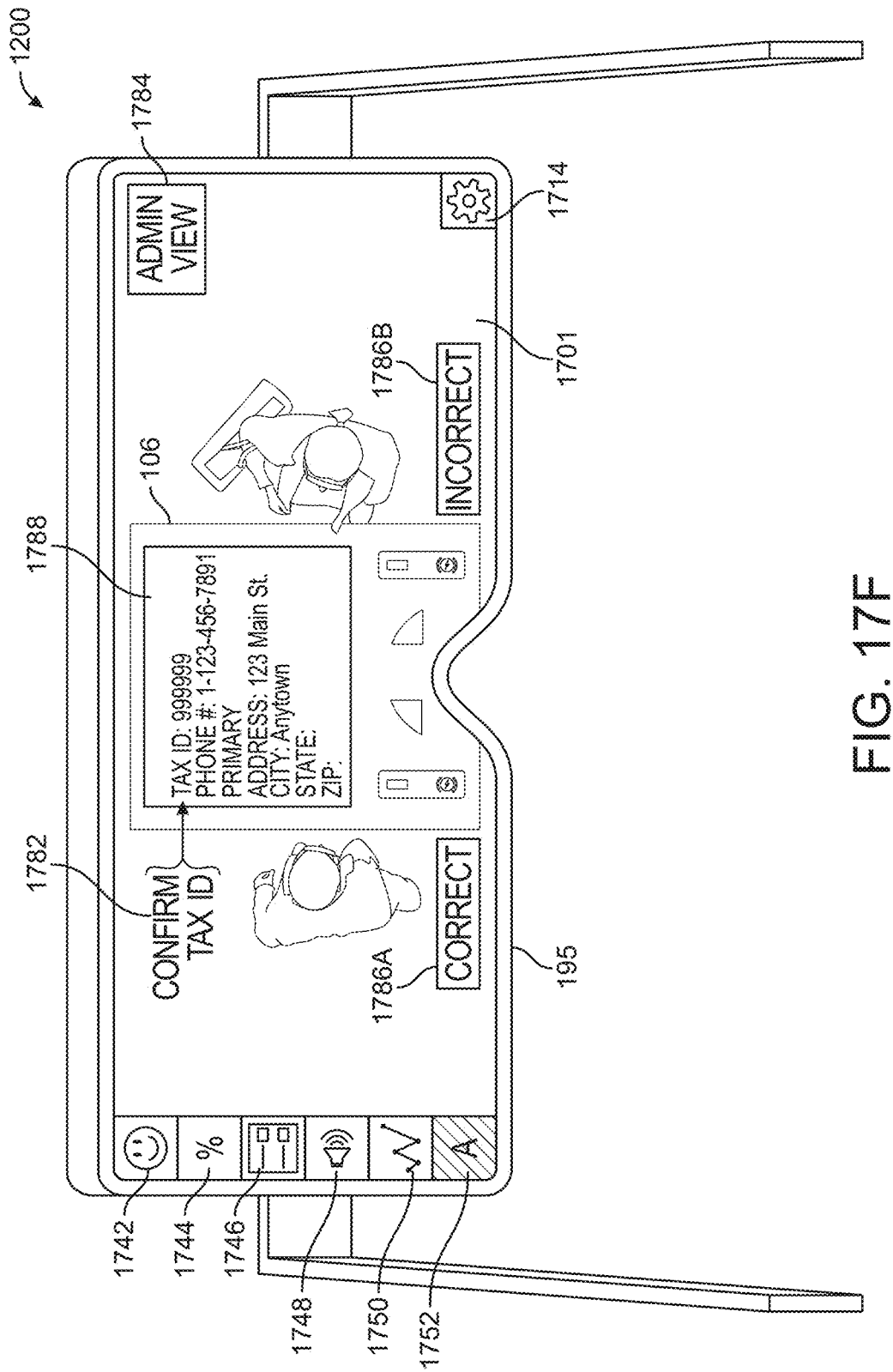

FIG. 17F is shown to include a plurality of graphical interface objects displayed on the headset display 1701 including, a sub-view menu (e.g., 1742, 1744, 1746, 1748, 1750, 1752), a request 1782, requests 1786A and 1786B, an alert 1784, and a tool icon 1714. In this example, a manager may be wearing the smart headset 195 and selected the administrative sub-view 1752 (e.g., in response to intervening in a smart table provider session), such that each smart table provider session (e.g., one shown) can include an administrative view (referred to herein as "admin view") such that elevated access is provided to perform tasks that may not be able to be performed by some users. In some embodiments, one or more processing circuits may log each action performed in the admin view (e.g., for auditing purposes) and each time the admin view is viewed, a user may be required to authenticate themselves (e.g., using a username and password, biometric, user device, and so on). As shown, request 1782 indicates the manager should confirm the tax ID of the customer (e.g., with reference to FIGS. 16A and 16B). Also as shown, to confirm the tax ID, the manager may select one of the requests 1786A or 1786B indicating the tax ID is correct or it is incorrect. Also as shown, in the environment 1200, is a smart table 106 and a display 1788 (e.g., touchscreen) displaying a credit card application. Accordingly, the headset display 1701 overlays the request 1786A and 1768B requesting the manager to indicate if the tax ID is correct. In one example, in response to the manager reviewing the tax ID, the manager may provide the indication of correctness via a verbalization. In a different example, in response to the manager reviewing the tax ID, the manager may provide a selection via the intangible button displayed on the headset display 1701.

Figure 18:
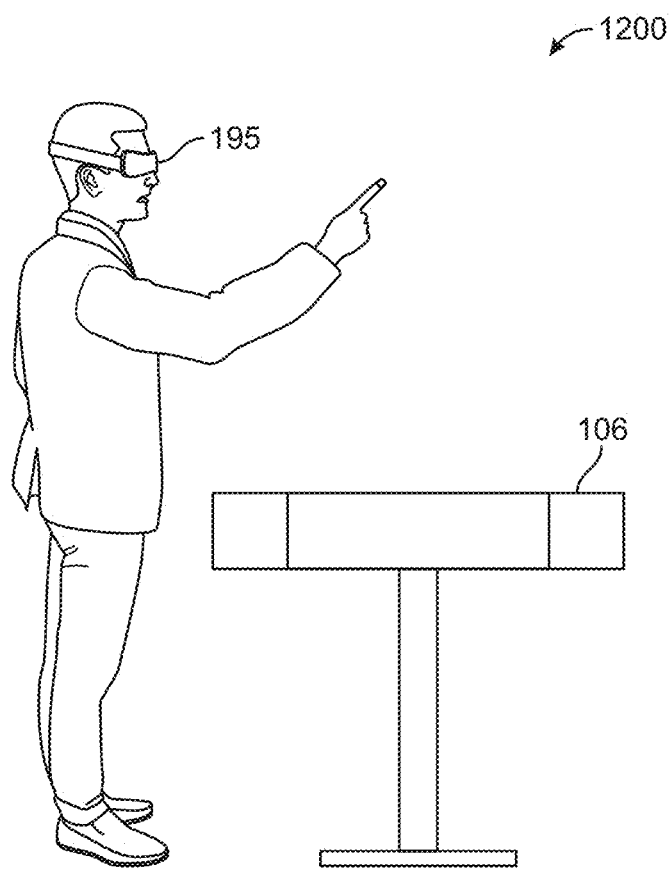
FIG. 18 is an illustration of the smart table and smart headsets of FIG. 1A in an environment, according to example embodiments.

Referring now to FIG. 18, an illustration of the smart table 106 and smart headsets 195 of FIG. 1A in the environment 1200 (with reference to FIG. 12 above), according to example embodiments. The user is shown providing intangible feedback by completing a selection of objects shown on the display of the smart headset 195. Accordingly, the user of a smart headset 195 before, during, or after, a smart table provider session can complete selections of objects based on the retrieving and/or receiving (e.g., by a processor) data from various input/output devices (e.g., 122, 152, 134, 220, 240, 190, and so on) indicating a selection occurred (e.g., raise hand and point, wave hand, kick foot, nod head, and so on, with reference to FIGS. 13-17 shown above).

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the smart table system may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A smart table system comprising:
   an interactive surface of a smart table comprising:
      a touchscreen; and
      a plurality of interactive surface sensor devices;
   a plurality of smart headsets comprising:
      a transparent display;
      a plurality of smart headset sensor devices, each of the smart headsets configured to be respectively worn by an individual;
   a processing circuit configured to:
      detect a session trigger event based on detecting a first user device is within a wireless communication range of the smart table system;
      in response to the session trigger event, provide an indication to the first user device on which smart headset of the plurality of smart headsets to wear;
      initiate a user session based on detecting the session trigger event, wherein initiating the user session comprises authenticating a plurality of user devices and pairing each of the plurality of user devices with the smart table, wherein the user session is between a customer of a provider with the first user device of the plurality of user devices and an employee of the provider with a second user device of the plurality of user devices, and wherein the user session comprises establishing communication between the plurality of smart headsets, the smart table, the plurality of user devices, and the processing circuit;
      determine a level of authentication associated with the customer based on authenticating the first user device;
      update the interactive surface indicating successful pairing of the plurality of user devices with the smart table;
      generate, in response to initiating the user session, graphical user interfaces for each of the smart headsets, wherein at least one graphical user interface of the graphical user interfaces is generated based on the level of authentication;
      provide the graphical user interfaces to each of the smart headsets;
      receive sensor device data associated with at least one of biological data, behavioral data, or a user input from at least one of the plurality of interactive surface sensor devices or the plurality of smart headset sensor devices;
      monitor, during the user session, biometric data of at least one individual wearing at least one of the plurality of smart headsets;
      update, in response to receiving the sensor device data and monitoring the biometric data of the at least one individual during the user session, a first graphical user interface for a first smart headset of the smart headsets based on the sensor device data, wherein the first graphical user interface unique to the first smart headset and is worn by a first individual, and wherein the updated first graphical user interface comprises a first alert or request displayed on the transparent display of the first smart headset;
      update, in response to receiving the sensor device data and monitoring the biometric data of the at least one individual during the user session, a second graphical user interface for a second smart headset of the smart headsets based on the sensor device data, and wherein the second graphical user interface unique to the second smart headset and is worn by a second individual different than the first individual, and wherein the updated second graphical user interface comprises a second alert or request displayed on the transparent display of the second smart headset; and
      wherein the updating the first graphical user interface and the second graphical user interface occurs simultaneously during the user session, and wherein the first graphical user interface and the second graphical user interface share a graphical interface object, and wherein the updating of the first graphical user interface and the second graphical user interface comprises updating the first alert or request on the first graphical user interface and updating the second alert or request on the second graphical user interface.

2. The smart table system of claim 1, wherein each of the first graphical user interface and the second graphical user interface is configured to display content that is unique to each of the smart headsets and is based on at least on one of a user preference or the sensor device data.

3. The smart table system of claim 2, wherein the user preference comprises size and color parameters of a user, and wherein the processing circuit is configured to adjust the content displayed on each of the first graphical user interface and the second graphical user interface.

4. The smart table system of claim 1, wherein the processing circuit is configured to continuously update each of the first graphical user interface and the second graphical user interface in real-time, the first graphical user interface and the second graphical user interface comprising a combination of a set of views comprising content based on the sensor device data, wherein each of the set of views comprises a subset of views.

5. The smart table system of claim 4, wherein the set of views comprise a table view and a plurality of smart headset views, and the subset of views comprises a customer view, a provider view, and a manager view, and wherein each of the subset of views comprises different content unique to the individual.

6. The smart table system of claim 1, wherein the processing circuit is further configured to:
receive, from a microphone, sound input from the customer, wherein the customer is the first individual; and
update the first graphical user interface of the first smart headset of the smart headsets based on the sound input, wherein the first graphical user interface update comprises updating first content of the first graphical user interface;
update the second graphical user interface of the second smart headset of the smart headsets based on the sound input, wherein the second graphical user interface update comprises updating second content of the second graphical user interface different from the first content.

7. The smart table system of claim 1, wherein the first user device is configured to communicate over a network with a network circuit of the smart table system and to provide authentication information of the customer to the network circuit, wherein the authentication information is at least one of a customer password, the biometric data, or a geometric information.

8. The smart table system of claim 1, wherein the biological data, the behavioral data, or the user input is indicative of at least one of a user sentiment, a user emotion, a user attentiveness, a user gesture, or a user preference.

9. A smart table system comprising:
a plurality of devices comprising a camera, a microphone, and a stress sensor, each device configured to collect first device data;
a plurality of smart headsets comprising a transparent display and coupled to a plurality of smart headset sensor devices, the smart headset sensor devices configured to collect second device data, wherein the second device data is smart headset sensor device data, and each of the smart headsets are configured to be worn by an individual;
an interactive surface of a smart table comprising a touchscreen; and
a processing circuit configured to:
detect a session trigger event based on detecting a first user device is within a wireless communication range of the smart table system;
initiate a user session based on detecting the session trigger event, wherein initiating the user session comprises authenticating a plurality of user devices and pairing each of the plurality of user devices with the smart table, wherein the user session is between a customer of a provider with the first user device of the plurality of user devices and an employee of the provider with a second user device of the plurality of user devices, and wherein the user session comprises establishing communication between the plurality of smart headsets, the smart table, the plurality of user devices, and the processing circuit;
update the interactive surface indicating successful pairing of the plurality of user devices with the smart table;
generate, in response to initiating the user session, graphical user interfaces for each of the smart headsets;
provide the graphical user interfaces to a respective smart headset;
monitor, during the user session, biometric data of at least one individual wearing at least one of the plurality of smart headsets;
update a first graphical user interface of the graphical user interfaces for a first smart headset of the smart headsets based on the first device data or the second device data, and wherein the updated first graphical user interface comprises a first alert or request displayed on the transparent display of the first smart headset;
update a second graphical user interface of the graphical user interfaces for a second smart headset of the smart headsets based on the first device data or the second device data, and wherein the updated second graphical user interface comprises a second alert or request displayed on the transparent display of the second smart headset; and
wherein the first graphical user interface is unique to the first smart headset and is worn by a first individual, and wherein the second graphical user interface is unique to the second smart headset and is worn by a second individual different than the first individual, and wherein the updating the first graphical user interface and the second graphical user interface occurs simultaneously during the user session, and wherein the first graphical user interface and the second graphical user interface share a graphical interface object, and wherein the updating of the first graphical user interface and the second graphical user interface comprises updating the first alert or request on the first graphical user interface and updating the second alert or request on the second graphical user interface.

10. The smart table system of claim 9, wherein each of the first graphical user interface and the second graphical user interface is configured to display content that is unique to each of the smart headsets and is based on at least one of a user preference, the first device data, or the second device data.

11. The smart table system of claim 9, wherein the processing circuit is configured to continuously update each of the first graphical user interface and the second graphical user interface in real-time, the first graphical user interface and the second graphical user interface comprising a combination of a set of views comprising content based on the first device data and the second device data, wherein each of the set of views comprises a subset of views.

12. The smart table system of claim 9, wherein the first user device is configured to communicate over a network with a network circuit of the smart table system, and configured to provide authentication information of the customer to the network circuit, wherein the authentication information is at least one of a customer password, the biometric data, or a geometric information.

13. A smart table system comprising:
a processing circuit configured to:
detect a session trigger event based on detecting a first user device is within a wireless communication range of the smart table system;
initiate a user session with a smart table based on detecting the session trigger event, wherein initiating the user session comprises authenticating a plurality of user devices and pairing each of the plurality of user devices with the smart table, wherein the smart table comprises an interactive surface comprising a touchscreen and a plurality of interactive surface sensors, wherein the user session is between a customer of a provider with the first user device of the plurality of user devices and an employee of the provider with a second user device of the plurality of user devices, and wherein the user session comprises establishing communication between a plurality of smart headsets, the smart table, the plurality of user devices, and the processing circuit;
update the interactive surface indicating successful pairing of the plurality of user devices with the smart table;
generate, in response to initiating the user session, graphical user interfaces for the plurality of the smart headsets, each of the smart headsets comprising a transparent display and a plurality of smart headset sensors, each of the smart headsets configured to be worn by an individual;
provide the graphical user interfaces to each of the smart headsets;
receive sensor data associated with at least one of biological data, behavioral data, or a user input from at least one of the plurality of interactive surface sensors or the plurality of smart headset sensors;
monitor, during the user session, biometric data of at least one individual wearing at least one of the plurality of smart headsets;
in response to receiving the sensor data and monitoring the biometric data of the at least one individual during the user session, update a first graphical user interface for a first smart headset of the smart headsets based on the sensor data, wherein the first graphical user interface is unique to the first smart headset and is worn by a first individual, and wherein the updated first graphical user interface comprises a first alert or request displayed on the transparent display of the first smart headset;
in response to receiving the sensor data and monitoring the biometric data of the at least one individual during the user session, update a second graphical user interface for a second smart headset of the smart headsets based on the sensor data, and wherein the second graphical user interface is unique to the second smart headset and is worn by a second individual different than the first individual, and wherein the updated second graphical user interface comprises a second alert or request displayed on the transparent display of the second smart headset; and
wherein the updating the first graphical user interface and the second graphical user interface occurs simultaneously during the user session, and wherein the first graphical user interface and the second graphical user interface share a graphical interface object, and wherein the updating of the first graphical user interface and the second graphical user interface comprises updating the first alert or request on the first graphical user interface and updating the second alert or request on the second graphical user interface.

14. The smart table system of claim 13, wherein each of the first graphical user interface and the second graphical user interface is configured to display content that is unique to each of the smart headsets and is based on at least on one of a user preference or the sensor data.

15. The smart table system of claim 14, wherein the user preference comprises size and color parameters of a user, and wherein the processing circuit is configured to adjust the content displayed on each of the first graphical user interface and the second graphical user interface.

16. The smart table system of claim 13, wherein the processing circuit is configured to continuously update each of the first graphical user interface and the second graphical user interface in real-time, the graphical user interfaces comprising a combination of a set of views comprising content based on the sensor data, wherein each of the set of views comprises a subset of views.

17. The smart table system of claim 16, wherein the set of views comprise a table view and a plurality of smart headset views, and the subset of views comprise a customer view, a provider view, and a manager view, and wherein each of the set of views and each of the subset of views comprises different content unique to the individual.

18. The smart table system of claim 13, wherein the processing circuit is further configured to:
receive, from a microphone, sound input from the customer, wherein the customer is the first individual; and
update the first graphical user interface of the first smart headset of the smart headsets based on the sound input, wherein the first graphical user interface update comprises updating first content of the first graphical user interface;
update the second graphical user interface of the second smart headset of the smart headsets based on the sound input, wherein the second graphical user interface update comprises updating second content of the second graphical user interface different from the first content.

19. The smart table system of claim 13, wherein the first user device is configured to communicate over a network with a network circuit of the smart table system and configured to provide authentication information of the customer to the network circuit, wherein the authentication information is at least one of a customer password, the biometric data, or a geometric information.

20. The smart table system of claim 13, wherein the biological data, the behavioral data, or the user input is indicative of at least one of a user sentiment, a user emotion, a user attentiveness, a user gesture, or a user preference.

* * * * *